(12) United States Patent
Sakakibara et al.

(10) Patent No.: US 11,039,099 B2
(45) Date of Patent: Jun. 15, 2021

(54) SOLID-STATE IMAGING ELEMENT, SOLID-STATE IMAGING APPARATUS, AND METHOD FOR CONTROLLING SOLID-STATE IMAGING ELEMENT

(71) Applicant: SONY SEMICONDUCTOR SOLUTIONS CORPORATION, Kanagawa (JP)

(72) Inventors: Masaki Sakakibara, Kanagawa (JP); Yorito Sakano, Kanagawa (JP); Satoko Iida, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 25 days.

(21) Appl. No.: 16/342,820

(22) PCT Filed: Oct. 10, 2017

(86) PCT No.: PCT/JP2017/036630
§ 371 (c)(1),
(2) Date: Apr. 17, 2019

(87) PCT Pub. No.: WO2018/096813
PCT Pub. Date: May 31, 2018

(65) Prior Publication Data
US 2019/0273883 A1 Sep. 5, 2019

(30) Foreign Application Priority Data
Nov. 24, 2016 (JP) .............................. JP2016-227398

(51) Int. Cl.
*H04N 5/353* (2011.01)
*H04N 5/378* (2011.01)
(Continued)

(52) U.S. Cl.
CPC ............. *H04N 5/378* (2013.01); *H04N 5/355* (2013.01); *H04N 5/3535* (2013.01);
(Continued)

(58) Field of Classification Search
CPC ...... H04N 5/353; H04N 5/3535; H04N 5/355; H04N 5/3554
(Continued)

(56) References Cited

U.S. PATENT DOCUMENTS 7,136,101 B2 * 11/2006 Pyle ..................... H04N 5/2351
348/333.01
9,300,953 B2 * 3/2016 Park .................... H04N 5/35572
(Continued)

FOREIGN PATENT DOCUMENTS

CN 102209209 A 10/2011
CN 104041010 A 9/2014
(Continued)

OTHER PUBLICATIONS

International Search Report and Written Opinion of PCT Application No. PCT/JP2017/036630, dated Jan. 9, 2018, 10 pages of ISRWO.

(Continued)

*Primary Examiner* — Anthony J Daniels
(74) *Attorney, Agent, or Firm* — Chip Law Group

(57) ABSTRACT

An increase in memory capacity is suppressed in a solid-state imaging element that performs correlated double sampling processing. A pixel circuit sequentially generates each of a predetermined reset level and a plurality of signal levels corresponding to the exposure amount. An analog-to-digital converter converts a predetermined reset level into digital data and outputs the data as reset data, converts each of the plurality of pieces of signal data into digital data, and outputs the data as signal data. An arithmetic circuit holds a (Continued)

difference between the reset data and the signal data output first, as held data in a memory, and then adds the held data and the signal data output second and subsequent times together and causes the memory to hold the added data as new held data.

12 Claims, 40 Drawing Sheets

(51) Int. Cl.
    *H04N 5/369*     (2011.01)
    *H04N 5/355*     (2011.01)
    *H04N 5/3745*     (2011.01)
    *H04N 5/374*     (2011.01)
    *H04N 5/363*     (2011.01)
    *H04N 5/365*     (2011.01)

(52) U.S. Cl.
    CPC ......... *H04N 5/35581* (2013.01); *H04N 5/374* (2013.01); *H04N 5/379* (2018.08); *H04N 5/37452* (2013.01); *H04N 5/37455* (2013.01); *H04N 5/363* (2013.01); *H04N 5/365* (2013.01)

(58) Field of Classification Search
    USPC ........................................ 348/294; 250/208.1
    See application file for complete search history.

(56) References Cited

U.S. PATENT DOCUMENTS

| | | | | |
|---|---|---|---|---|
| 2008/0042046 A1* | 2/2008 | Mabuchi | ........... | H01L 27/14634 250/208.1 |
| 2010/0276572 A1* | 11/2010 | Iwabuchi | ............. | H01L 23/481 250/208.1 |
| 2011/0242385 A1 | 10/2011 | Nishihara | | |
| 2014/0375855 A1 | 12/2014 | Nishihara et al. | | |
| 2015/0229859 A1* | 8/2015 | Guidash | ................. | H04N 5/378 348/308 |
| 2015/0281613 A1* | 10/2015 | Vogelsang | ......... | H04N 5/35545 348/300 |
| 2015/0312557 A1* | 10/2015 | Kim | .......................... | G06T 7/50 348/46 |
| 2016/0234450 A1 | 8/2016 | Nishihara et al. | | |

FOREIGN PATENT DOCUMENTS

| | | |
|---|---|---|
| EP | 1067778 A2 | 1/2001 |
| EP | 2800356 A1 | 11/2014 |
| JP | 2001-024941 A | 1/2001 |
| JP | M 01-024941 A | 1/2001 |
| JP | 2005-191641 A | 7/2005 |
| JP | 2011-211535 A | 10/2011 |
| JP | 2013-251607 A | 12/2013 |
| JP | 2015-130563 A | 7/2015 |
| KR | 10-2014-0107241 A | 9/2014 |
| TW | 201630411 A | 8/2016 |
| WO | 2013/099723 A1 | 7/2013 |
| WO | 2016/129408 A1 | 8/2016 |

OTHER PUBLICATIONS

Kleinfelder, et al., "A 10 000 Frames/s CMOS Digital Pixel Sensor", IEEE Journal of Solid-State Circuits, vol. 36, No. 12, Dec. 2001, pp. 2049-2059.

Kleinfelder, et al., "A 10 000 Frames/s CMOS Digital Pixel Sensor", IEEE Journal of Solid-State Circuits, vol. 36, Issue 12, Dec. 2001, pp. 2049-2059.

* cited by examiner

… the ratio of each of the exposure times and then may calculate the difference. This operation produces an effect that the reset data and the signal data are multiplied in accordance with each of ratios of the exposure times.

In addition, in the first aspect, the ratio of each of the exposure times may be a power of 2, and the arithmetic circuit may perform shift operation on the reset data and the signal data. This operation produces an effect that shift operation is performed on the reset data and the signal data.

In addition, in the first aspect, the pixel circuits may be arranged in a two-dimensional lattice pattern, and the analog-to-digital converter may be provided for each of the pixel circuits. This operation produces an effect that data is held in a memory provided for each of the pixel circuits.

Furthermore, in the first aspect, the solid-state imaging element may further include two stacked semiconductor substrates, in which the pixel circuit may be arranged on one of the two semiconductor substrates, and the analog-to-digital converter and the memory may be arranged on the other of the two semiconductor substrates. This operation produces an effect that a voltage is generated on one of the two stacked semiconductor substrates and that data holding and AD conversion are performed on other of the substrates.

Furthermore, in the first aspect, the solid-state imaging element may further include two stacked semiconductor substrates, in which the pixel circuit and the memory may be arranged on one of the two semiconductor substrates, and the analog-to-digital converter may be arranged on the other of the two semiconductor substrates. This operation produces an effect that data is held on one of the two stacked semiconductor substrates and AD conversion is performed on the other substrate.

In addition, in the first aspect, the solid-state imaging element may further include stacked first, second, and third semiconductor substrates, in which the pixel circuit may be arranged on the first semiconductor substrate, the analog-to-digital converter may be arranged on the second semiconductor substrate, and the memory may be arranged on the third semiconductor substrate. This operation produces an effect that a voltage is generated in the first semiconductor substrate, AD conversion is performed on the second semiconductor substrate, and data is held on the third semiconductor substrate.

Furthermore, a second aspect of the present technology is a solid-state imaging element and a method for controlling the same, the solid-state imaging element including: a pixel circuit that sequentially generates first and second reset levels and first and second signal levels corresponding to exposure amounts; an analog-to-digital converter that converts each of the first reset level and the second signal levels respectively to each of first reset data and second signal data with a predetermined resolution and that converts each of the second reset level and the first signal level respectively to each of second reset data and first signal data with a resolution higher than the predetermined resolution; a correlated double sampling processing unit that obtains a difference between the first reset data and the second signal data as first pixel data and that obtains a difference between the second reset data and the first signal data as the second pixel data; a first memory that holds the first pixel data; a second memory that holds the second pixel data; and a determination unit that determines whether or not a value of the held second pixel data is higher than a predetermined value and that causes the held first pixel data to be output in a case where the value of the second pixel data is higher than the predetermined value and causes the second pixel data to be output in a case where the value of the second pixel data is less than the predetermined value. This operation produces an effect that the first pixel data is output in a case where the second pixel data value is higher than a predetermined value and that the second pixel data is output in a case where the second pixel data value is less than the predetermined value.

Furthermore, in the second aspect, the solid-state imaging element may further include a pixel driving part that causes the pixel circuit to generate the first reset level and the second signal level with a predetermined sensitivity and that causes the pixel circuit to generate the second reset level and the first signal level with a sensitivity different from the predetermined sensitivity. This operation produces an effect that the sensitivity is changed.

Furthermore, in the second aspect, the pixel circuit generates each of the first and second reset levels and the first and second signal levels as pixel signals, the analog-to-digital converter includes: a comparison unit that compares a predetermined reference signal having a slope with the pixel signal a plurality of times and that outputs results of the comparison; and a data storage unit that stores data including each of the comparison results as either of the first and second reset data or the first and second signal data, and inclination of the slope when the second reset level and the first signal level are individually compared may be gentler than the inclination when the first reset level and the second signal level are individually compared. This operation produces an effect that the inclination of the slope is changed.

Furthermore, in the second aspect, the pixel circuits may be arranged in a two-dimensional lattice pattern, the analog-to-digital converter may be arranged for each of the pixel circuits, and the second memory may be shared by all of the pixel circuits. This operation produces an effect that data is held in the shared second memory.

Furthermore, a third aspect of the present technology is a solid-state imaging apparatus including: a pixel circuit that sequentially generates a predetermined reset level and a plurality of signal levels corresponding to an exposure amount; an analog-to-digital converter that first converts the predetermined reset level into digital data and outputs this data as reset data and thereafter converts each of the plurality of signal levels into digital data and outputs the digital data as signal data; a memory that holds data as held data; an arithmetic circuit that initially causes the memory to hold a difference between the reset data and the signal data output first as the held data and thereafter adds the held data that has been held and the signal data output second and subsequent times together and causes the memory to hold the added data as new held data; and a digital signal processing unit that executes predetermined signal processing on the held data that has been held. This operation produces an effect that the signal processing is executed on the data obtained by adding the difference between the reset data and the signal data output first and the signal data output for the second and subsequent times.

Furthermore, a fourth aspect of the present technology is a solid-state imaging apparatus including: a pixel circuit that sequentially generates first and second reset levels and first and second signal levels corresponding to exposure amounts; an analog-to-digital converter that converts each of the first reset level and the second signal levels respectively to each of first reset data and second signal data with a predetermined resolution and that converts each of the second reset level and the first signal level to each of second reset data and first signal data with a resolution higher than the predetermined resolution; a correlated double sampling processing unit that obtains a difference between the first reset data and the second signal data as first pixel data and that obtains a difference between the second reset data and the first signal data as the second pixel data; a first memory that holds the first pixel data; a second memory that holds the second pixel data; a determination unit that determines whether or not a value of the held second pixel data is higher than a predetermined value and that causes the held first pixel data to be output in a case where the value of the second pixel data is higher than the predetermined value and causes the second pixel data to be output in a case where the value of the second pixel data is less than the predetermined value; and a digital signal processing unit that executes predetermined signal processing on output data out of the first and second pixel data. This operation produces an effect that signal processing is performed on the first pixel data in a case where the second pixel data value is higher than a predetermined value and that signal processing is performed on the second pixel data in a case where the second pixel data value is less than the predetermined value.

Effects of the Invention

According to the present technology, it is possible to achieve an excellent effect that it is possible to suppress an increase in the memory capacity in the solid-state imaging element that performs correlated double sampling processing. Note that effects described herein are non-restricting. The effects may be any of effects described in the present disclosure.

MODE FOR CARRYING OUT THE INVENTION

Hereinafter, embodiments of the present technology (hereinafter, embodiment(s)) will be described. The description will be given in the following order.

1. First embodiment (example of holding sum of data in memory)
2. Second embodiment (example of holing sum of data from sub-pixel in memory)
3. Third embodiment (example of holding sums of a plurality of pieces of data with different exposure times in memory)
4. Fourth embodiment (example of holding sum of one piece of reset data and plurality of pieces of signal data in memory)
5. Fifth embodiment (example of holding two pieces of data with different resolutions in different memories)
6. Sixth embodiment (example of holding two pieces of data having different resolutions and different sensitivities in different memories)
7. Seventh embodiment (example of holding sum of data in memory in stacked-type solid-state imaging element)
8. Application example to mobile body 1. First Embodiment

[Configuration Example of Imaging Apparatus]

Figure 1:
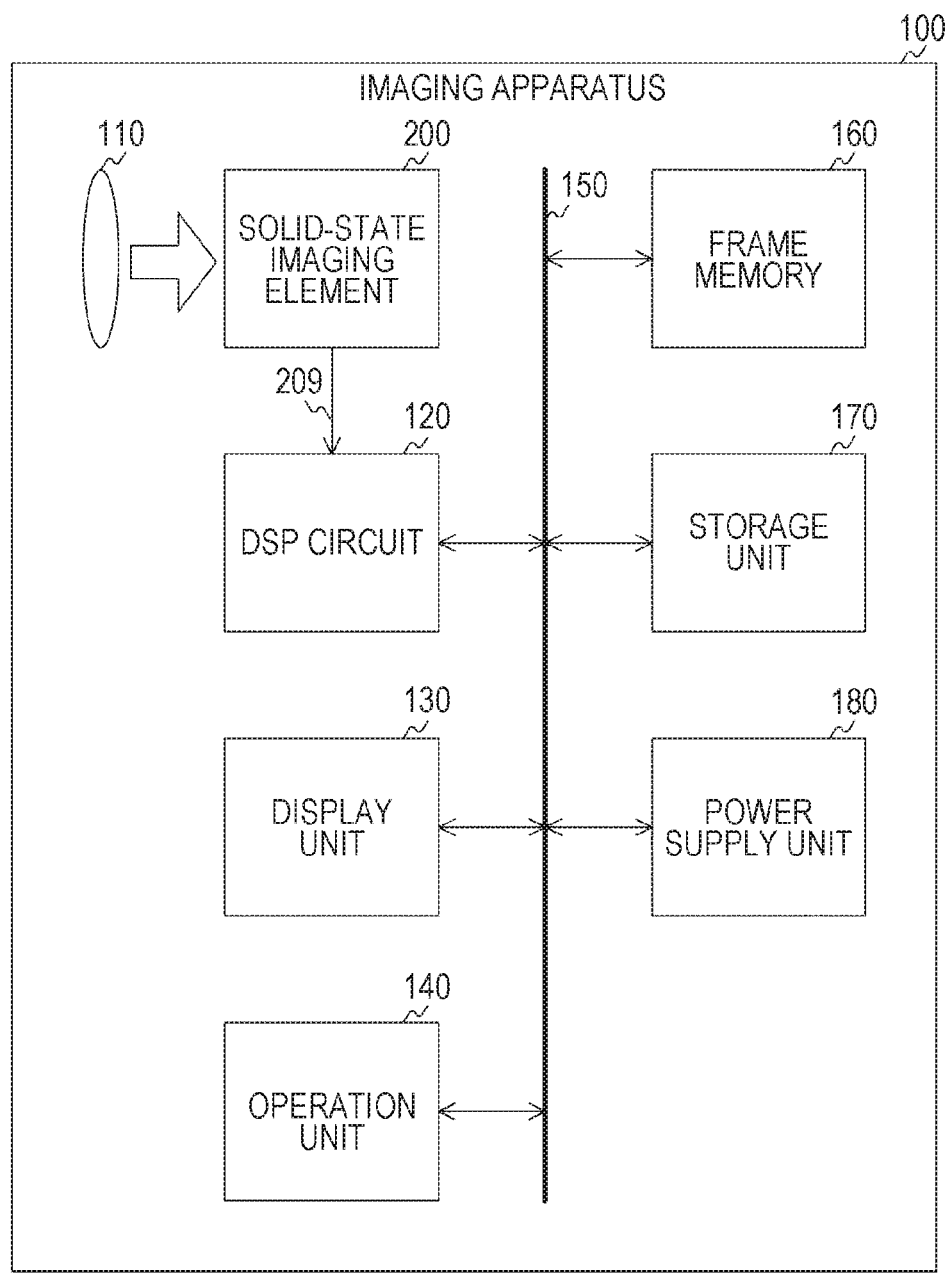
FIG. 1 is a block diagram illustrating a configuration example of an imaging apparatus according to a first embodiment of the present technology.

FIG. 1 is a block diagram illustrating a configuration example of an imaging apparatus 100 according to a first embodiment of the present technology. The imaging apparatus 100 is an apparatus for imaging image data, and includes an optical unit 110, a solid-state imaging element 200, and a digital signal processing (DSP) circuit 120. Furthermore, the imaging apparatus 100 includes a display unit 130, an operation unit 140, a bus 150, a frame memory 160, a storage unit 170, and a power supply unit 180. The imaging apparatus 100 can presumably be implemented as, for example, a smartphone or a personal computer having an imaging function in addition to a digital camera such as a digital still camera.

The optical unit 110 collects light from a subject and guides the collected light to the solid-state imaging element 200. The solid-state imaging element 200 generates image data by photoelectric conversion in synchronization with a vertical synchronization signal. Here, the vertical synchronization signal is a periodic signal of a predetermined frequency indicating a timing of imaging. The solid-state imaging element 200 supplies the generated image data to the DSP circuit 120 via a signal line 209.

The DSP circuit 120 executes predetermined signal processing on the image data from the solid-state imaging element 200. The DSP circuit 120 outputs the processed image data to the frame memory 160 or the like via the bus 150. Note that the DSP circuit 120 is an example of a digital signal processing unit described in the claims.

The display unit 130 displays image data. The display unit 130 can presumably be implemented, for example, by a liquid crystal panel or an organic Electro Luminescence (EL) panel. The operation unit 140 generates an operation signal in accordance with user's operation.

The bus 150 is a common path for mutual data transfer between each of the optical unit 110, the solid-state imaging element 200, the DSP circuit 120, the display unit 130, the operation unit 140, the frame memory 160, the storage unit 170, and the power supply unit 180.

The frame memory 160 holds image data. The storage unit 170 stores various data such as image data. The power supply unit 180 supplies power to the solid-state imaging element 200, the DSP circuit 120, the display unit 130, or the like.

[Configuration Example of Solid-State Imaging Element]

Figure 2:
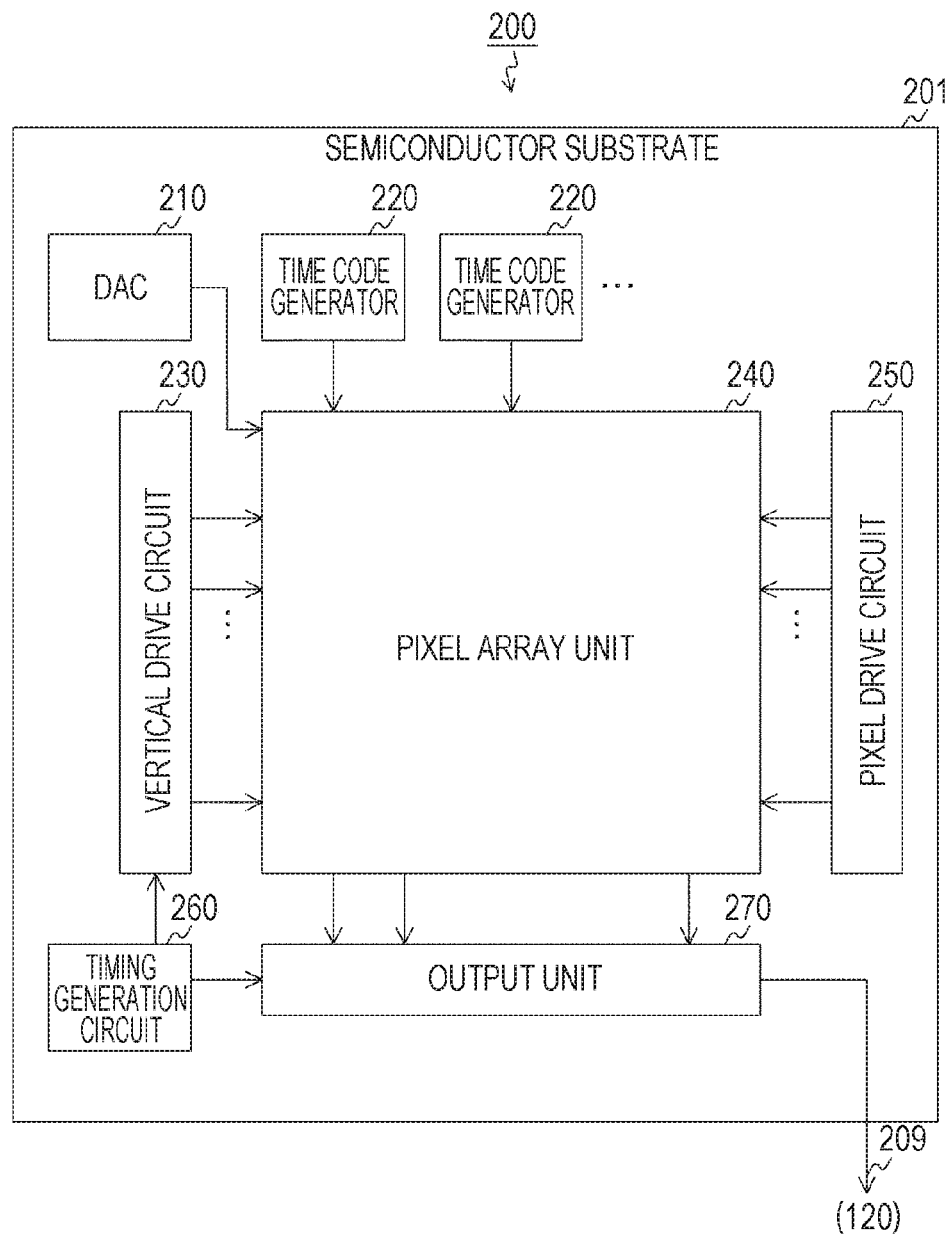
FIG. 2 is a block diagram illustrating a configuration example of a solid-state imaging element according to the first embodiment of the present technology.

FIG. 2 is a block diagram illustrating a configuration example of the solid-state imaging element 200 according to the first embodiment of the present technology. The solid-state imaging element 200 includes a semiconductor substrate 201. The semiconductor substrate 201 includes a digital-to-analog converter (DAC) 210, and a plurality of time code generators 220. The semiconductor substrate 201 further includes a vertical drive circuit 230, a pixel array unit 240, a pixel drive circuit 250, a timing generation circuit 260, and an output unit 270. Moreover, the pixel array unit 240 includes a plurality of pixels arranged in a two-dimensional lattice pattern.

The DAC 210 generates an analog reference signal changing in a slope shape by digital-to-analog (DA) conversion. The DAC 210 supplies a reference signal to the pixel array unit 240.

The time code generator 220 generates a time code. This time code indicates the time within a period in which the reference signal changes in a slope shape. The time code generator 220 supplies the generated time code to the pixel array unit 240.

The timing generation circuit 260 generates various timing signals and supplies the signals to the vertical drive circuit 230, the output unit 270, or the like.

The vertical drive circuit 230 controls output of the pixel data generated within a pixel to the output unit 270 in synchronization with the timing signal. The pixel drive circuit 250 drives pixels.

The output unit 270 executes signal processing including CDS processing on pixel data. The output unit 270 outputs the processed pixel data to the DSP circuit 120.

[Configuration Example of Pixel Array Unit]

Figure 3:
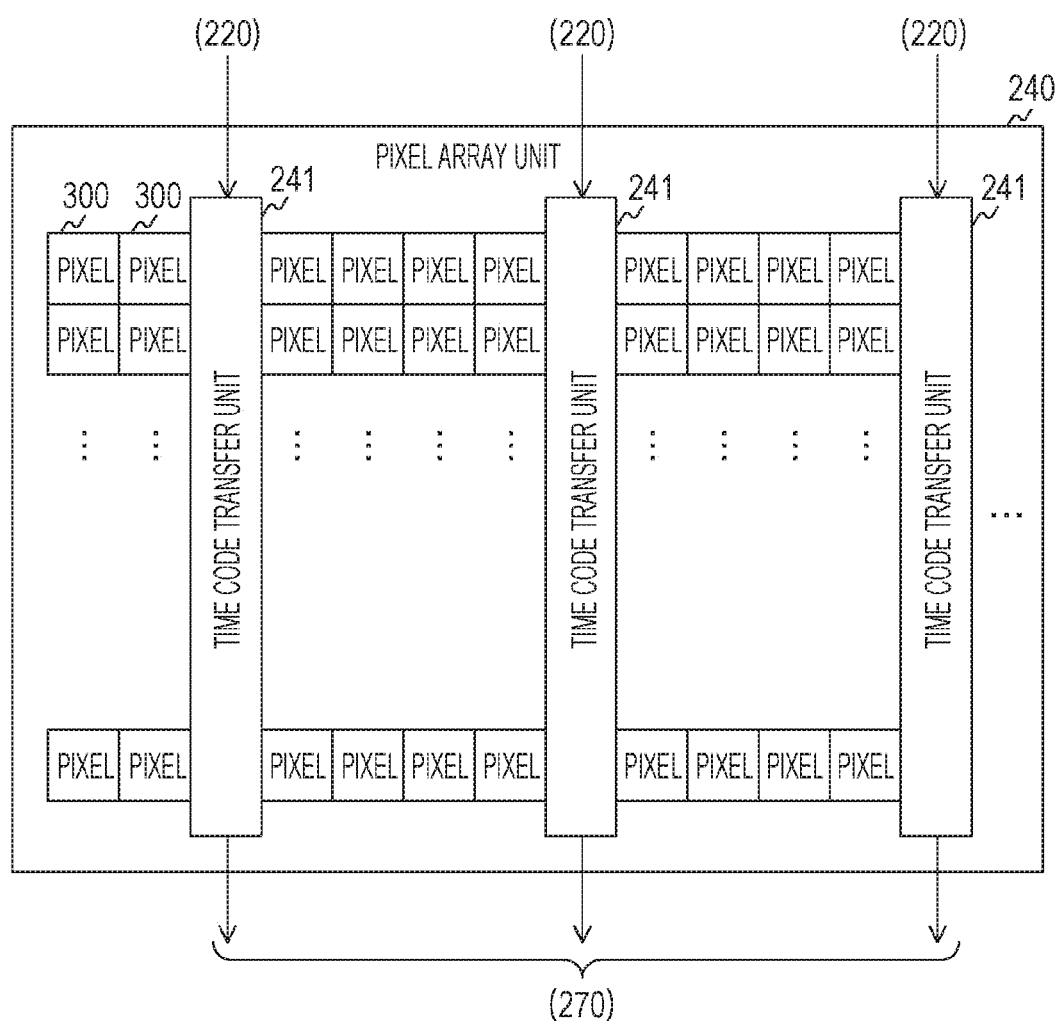
FIG. 3 is a block diagram illustrating a configuration example of a pixel array unit according to the first embodiment of the present technology.

FIG. 3 is a block diagram illustrating a configuration example of the pixel array unit 240 according to the first embodiment of the present technology. The pixel array unit 240 includes a plurality of time code transfer units 241 and a plurality of pixels 300. The time code transfer unit 241 is arranged for each of the time code generators 220. Furthermore, the pixels 300 are arranged in a two-dimensional lattice pattern.

The time code transfer unit 241 transfers the time code from the corresponding time code generator 220. The time code transfer unit 241 transfers the time code from the corresponding time code generator 220 to the pixel 300, and further transfers the time code from the pixel 300 to the output unit 270 as pixel data. The pixel 300 generates pixel data.

[Configuration Example of Pixel]

Figure 4:
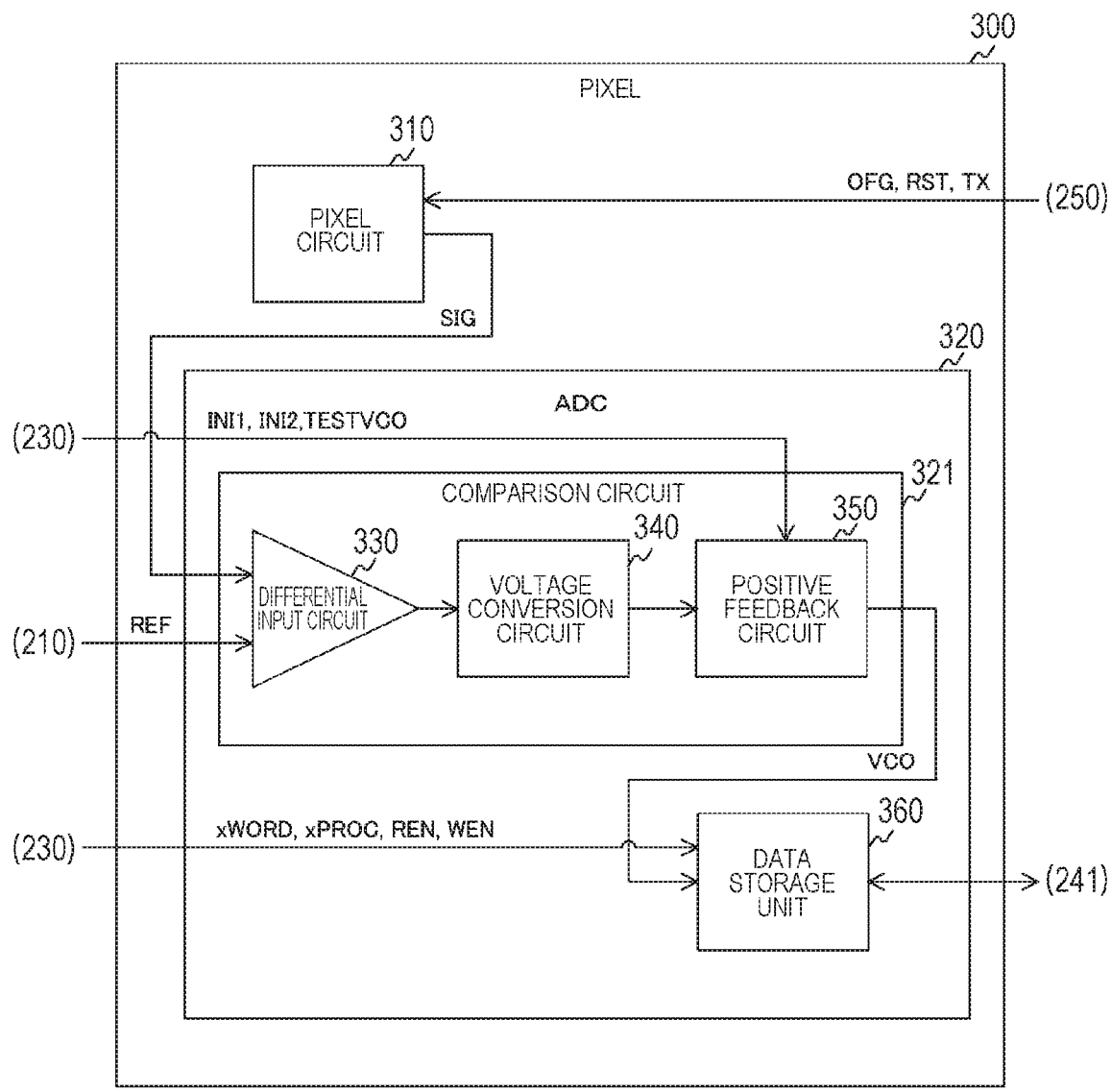
FIG. 4 is a block diagram illustrating a configuration example of a pixel according to the first embodiment of the present technology.

FIG. 4 is a block diagram illustrating a configuration example of the pixel 300 according to the first embodiment of the present technology. The pixel 300 includes a pixel circuit 310 and an ADC 320. The ADC 320 includes a comparison circuit 321 and a data storage unit 360. Furthermore, the comparison circuit 321 includes a differential input circuit 330, a voltage conversion circuit 340, and a positive feedback circuit 350.

The pixel circuit 310 generates a reset level or signal level as a pixel signal SIG by photoelectric conversion. Here, the reset level is a voltage at the time when Floating Diffusion (FD) is initialized after the start of exposure, and the signal level is a voltage corresponding to the exposure amount at the end of exposure. The pixel circuit 310 sequentially supplies the reset level and the signal level to the differential input circuit 330.

The ADC 320 AD converts the pixel signal SIG (reset level or signal level) into digital data. Hereinafter, data obtained by AD conversion of the reset level will be referred to as "P-phase data". Moreover, hereinafter, the data obtained by AD conversion of the signal level will be referred to as "D-phase data". Note that the P-phase data is an example of the reset data described in the claims, and the D-phase data is an example of the signal data described in the claims.

The differential input circuit 330 in the ADC 320 compares a reference signal REF from the DAC 210 with the pixel signal SIG from the pixel circuit 310. The differential input circuit 330 supplies a comparison result signal indicating a comparison result to the voltage conversion circuit 340.

The voltage conversion circuit 340 converts the voltage of the comparison result signal from the differential input circuit 330 and outputs the converted voltage to the positive feedback circuit 350.

The positive feedback circuit 350 adds a portion of the output to the input (comparison result signal) and outputs the result as an output signal VCO to the data storage unit 360.

The data storage unit 360 holds the time code at the time of inversion of the output signal VCO. The data storage unit 360 outputs the time code corresponding to the reset level as P-phase data and outputs the time code corresponding to the signal level as D-phase data.

Note that although the ADC 320 is provided for each of pixel circuits 310, the ADC 320 may be arranged for each of the plurality of pixel circuits 310.

Figure 5:
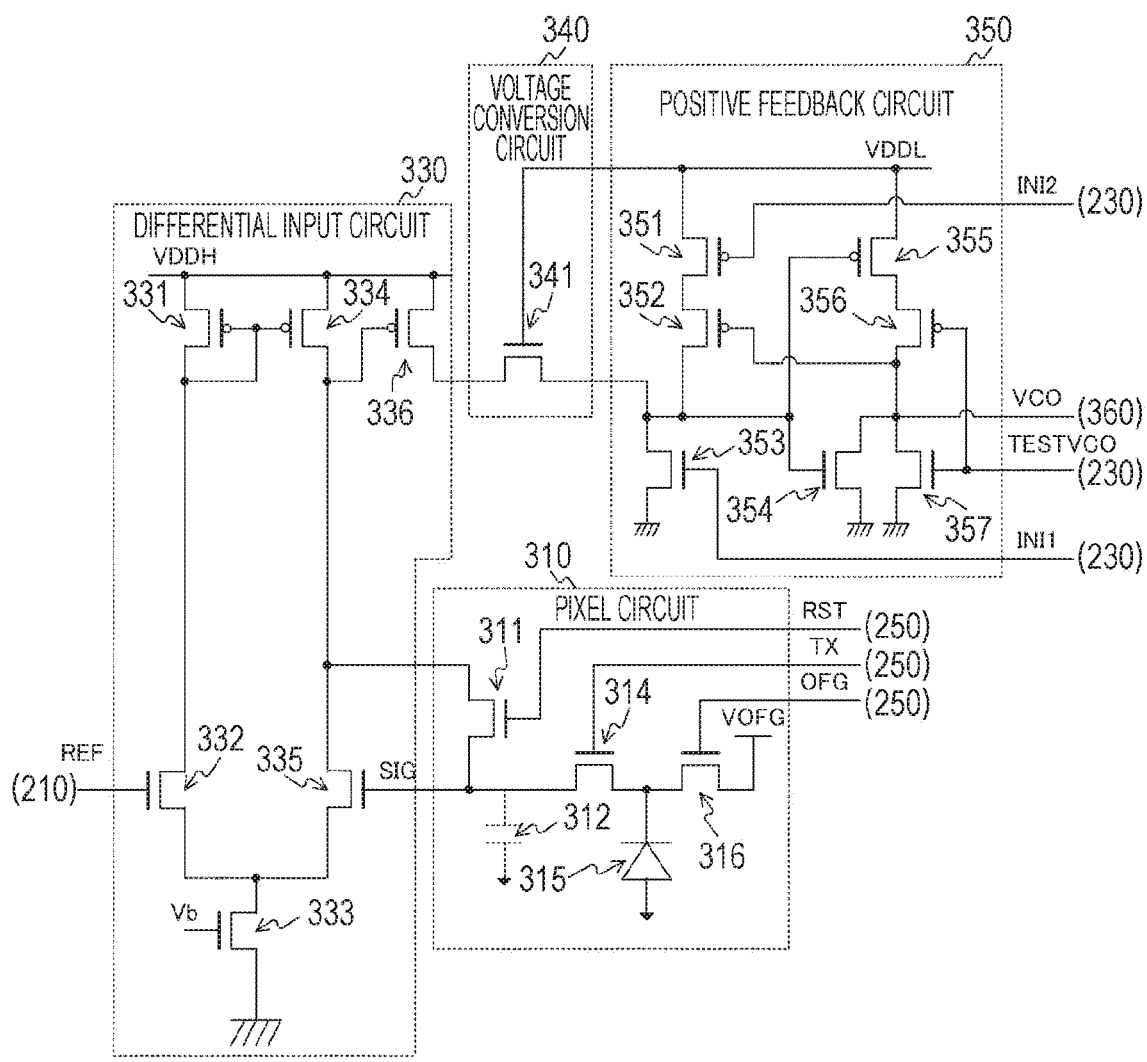
FIG. 5 is a circuit diagram illustrating a configuration example of a pixel circuit, a differential input circuit, a voltage conversion circuit, and a positive feedback circuit according to the first embodiment of the present technology.

FIG. 5 is a circuit diagram illustrating a configuration example of the pixel circuit 310, the differential input circuit 330, the voltage conversion circuit 340, and the positive feedback circuit 350 according to the first embodiment of the present technology.

The pixel circuit 310 includes a reset transistor 311, a FD 312, a transfer transistor 314, a photodiode 315, and a discharge transistor 316. For example, N-type Metal-Oxide-Semiconductor (MOS) transistors are used as the reset transistor 311, the transfer transistor 314, and the discharge transistor 316.

The photodiode 315 generates charges by photoelectric conversion. The discharge transistor 316 discharges the charge stored in the photodiode 315 in accordance with a drive signal OFG from the pixel drive circuit 250.

The transfer transistor 314 transfers charges from the photodiode 315 to the FD 312 in accordance with a transfer signal TX from the pixel drive circuit 250.

The FD 312 stores the transferred charges and generates a voltage corresponding to the stored charge amount. Note that the FD 312 is an example of a charge storage part described in the claims.

The reset transistor 311 initializes the FD 312 in accordance with a reset signal RST from the pixel drive circuit 250.

The differential input circuit 330 includes Positive channel MOS (PMOS) transistors 331, 334, and 336 and Negative channel MOS (NMOS) transistors 332, 333, and 335.

The NMOS transistors 332 and 335 constitute a differential pair, and the sources of these transistors are connected to the drain of the NMOS transistor 333 as a common drain. Furthermore, the drain of the NMOS transistor 332 is connected to the drain of the PMOS transistor 331 and the gates of the PMOS transistors 331 and 334. The drain of the NMOS transistor 335 is connected to the drain of the PMOS transistor 334, the gate of the PMOS transistor 336, and the drain of the reset transistor 311. Furthermore, the reference signal REF is input to the gate of the NMOS transistor 332.

A predetermined bias voltage Vb is applied to the gate of the NMOS transistor 333, and a predetermined ground voltage is applied to the source of the NMOS transistor 333. A ground voltage VSS is higher than a substrate potential of the NMOS transistor in the pixel circuit 310.

The PMOS transistors 331 and 334 form a current mirror circuit. A power supply voltage VDDH is applied to the sources of the PMOS transistors 331, 334, and 336. The power supply voltage VDDH is higher than a power supply voltage VDDL. Furthermore, the drain of the PMOS transistor 336 is connected to the voltage conversion circuit 340.

The voltage conversion circuit 340 includes an NMOS transistor 341. The power supply voltage VDDL is applied to the gate of the NMOS transistor 341. Furthermore, the drain of the NMOS transistor 341 is connected to the drain of the PMOS transistor 336, and the source of the NMOS transistor 341 is connected to the positive feedback circuit 350.

The positive feedback circuit 350 includes PMOS transistors 351, 352, 355, and 356 and NMOS transistors 353, 354, and 357. The PMOS transistors 351 and 352 are connected in series to the power supply voltage VDDL. Furthermore, a drive signal INI2 from the vertical drive circuit 230 is input to the gate of the PMOS transistor 351. The drain of the PMOS transistor 352 is connected to the source of the NMOS transistor 341, the drain of the NMOS transistor 353, and the gates of the PMOS transistor 355 and the NMOS transistor 354.

A ground voltage is applied to the source of the NMOS transistor 353, and a drive signal INI1 from the vertical drive circuit 230 is input to the gate of the NMOS transistor 353.

The PMOS transistors 355 and 356 are connected in series to the power supply voltage VDDL. Furthermore, the drain of the PMOS transistor 356 is connected to the gate of the PMOS transistor 352 and the drains of the NMOS transistors 354 and 357. A control signal TESTVCO from the vertical drive circuit 230 is input to the gates of the PMOS transistor 356 and the NMOS transistor 357.

An output signal VCO is output from the drains of the NMOS transistors 354 and 357. Furthermore, a ground voltage is applied to the sources of the NMOS transistors 354 and 357.

Note that each of the pixel circuit 310, the differential input circuit 330, the voltage conversion circuit 340, and the positive feedback circuit 350 is not limited to the circuit illustrated in FIG. 5 as long as each of the circuits includes the function described in FIG. 4.

[Configuration Example of Data Storage Unit]

Figure 6:
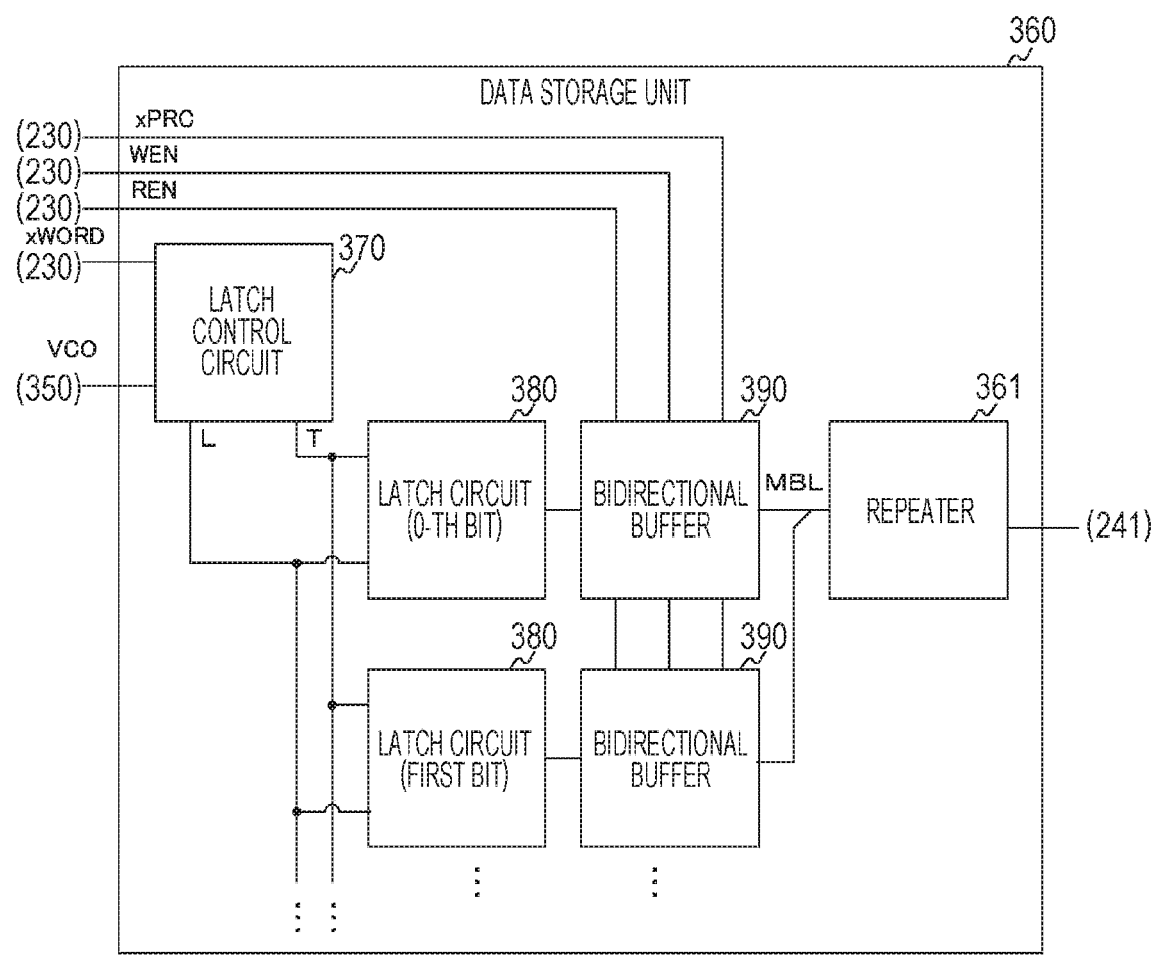
FIG. 6 is a block diagram illustrating a configuration example of a data storage unit according to the first embodiment of the present technology.

FIG. 6 is a block diagram illustrating a configuration example of the data storage unit 360 according to the first embodiment of the present technology. The data storage unit 360 includes: a latch control circuit 370; a latch circuit 380 having the number as many as the bits D (D is an integer) of D-phase data; D bidirectional buffers 390; and a repeater 361. The latch control circuit 370 holds a value (logical value "0" or "1") of the output signal VCO in any of the latch circuits 380 in accordance with a control signal xWORD from the vertical drive circuit 230. The control signal xWORD is a signal obtained by inverting a control signal WORD.

The latch circuit 380 holds the value of the output signal VCO under the control of the latch control circuit 370. The bidirectional buffer 390 bidirectionally transfers data between the corresponding latch circuit 380 and the repeater 361 in accordance with a control signal xPRC, a write enable WEN, and a read enable REN from the vertical drive circuit 230.

The repeater 361 transfers the time code between the bidirectional buffer 390 and the time code transfer unit 241.

[Configuration Example of Latch Control Circuit]

Figure 7:
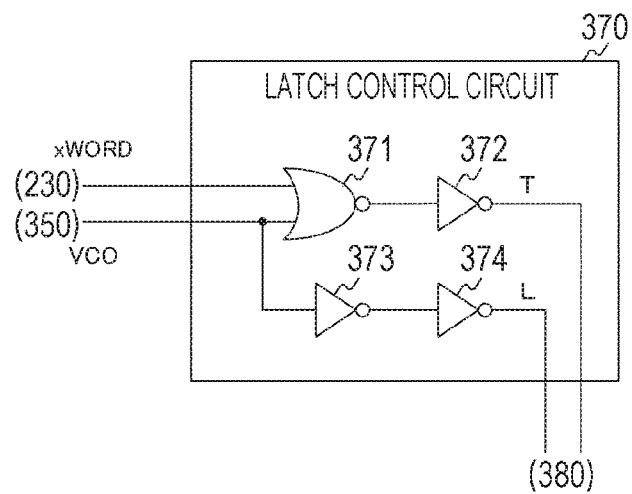
FIG. 7 is a block diagram illustrating a configuration example of a latch control circuit according to a first embodiment of the present technology.

FIG. 7 is a block diagram illustrating a configuration example of the latch control circuit 370 according to a first embodiment of the present technology. The latch control circuit 370 includes a NOR gate 371 and inverters 372, 373, and 374.

The NOR gate 371 outputs NOR of the control signal xWORD and the output signal VCO to the inverter 372. The inverter 372 inverts the output value from the NOR gate 371 and outputs the inverted signal as a latch control signal T to the latch circuit 380.

The inverter 373 inverts the output signal VCO and outputs the inverted signal to the inverter 374. The inverter 374 inverts the output value from the inverter 373 and outputs the inverted signal as a latch input signal L to the latch circuit 380.

Note that the latch control circuit 370 is not limited to the circuit illustrated in FIG. 7 as long as it includes an equivalent function.

[Configuration Example of Latch Circuit and Bidirectional Buffer]

Figure 8:
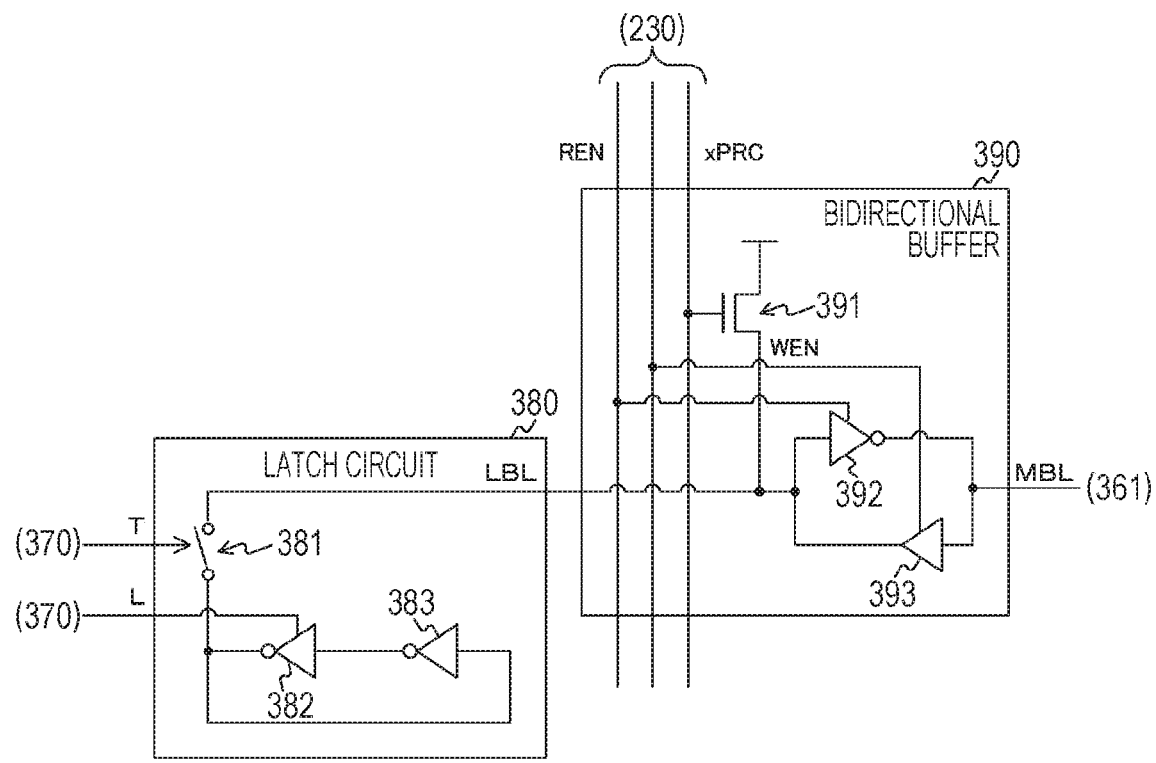
FIG. 8 is a block diagram illustrating a configuration example of a latch circuit and a bidirectional buffer according to the first embodiment of the present technology.

FIG. 8 is a block diagram illustrating a configuration example of the latch circuit 380 and the bidirectional buffer 390 according to the first embodiment of the present technology. The latch circuit 380 includes a switch 381 and inverters 382 and 383.

The switch 381 opens and closes the path between the inverter 382 and a bit line LBL in accordance with the latch control signal T from the latch control circuit 370. The bit line LBL is connected to the bidirectional buffer 390.

The inverter 382 inverts a signal from the inverter 383 in accordance with the latch input signal L from the latch control circuit 370. The inverter 382 outputs the inverted signal to an input terminal of the inverter 383 and to the switch 381.

The inverter 383 inverts the signal from the inverter 382 and outputs the inverted signal to an input terminal of the inverter 382.

The bidirectional buffer 390 includes an NMOS transistor 391, an inverter 392, and a buffer 393.

The control signal xPRC from the vertical drive circuit 230 is input to the gate of the NMOS transistor 391. Furthermore, the drain of the NMOS transistor 391 is connected to the power supply, and the source of the NMOS transistor 391 is connected to the bit line LBL. A low level is set to the control signal xPRC in a case where data is to be transferred by the bidirectional buffer 390, and the bit line LBL is temporarily set to a high level. Thereafter, a signal is read from the latch circuit 380.

The inverter 392 inverts the signal from the bit line LBL in accordance with the read enable REN and outputs the inverted signal to a bit line MBL and to an input terminal of the buffer 393. The bit line MBL is connected to the repeater 361.

The buffer 393 outputs the signal from the inverter 392 or the bit line MBL to the bit line LBL and the input terminal of the inverter 392 in accordance with the write enable WEN.

Note that the latch circuit 380 and the bidirectional buffer 390 are not limited to the circuits illustrated in FIG. 8 as long as they have equivalent functions.

[Configuration Example of Output Unit]

Figure 9:
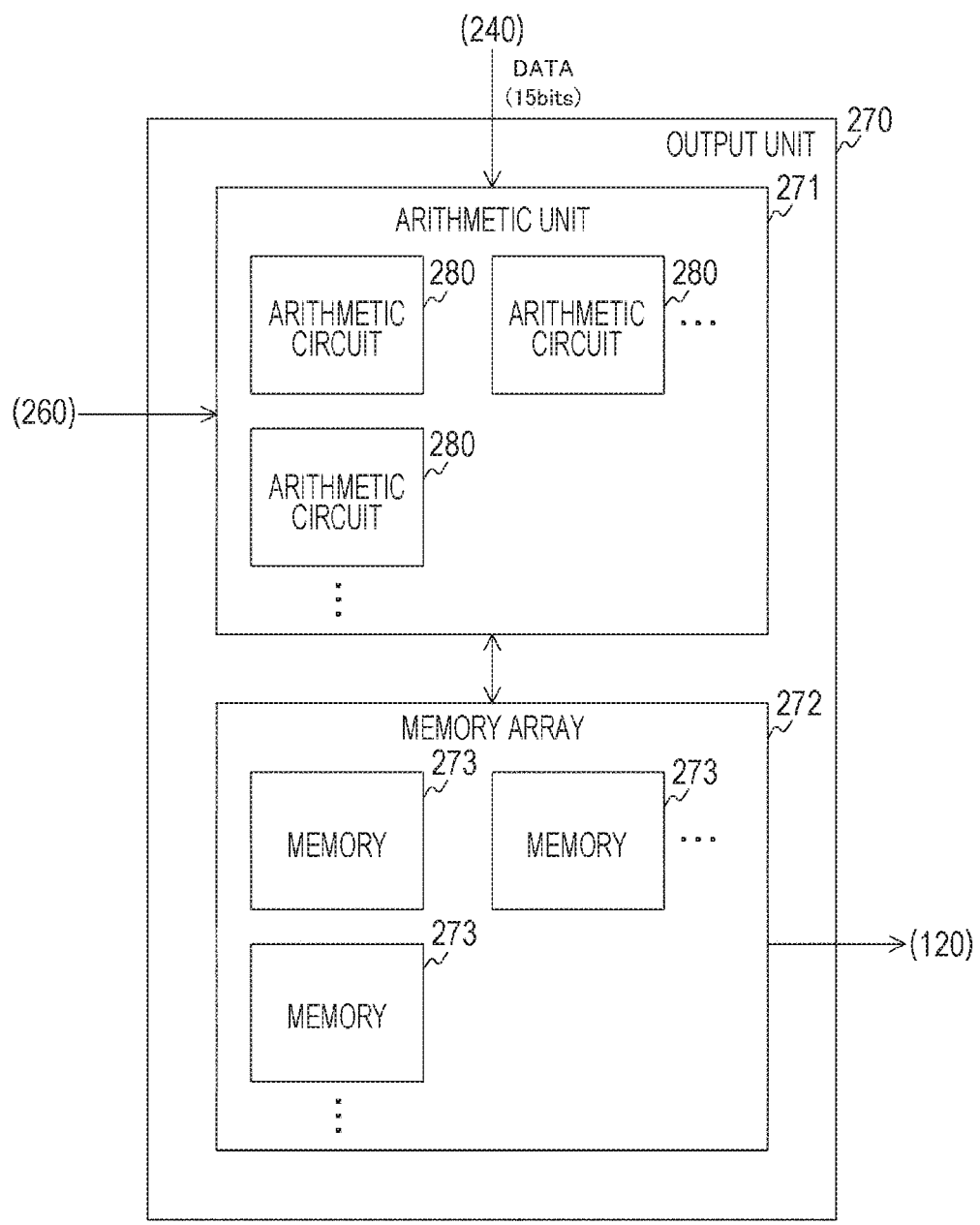
FIG. 9 is a block diagram illustrating a configuration example of an output unit according to the first embodiment of the present technology.

FIG. 9 is a block diagram illustrating a configuration example of the output unit 270 according to the first embodiment of the present technology. The output unit 270 includes an arithmetic unit 271 and a memory array 272. The arithmetic unit 271 includes an arithmetic circuit 280 arranged for each of the pixels 300. Furthermore, the memory array 272 includes a memory 273 provided for each of the pixels 300. Assuming that the number of pixels 300 in the horizontal direction is H (H is an integer of 2 or more) and the number of pixels 300 in the vertical direction is V (V is an integer of 2 or more), the number of each of the arithmetic circuit 280 and the memory 273 would be H×V. Each of the arithmetic circuits 280 is associated with a mutually different pixel 300 on a one-to-one basis. In addition, the memory 273 is also associated with a mutually different pixel 300 on a one-to-one basis.

The arithmetic circuit 280 performs CDS processing on the digital data (P-phase data or D-phase data) from the corresponding pixel 300. In the CDS processing, the arithmetic circuit 280 causes the corresponding memory 273 to hold data. The memory 273 outputs the held data as pixel data to the DSP circuit 120.

Furthermore, the memory capacity of the memory 273 is expressed by the following expression.

$$Cm = \text{ROUNDUP}(\log_2 N) + B$$

In the above expression, Cm is the memory capacity, in units of bits, for example. B is the number of bits of the difference between the P-phase data and the D-phase data (that is, the net pixel data). N is the number of sampling times of the signal level. ROUNDUP ( ) is a function that rounds up fraction and returns an integer value.

For example, when data size B of the pixel data is 14 bits and the number of sampling times N is 2, the memory capacity Cm would be 15 bits from the above expression.

Furthermore, when the number of pixels 300 is H×V, the total capacity of the memory array 272 as a whole would be C×H×V bits.

Note that, in a case where the ADCs 320 are arranged for each of K (K is an integer of 2 or more) pixel circuits 310, the arithmetic circuit 280 and the memory 273 are also provided for each of K pixels.

[Configuration Example of Arithmetic Circuit and Memory]

Figure 10:
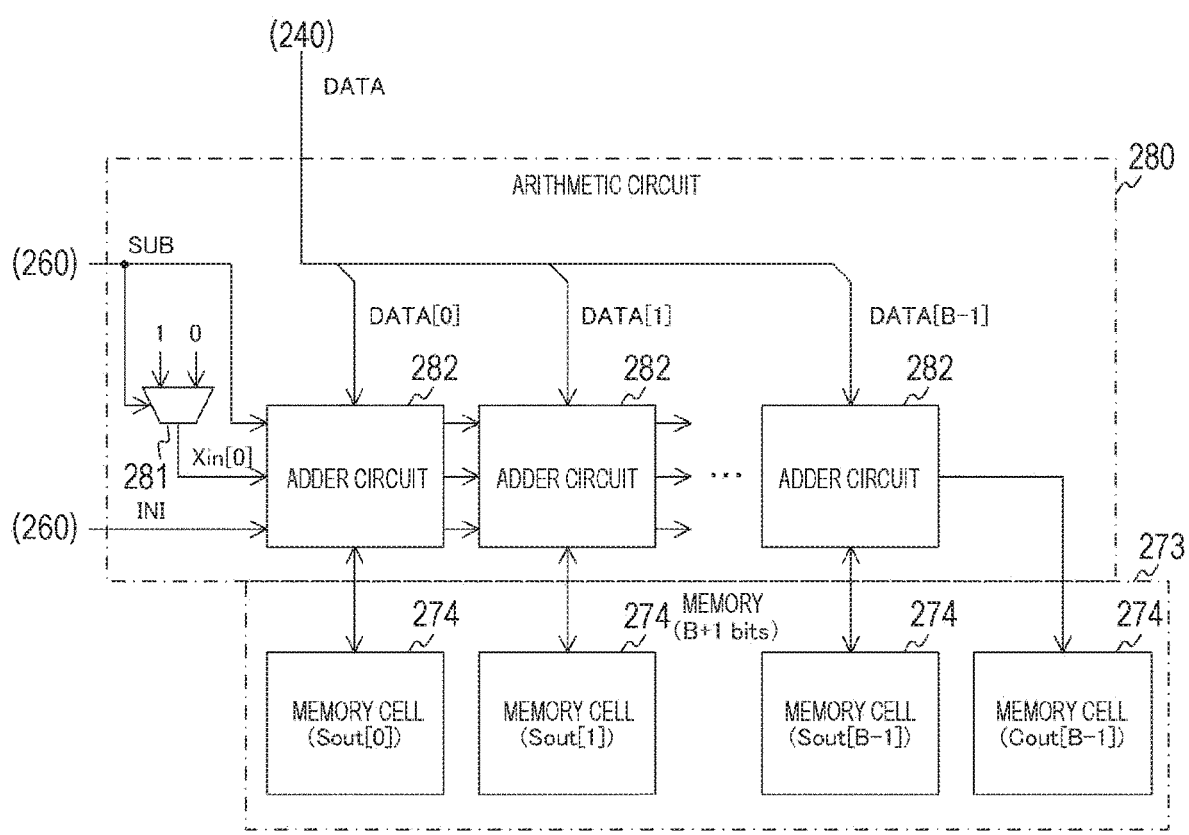
FIG. 10 is a block diagram illustrating a configuration example of an arithmetic circuit and a memory according to the first embodiment of the present technology.

FIG. 10 is a block diagram illustrating a configuration example of the arithmetic circuit 280 and the memory 273 according to the first embodiment of the present technology. The arithmetic circuit 280 includes a selector 281 and adder circuits 282 having a plurality of stages. In a case where the number of sampling times N is 2, the number of stages of the adder circuit 282 is the same as the number of bits B (for example, 14) of the pixel data. The memory 273 includes a plurality of memory cells 274 holding one bit. The number of memory cells 274 is B+1. Note that in a case where the number of sampling times N is three or more, the number of stages of the adder circuit 282 and the memory capacity of the memory 273 increase in accordance with the number of times.

The selector 281 selects one of the logical values "1" and "0" in accordance with a subtraction control signal SUB from the timing generation circuit 260 and outputs the selected value as a carry input signal Xin[0] to the adder circuit 282 of the first stage.

The adder circuit 282 performs summing processing. The carry input signal Xin[0] from the selector 281 and a DATA[0] of the 0-th bit of DATA from the corresponding pixel 300 are input to the adder circuit 282 at the first stage. A carry output signal Cout[b] from the preceding stage and a DATA[b] at the b-th bit are input to the adder circuit 282 at the b-th (b is an integer from 0 to B−1) stage. Furthermore, an initialization signal INI and the subtraction control signal SUB from the timing generation circuit 260 are input to all the adder circuits 282.

The adder circuit 282 at the b-th stage causes the b-th memory cell 274 to hold an output signal Sout[b]. Furthermore, the adder circuit 282 at the b-th stage outputs the carry signal Cout[b] to the adder circuit 282 at the subsequent stage. Thereafter, the adder circuit 282 at the last stage causes the last memory cell 274 to hold a carry output signal Cout[B−1].

[Configuration Example of Adder Circuit]

Figure 11:
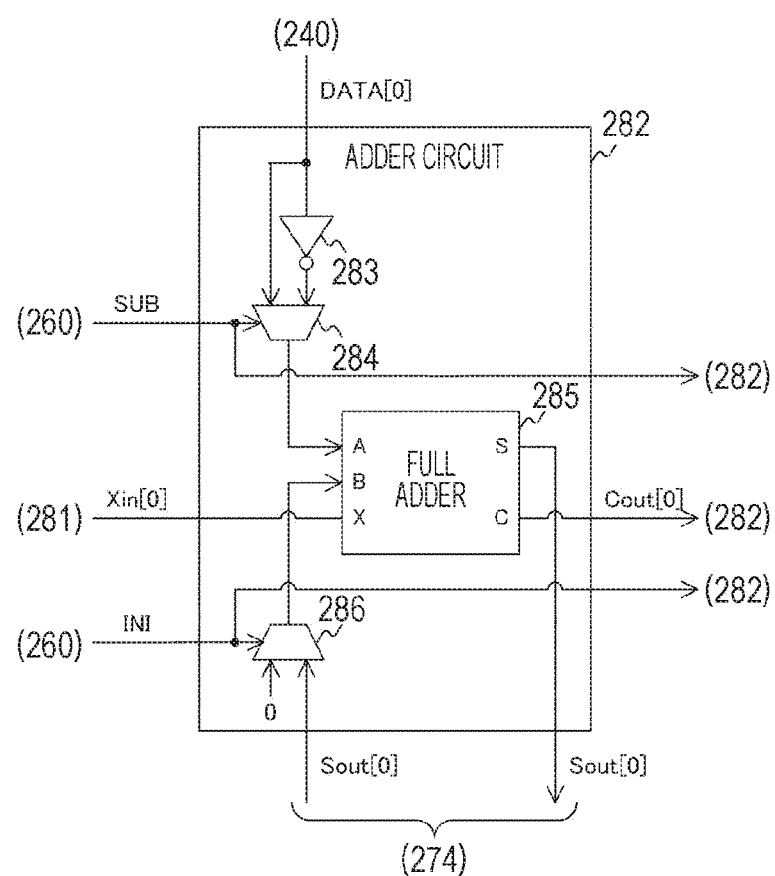
FIG. 11 is a circuit diagram illustrating a configuration example of an adder circuit according to the first embodiment of the present technology.

FIG. 11 is a circuit diagram illustrating a configuration example of the adder circuit 282 according to the first embodiment of the present technology. The adder circuit 282 includes an inverter 283, selectors 284 and 286, and a full adder 285.

The inverter 283 inverts DATA[0] and supplies the value to the selector 284. The selector 284 selects either DATA[0] or the inverted value from the inverter 283 in accordance with the subtraction control signal SUB, and inputs the selected value to an input terminal A of the full adder 285.

The selector 286 selects one of the Sout[0] and the logical value "0" held in the corresponding memory cell 274 in accordance with the initialization signal INI, and inputs the selected value to an input terminal B of the full adder 285.

The full adder 285 performs addition of the same digit of binary number in consideration of carry. The full adder 285 includes the above-described input terminals A and B, an input terminal X, and output terminals S and C. A carry input signal Xin[0] is input to the input terminal X. Furthermore, the output signal Sout[0] is output from the output terminal S to the corresponding memory cell 274. From the output terminal C, the carry output signal Cout[0] is output to the input terminal X of the full adder 285 at the subsequent stage. A truth table of the full adder 285 is similar to general full adders. Furthermore, the configuration of the adder circuit 282 of the second and subsequent stages is similar to that of the first stage.

With the configuration illustrated in FIGS. 10 and 11, the arithmetic circuit 280 inverts the sign of the first P-phase data (reset level) in accordance with the initialization signal INI and the subtraction control signal SUB, and causes the data to be held in the memory 273. Subsequently, in accordance with the subtraction control signal SUB, the arithmetic circuit 280 inverts the sign of the P-phase data of the second and subsequent times and adds the inverted value and the data held in the memory 273 together, and then, updates the memory 273 with the sum.

Next, the arithmetic circuit 280 adds the D-phase data (signal level) of the first time and the data held in the memory 273 together, and updates the memory 273 with the sum. Here, since the sign of the P-phase data is inverted, the difference between the D-phase data of the first time and the P-phase data is calculated. Since the P-phase data includes fixed pattern noise and reset noise, the noise can be removed by calculating the difference.

Subsequently, the arithmetic circuit 280 adds the D-phase data of the second and subsequent times and the data held in the memory 273 together, and updates the memory 273 with the sum. By this summation, it is possible to obtain a value equivalent to an average value of the results of the two times of CDS processing. Note that the arithmetic circuit 280 is not limited to the circuits illustrated in FIGS. 10 and 11 as long as the circuit includes the above-described function.

[Example of Operation of Solid-State Imaging Element]

Figure 12:
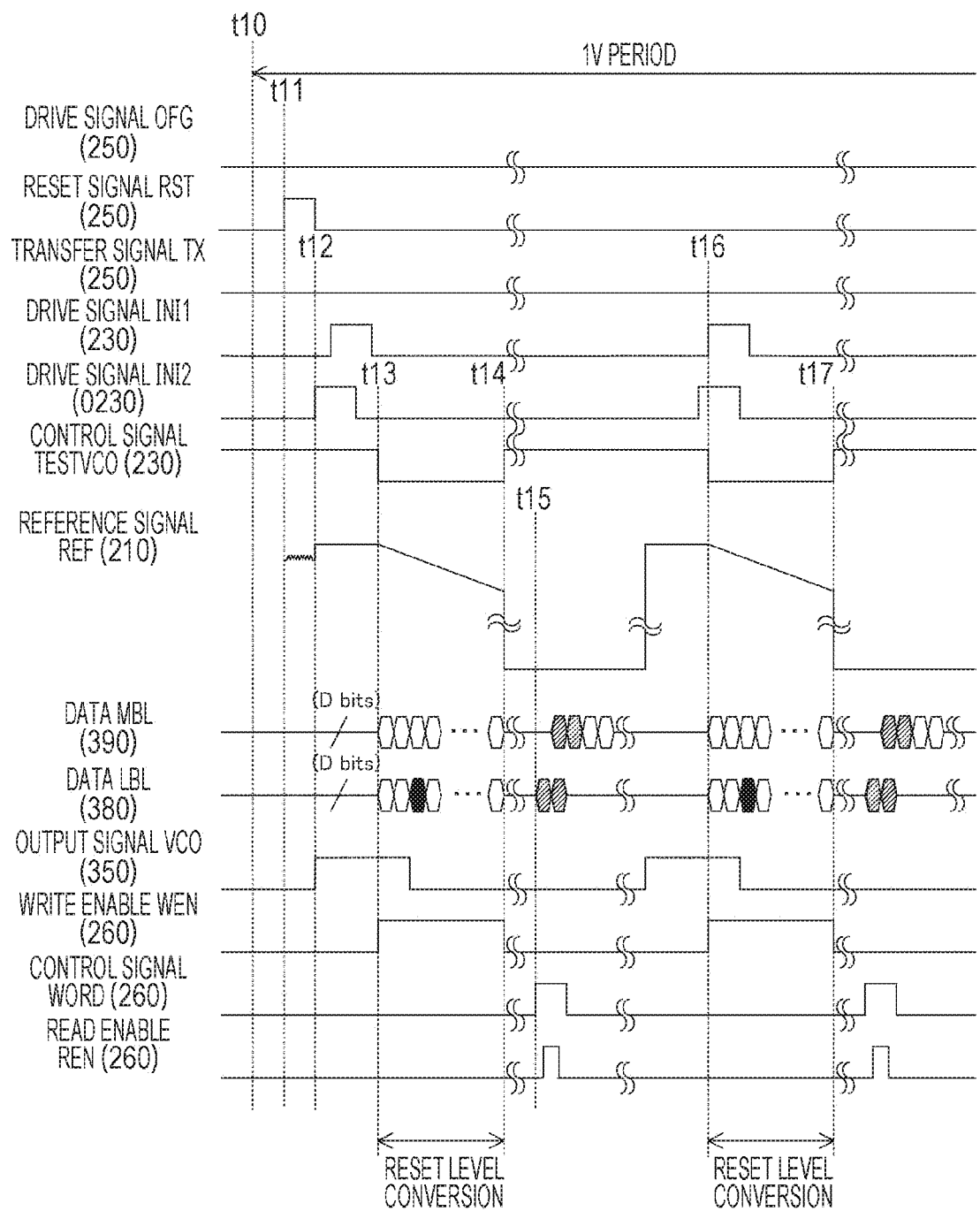
FIG. 12 is a timing chart illustrating an example of sampling processing on a reset level according to the first embodiment of the present technology.

FIG. 12 is a timing chart illustrating an example of sampling processing on a reset level according to the first embodiment of the present technology. At timing t11 immediately after start timing t10 in a 1V period, the pixel drive circuit 250 supplies the reset signal RST. This operation initializes the FD. Here, the 1V period is a period of the vertical synchronization signal. Moreover, it is assumed that the exposure of all the pixels is started immediately before the 1V period.

At timing t12 immediately after timing t11, the vertical drive circuit 230 sequentially supplies the drive signals INI2 and INI1. In addition, the output signal VCO is started to be supplied.

Across timing t13 to timing t14, that is, after timing t12, the DAC 210 decreases the level of the reference signal REF in a slope. Furthermore, over this period, the vertical drive circuit 230 sets the control signal TESTVCO to the low level and the timing generation circuit 260 supplies the write enable WEN set as enable. With such control, the reset level of the first time is AD converted (in other words, sampled).

Furthermore, the positive feedback circuit 350 outputs the output signal VCO on the basis of a result of comparison between the reference signal REF and the reset level. The value of the output signal VCO is sequentially held in the latch circuits 380 as many as the number of bits D (for example, 15) of the D-phase data. The held values are transferred to the bidirectional buffer 390 via the D bit lines LBL. The filled portion on the bit line LBL indicates the data when the output signal VCO is inverted.

At timing t15 after timing t14, the timing generation circuit 260 outputs the control signal WORD and outputs the read enable REN that is set to enable. With this configuration, P-phase data is transferred from the bidirectional buffer 390 to the repeater 361 via the D bit lines MBL.

Next, under the similar control to the first time, the reset level of the second time is AD converted during a period from timing t16 to timing t17.

Figure 13:
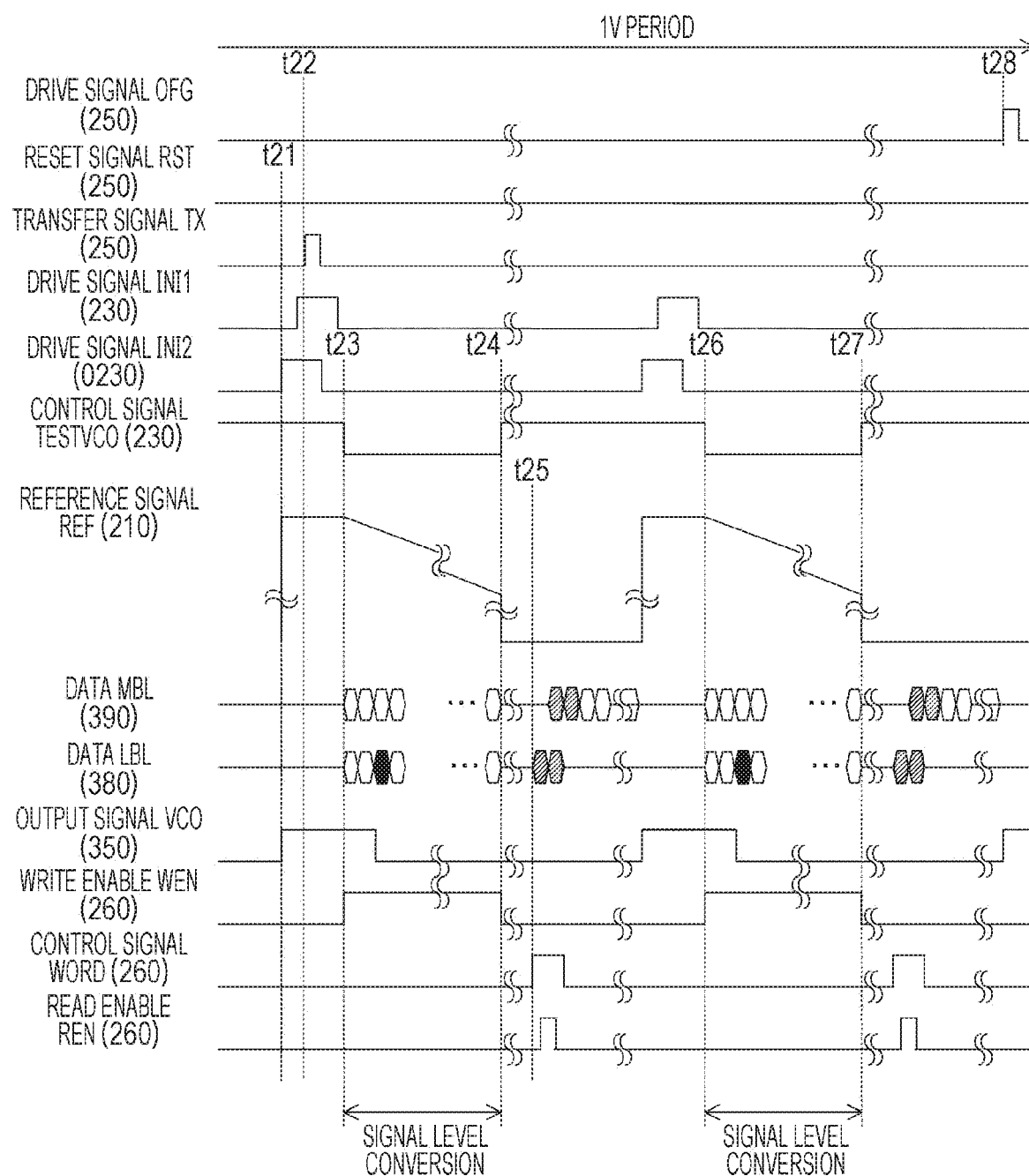
FIG. 13 is a timing chart illustrating an example of sampling processing on a signal level according to the first embodiment of the present technology.

FIG. 13 is a timing chart illustrating an example of sampling processing on a signal level according to the first embodiment of the present technology.

At timing t21 after the reset level conversion, the vertical drive circuit 230 sequentially supplies the drive signals INI2 and INI1. Furthermore, at timing t22 immediately thereafter, the pixel drive circuit 250 supplies the transfer signal TX to all the pixels. This completes the exposure.

Across timing t23 to timing t24, that is, after timing t22, the DAC 210 decreases the level of the reference signal REF in a slope. Furthermore, over this period, the vertical drive circuit 230 sets the control signal TESTVCO to the low level and the timing generation circuit 260 supplies the write enable WEN set as enable. With such control, the signal level of the first time is AD converted (in other words, sampled).

Furthermore, the positive feedback circuit 350 outputs the output signal VCO on the basis of a result of comparison between the reference signal REF and the signal level. The value of the output signal VCO is sequentially held in the D latch circuits 380. The held values are transferred to the bidirectional buffer 390 via the D bit lines LBL. The filled portion on the bit line LBL indicates the data when the output signal VCO is inverted.

At timing t25 after timing t24, the timing generation circuit 260 outputs the control signal WORD and outputs the read enable REN that is set to enable. With this configuration, D-phase data is transferred from the bidirectional buffer 390 to the repeater 361 via the D bit lines MBL.

Next, under the similar control to the first time, the second signal level is AD converted during a period from timing t26 to timing t27. At the subsequent timing t28, the pixel drive circuit 250 supplies the drive signal OFG to all the pixels. This starts next exposure.

As illustrated in FIGS. 12 and 13, the reset level and the signal level are individually sampled twice. One that the number of sampling is not limited to two, and may be three or more.

Figure 14:
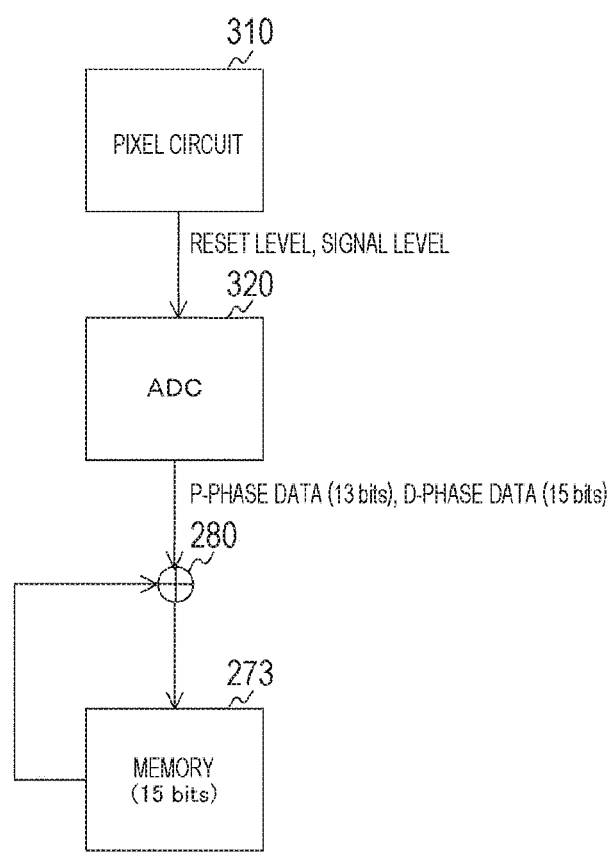
FIG. 14 is a block diagram illustrating a configuration example of a pixel and the output unit according to the first embodiment of the present technology.

FIG. 14 is a block diagram illustrating a configuration example of the pixel 300 and the output unit 270 according to the first embodiment of the present technology. The pixel circuit 310 in the pixel 300 sequentially generates the reset level and the signal level individually by N times (for example, "twice"). The ADC 320 in each of the pixels 300 converts the reset levels and signal levels into P-phase data and D-phase data respectively and outputs the data to the output unit 270.

The arithmetic circuit 280 in the output unit 270 inverts the sign of the first P-phase data and holds the data in the memory 273. Subsequently, the arithmetic circuit 280 inverts the sign of the P-phase data of the second and subsequent times and adds the inverted value and the data held in the memory 273 together, and then, updates the memory 273 with the sum.

Next, the arithmetic circuit 280 adds the D-phase data of the first time and the data held in the memory 273 together, and updates the memory 273 with the sum (that is, a difference between the P-phase data and the D-phase data). Subsequently, the arithmetic circuit 280 adds the D-phase data of second and subsequent times and the data (difference) held in the memory 273 together, and updates the memory 273 with the sum. Next, the sum is output from the pixel 300 as the pixel data after CDS processing.

For example, it is assumed that the data size of P-phase data is 13 bits, and the data size of D-phase data is 15 bits, for example. Furthermore, the number of sampling times N of each of the reset level and the signal level is set to two, for example. In this case, the data size of the difference between the first P-phase data and the first D-phase data is 14 bits. The similar is true for the second difference. Since the memory 273 holds the sum of these differences, its memory capacity is 15 bits.

Figure 15A:
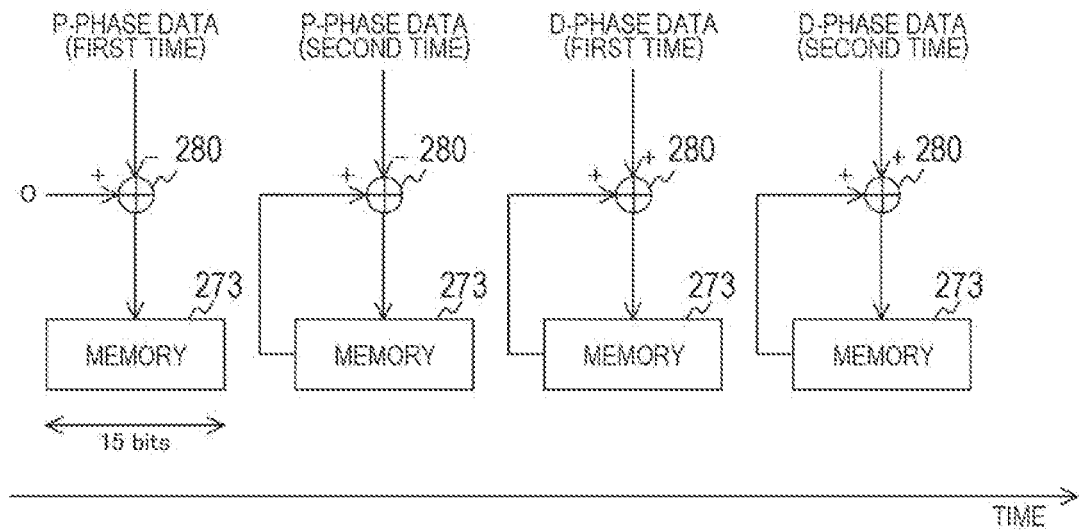
FIGS. 15A and 15B are diagrams illustrating CDS processing in each of the first embodiment of the present technology and the comparative example.
Figure 15B:
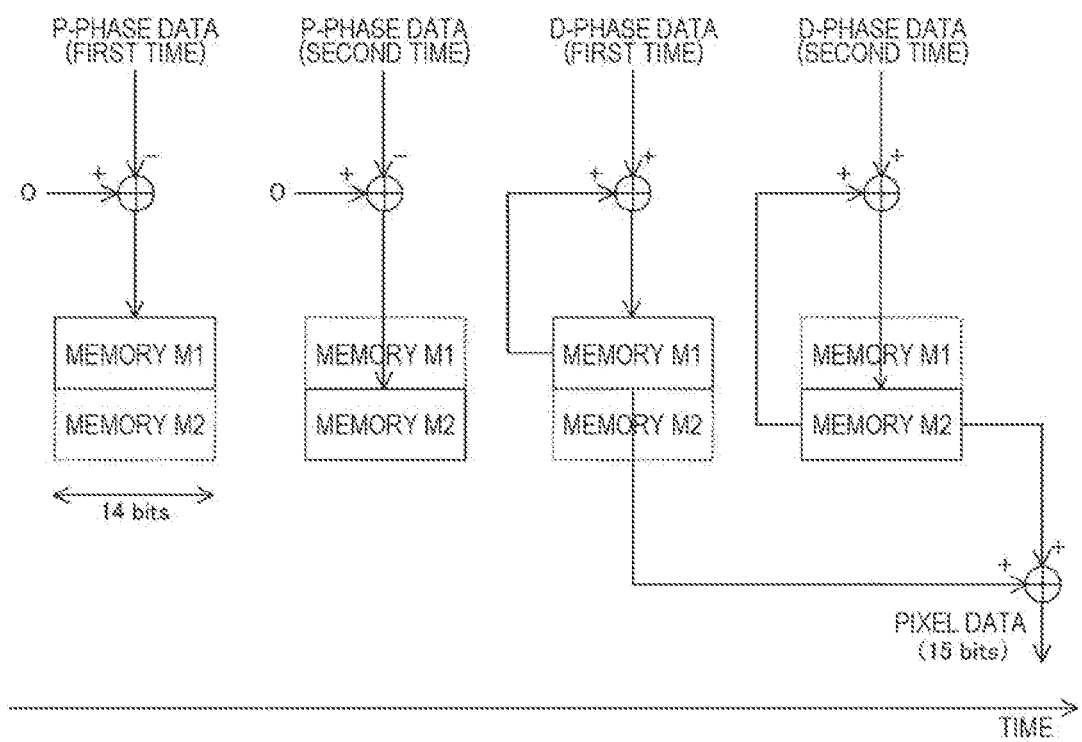

FIGS. 15A and 15B are diagrams illustrating CDS processing in each of the first embodiment of the present technology and a comparative example. FIG. 15A is a diagram illustrating the CDS processing in the first embodiment of the present technology, and FIG. 15B is a diagram illustrating the CDS processing in the comparative example. In this comparative example, it is assumed that the arithmetic circuit writes the P-phase data and D-phase data of the first time in a certain memory and writes the P-phase data and D-phase data of the second time in another memory.

As illustrated in FIG. 15A, the arithmetic circuit 280 inverts the sign of the first P-phase data and causes the memory 273 to hold the data. Subsequently, the arithmetic circuit 280 inverts the sign of the P-phase data of the second time and adds the inverted value and the data held in the memory 273 together, and then, updates the memory 273 with the sum. Subsequently, the arithmetic circuit 280 adds the D-phase data of the first time and the data held in the memory 273 together, and updates the memory 273 with the sum. Subsequently, the arithmetic circuit 280 adds the second D-phase data and the data held in the memory 273 together, and updates the memory 273 with the sum.

In this manner, the arithmetic circuit 280 holds, in the memory 273, a value obtained by adding the inverted value of the P-phase data of the first and second times and holds the sum of the D-phase data of the first and second times. In other words, a value obtained by adding the difference between the P-phase data and the D-phase data of the first time, and the difference of the second time thereof together, is held in the memory 273. In this configuration, when it is assumed that the number of bits of the difference is 14 bits, the memory capacity per pixel can be as small as 15 bits.

Meanwhile, as illustrated in FIG. 15B as the comparative example, the arithmetic circuit inverts the sign of the first P-phase data and causes a memory M1 to hold the data, and the arithmetic circuit inverts the sign of the second P-phase data and causes a memory M2 to hold the data. Next, the arithmetic circuit adds the D-phase data of the first time and the data held in the memory M1 together, and updates the memory M1 with the sum (difference). Subsequently, the arithmetic circuit adds the second D-phase data and the data held in the memory M2 together, and updates the memory M2 with the sum (difference). Then, the arithmetic circuit adds the difference held in the memory M1 and the difference held in the memory M2 and outputs the result as pixel data. In this manner, the memory capacity of each of memories is 14 bits so that the difference (14 bits) of the first time is held in the memory M1 and the difference (14 bits) of the second time is held in the memory M2. That is, the total capacity required for the memory for each of pixels would be as much as 28 bits.

Accordingly, when the number of pixels is H×V, a memory capacity necessary in the comparative example is H×V×28 bits, whereas a memory capacity of H×V×15 bits is sufficient in the output unit 270. In this manner, the memory capacity can be greatly reduced.

Figure 16:
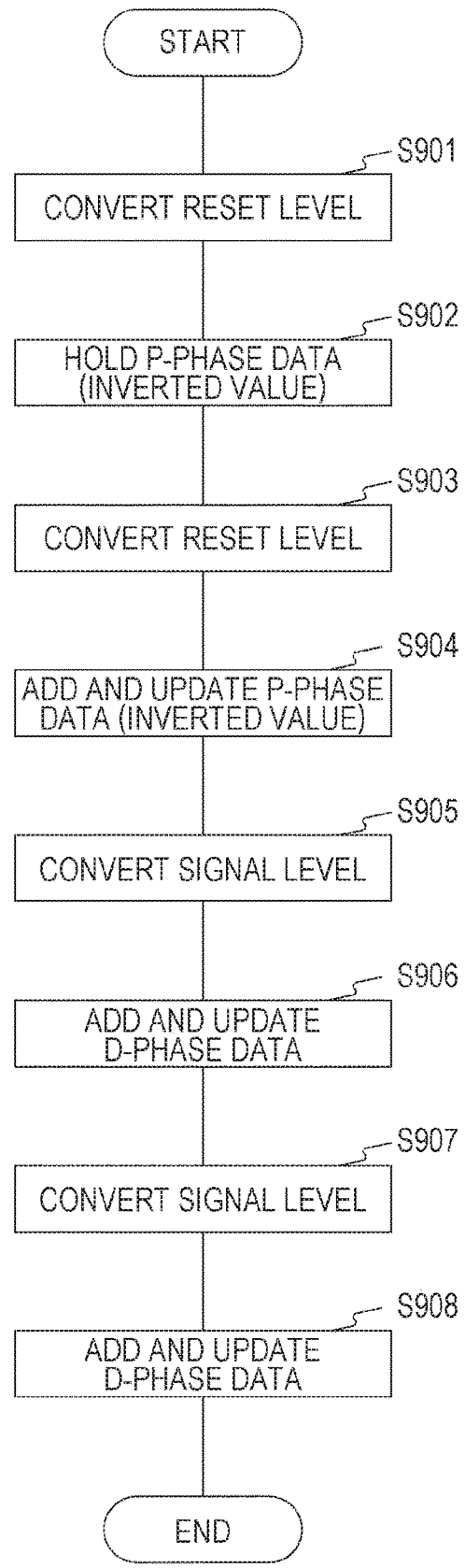
FIG. 16 is a flowchart illustrating an example of CDS processing in the first embodiment of the present technology.

FIG. 16 is a flowchart illustrating an example of CDS processing in the first embodiment of the present technology.

This CDS processing is started when the vertical synchronization signal rises, for example. The pixel 300 generates the reset level of the first time and converts the signal into P-phase data (step S901). The output unit 270 inverts the sign of the P-phase data and holds the data in the memory 273 (step S902). Next, the pixel 300 generates the reset level of the second time and converts the signal into P-phase data (step S903). The output unit 270 inverts the sign of the second P-phase data, adds the data to the data held in the memory 273, and updates the memory 273 with the sum (step S904).

Next, the pixel 300 generates the signal level of the first time and converts the signal into D-phase data (step S905). The output unit 270 adds the D-phase data of the first time and the data held in the memory 273 together, and updates the memory 273 with the sum (step S906). Subsequently, the pixel 300 generates the second signal level and converts the signal into D-phase data (step S907). The output unit 270 adds the second D-phase data and the data held in the memory 273 together, and updates the memory 273 with the sum. The sum is output as pixel data (step S908). After execution of step S908, the solid-state imaging element 200 finishes the CDS processing.

In this manner, according to the first embodiment of the present technology, the solid-state imaging element 200 holds the value obtained by adding the difference of B bits N times, making it possible to suppress the memory capacity per pixel to $B+\log_2 N$ bits.

2. Second Embodiment

In the above-described first embodiment, the FD is provided for each of photodiodes. In this, however, the number of FDs also increases with the increase in the number of photodiodes. In order to suppress the increase in the number of FDs, for example, there would be preferable to have a configuration in which a plurality of photodiodes share one FD. The solid-state imaging element 200 according to a second embodiment is different from that of the first embodiment in that a plurality of photodiodes shares one FD.

Figure 17:
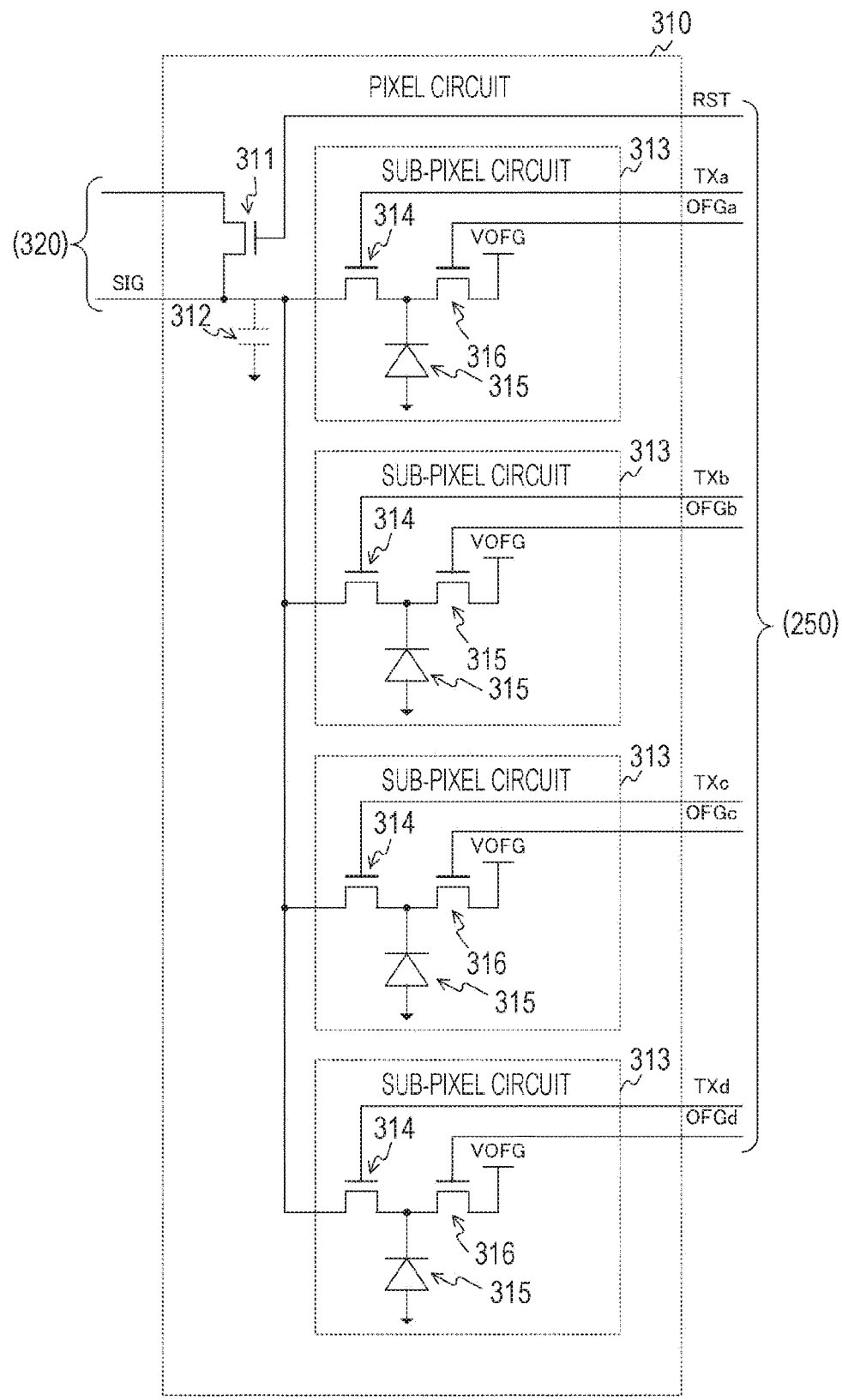
FIG. 17 is a circuit diagram illustrating a configuration example of a pixel circuit according to a second embodiment of the present technology.

FIG. 17 is a circuit diagram illustrating a configuration example of the pixel circuit 310 according to the second embodiment of the present technology. The pixel circuit 310 includes the reset transistor 311 and the FD 312, and four sub-pixel circuits 313. The reset transistor 311 and the FD 312 are shared by these sub-pixel circuits 313. Each of the sub-pixel circuits 313 includes the transfer transistor 314, the photodiode 315, and the discharge transistor 316. These sub-pixel circuits 313 will be referred to as sub-pixels a, b, c, and d. A transfer signal TXa and a drive signal OFGa from the pixel drive circuit 250 are input to the sub-pixel a. A transfer signal TXb and a drive signal OFGb are input to the sub-pixel b, and a transfer signal TXc and a drive signal OFGc are input to the sub-pixel c. A transfer signal TXd and a drive signal OFGd are input to the sub-pixel d. The transfer transistor 314 in the sub-pixel circuit 313 transfers a charge to the FD 312 in accordance with a corresponding transfer signal. Note that a circuit including the four transfer transistors 314 is an example of a transfer part described in the claims.

The pixel drive circuit 250 sequentially supplies drive signals OFGa, OFGb, OFGc, and OFGd to all the pixels at the start of exposure and supplies the reset signal RST. Moreover, the pixel drive circuit 250 sequentially supplies the transfer signals TXa, TXb, TXc, and TXd to all pixels at the end of exposure. The exposure times on individual sub-pixel circuits 313 are assumed to be the same.

Note that although the four sub-pixel circuits 313 share one FD 312, the number of sub-pixel circuits 313 sharing the FD 312 is not limited to four, and may be two or other numbers.

In this manner, in the second embodiment of the present technology, the plurality of photodiodes 315 shares one FD 312, making it possible to suppress an increase in the number of FDs 312.

3. Third Embodiment

In the second embodiment described above, the exposure times on the individual sub-pixel circuits 313 are the same. This, however, might lead to insufficient dynamic range under natural light or the like. In order to increase the dynamic range, for example, the four sub-pixel circuits 313 may be exposed with mutually different exposure times, and pixel data of a long exposure time and pixel data of a short exposure time may be combined with each other. Such image composition is referred to as high dynamic range composition. The solid-state imaging element 200 according to the third embodiment is different from that of the second embodiment in that high-dynamic range composition is performed.

Figure 18:
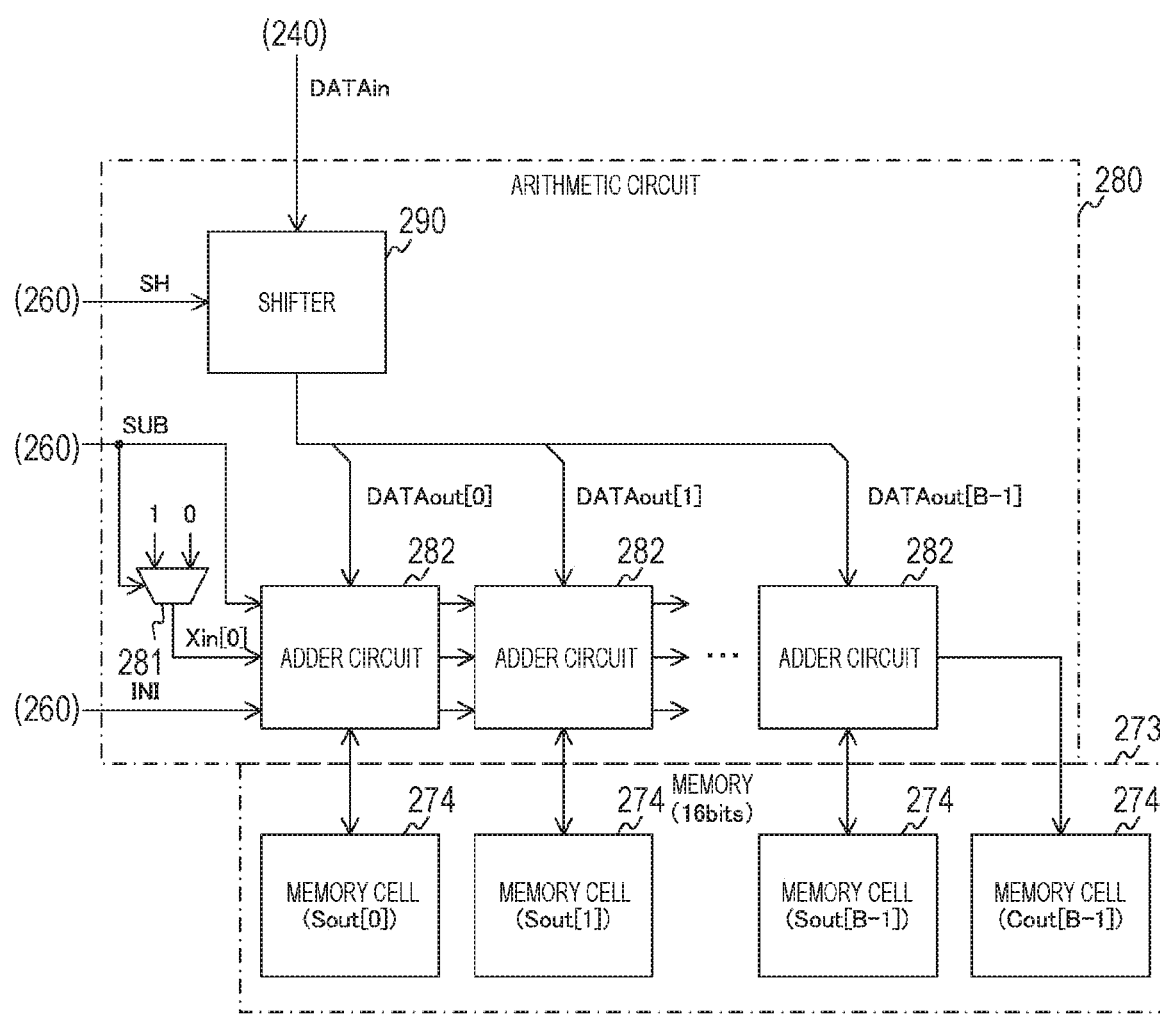
FIG. 18 is a block diagram illustrating a configuration example of an arithmetic circuit and a memory according to a third embodiment of the present technology.

FIG. 18 is a block diagram illustrating a configuration example of the arithmetic circuit 280 and the memory 273 according to the third embodiment of the present technology. The arithmetic circuit 280 of the third embodiment is different from that of the second embodiment in that it further includes a shifter 290.

The shifter 290 shifts data DATAin from the pixel array unit 240 to the left (in other words, multiplies it by a power of 2) in accordance with a shift control signal SH from the timing generation circuit 260. As the amount of shift, a value corresponding to the ratio (exposure ratio) of the exposure time is set. The shifter 290 outputs the shifted data to the adder circuit 282 as DATAout.

Here, it is assumed that Ea, Eb, Ec, and Ed be the exposure times of sub-pixels a, b, c, and d, respectively. For these exposure times, for example, values satisfying the following expressions are to be set.

$Ec=2\times Ed$ $Eb=2\times Ec=4\times Ed$ $Ea=2\times Eb=8\times Rd$

In this manner, in a case where the ratio (exposure ratio) of the other exposure time to the minimum exposure time is set to the power of 2 (2, 4, and 8), the multiplication can be performed by shift operation. For example, DATAin from sub-pixel b is left-shifted by one bit. Furthermore, DATAin from sub-pixel c is left-shifted by two bits, and DATAin from sub-pixel d is left-shifted by three bits. In contrast, DATAin from sub-pixel a is not shifted.

Note that although the exposure ratio is set to a power of 2, the exposure ratio may be set to a value other than a power of 2. When the exposure ratio is not a power of 2, the arithmetic circuit 280 may include a multiplier instead of the shifter 290 and may multiply by the exposure ratio.

Figure 19:
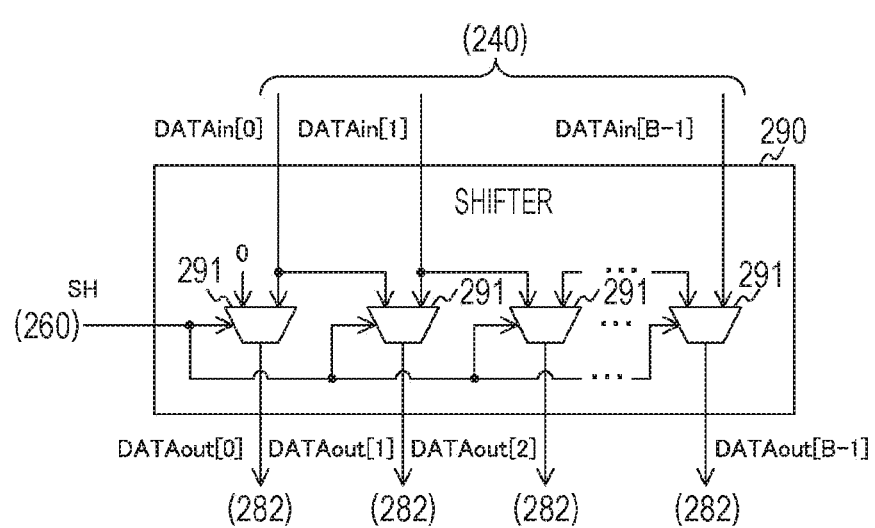
FIG. 19 is a circuit diagram illustrating a configuration example of a shifter according to the third embodiment of the present technology.

FIG. 19 is a circuit diagram illustrating a configuration example of the shifter 290 according to the third embodiment of the present technology. The shifter 290 can shift up to three bits. Here, however, a circuit example that simply performs 1-bit shift will be described. The shifter 290 includes B (15, for example) selectors 291. The b-th selector 291 (b is an integer 0 to B−1) is associated with the b-th bit of DATAin.

The selector 291 corresponding to the 0-th bit selects one of the logical value "0" and DATAin[0] in accordance with the shift control signal SH, and outputs the selected data as DATAout[0]. The selector 291 corresponding to the b-th bit selects one of DATAin[b−1] or DATAin[b] in accordance with the shift control signal SH and outputs the selected data as DATAout[b]. Note that while the left shift shifts the bit to the left with a least significant bit (LSB) positioned at the right end, FIG. 19 illustrates the LSB on the left end for convenience of illustration.

For example, the shift control signal SH indicates whether or not to perform left-shift by one bit. In a case where shifting is not to be performed, the selector 291 corresponding to the b-th bit selects DATAin[b] and outputs the selected data as DATAout[b]. Conversely, in a case where the shifting is to be performed, the selector 291 corresponding to the b-th bit selects DATAin[b−1] or "0" and outputs the selected data as DATAout[b].

Figure 20:
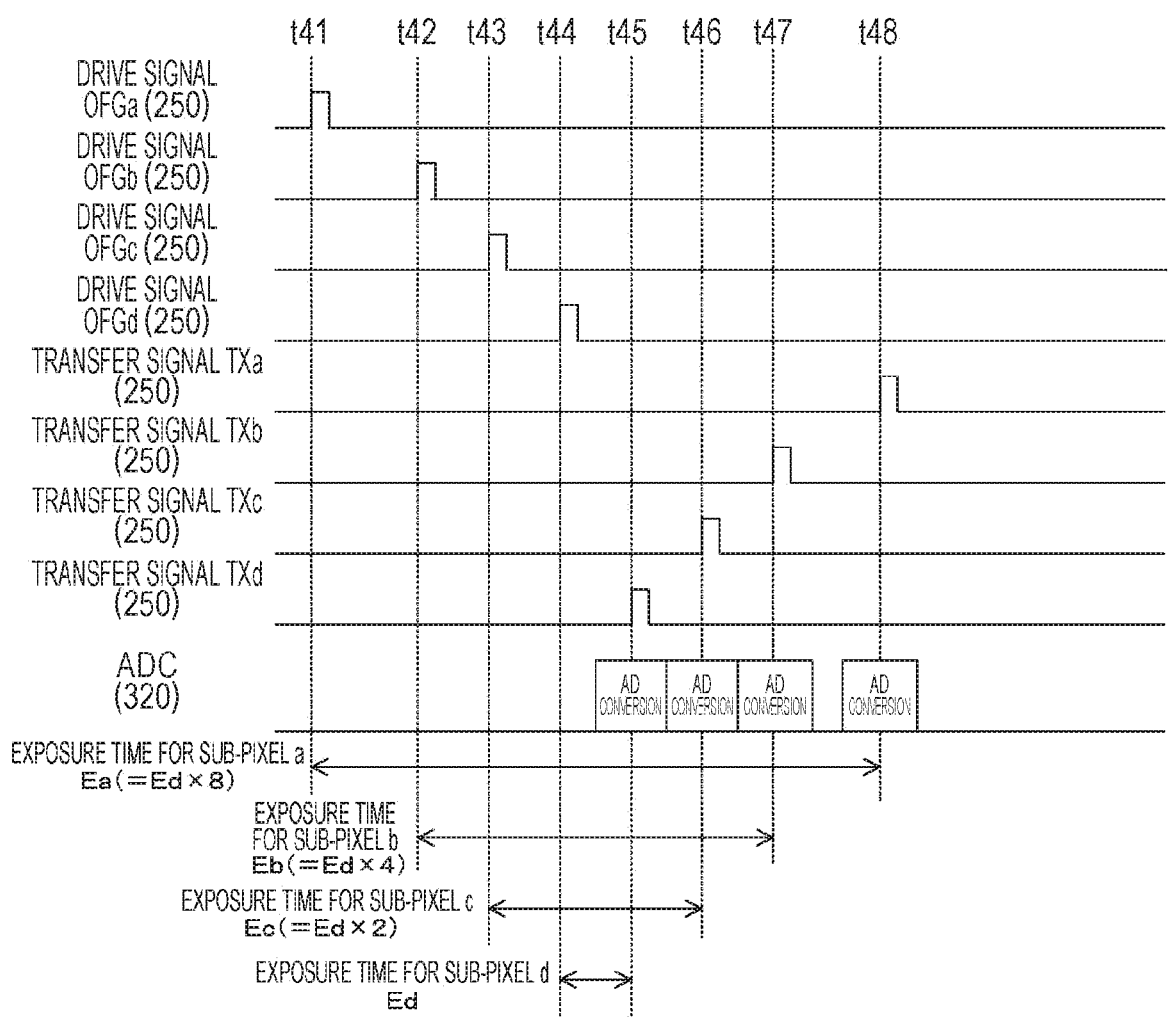
FIG. 20 is a timing chart illustrating an example of driving of a pixel according to the third embodiment of the present technology.

FIG. 20 is a timing chart illustrating an example of driving of the pixel 300 according to the third embodiment of the present technology. The pixel drive circuit 250 outputs the drive signal OFGa at timing t41 of exposure start of the sub-pixel a. At the subsequent timings t42, t43, and t44, the pixel drive circuit 250 sequentially outputs the drive signals OFGb, OFGc, and OFGd. This starts the exposure in the order of the sub-pixels a, b, c, and d.

Subsequently, the pixel drive circuit 250 outputs the drive signal TXd at timing t45 of exposure completion of the sub-pixel d after timing t44. At the subsequent timings t46, t47, and t48, the pixel drive circuit 250 sequentially outputs the drive signals TXc, TXb, and TXd. This completes the exposure in the order of the sub-pixels d, c, b, and a.

Furthermore, the ADC 320 outputs the P-phase data and the D-phase data in the order of the sub-pixels d, c, b, and a.

Figure 21:
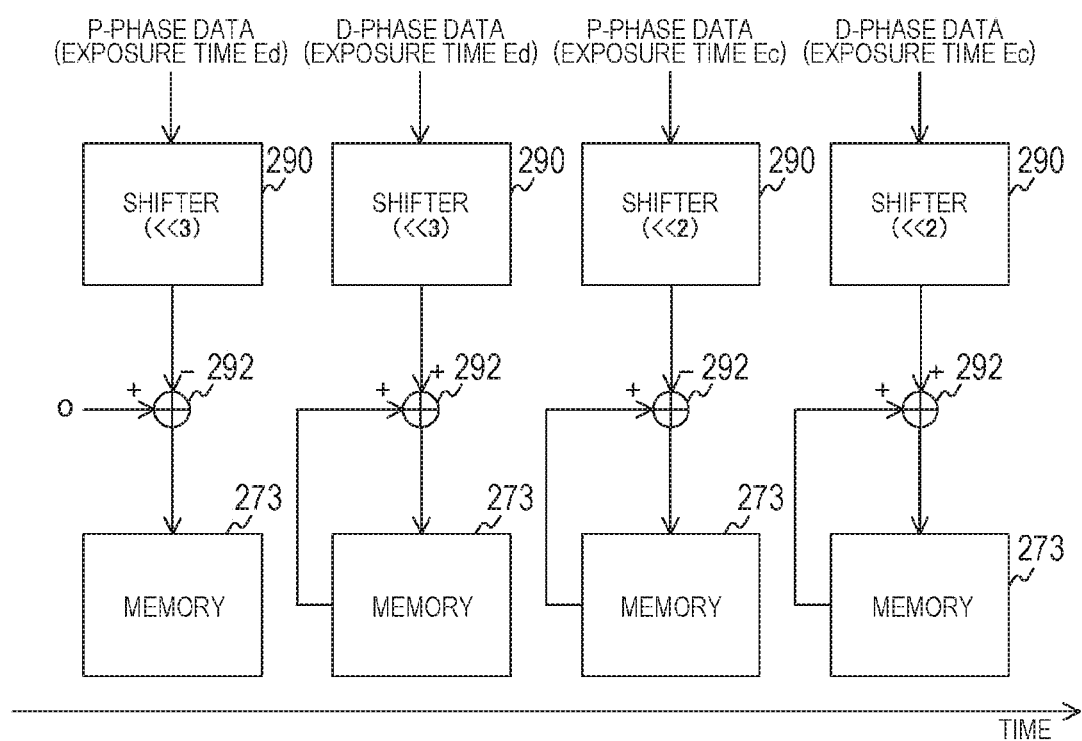
FIG. 21 is a diagram illustrating CDS processing of the first and second times in the third embodiment of the present technology.

FIG. 21 is a diagram illustrating CDS processing of the first and second times in the third embodiment of the present technology. When the P-phase data from the sub-pixel d to which the minimum exposure time Ed is set is input, the shifter 290 left-shifts the data by 3 bits (in other words, multiplies by 8), and an adder 292 inverts the sign of the shifted data and causes the data to be held in the memory 273. Here, the adder 292 is an arithmetic unit including B adder circuits 282. Next, when the D-phase data from the sub-pixel d is input, the shifter 290 left-shifts the data by three bits, the adder 292 adds the data after the shift and the data held in the memory 273 together, and updates the memory 273 with the sum (difference).

Thereafter, when the P-phase data from the sub-pixel c to which exposure time Ec is set is input, the shifter 290 left-shifts the data by two bits. The adder 292 inverts the sign of the shifted data, adds the inverted value and the data held in the memory 273 together, and updates the memory 273 with the sum. Next, when the D-phase data from the sub-pixel c is input, the shifter 290 left-shifts the data by two bits, the adder 292 adds the data after the shift and the data held in the memory 273 together, and updates the memory 273 with the sum.

Figure 22:
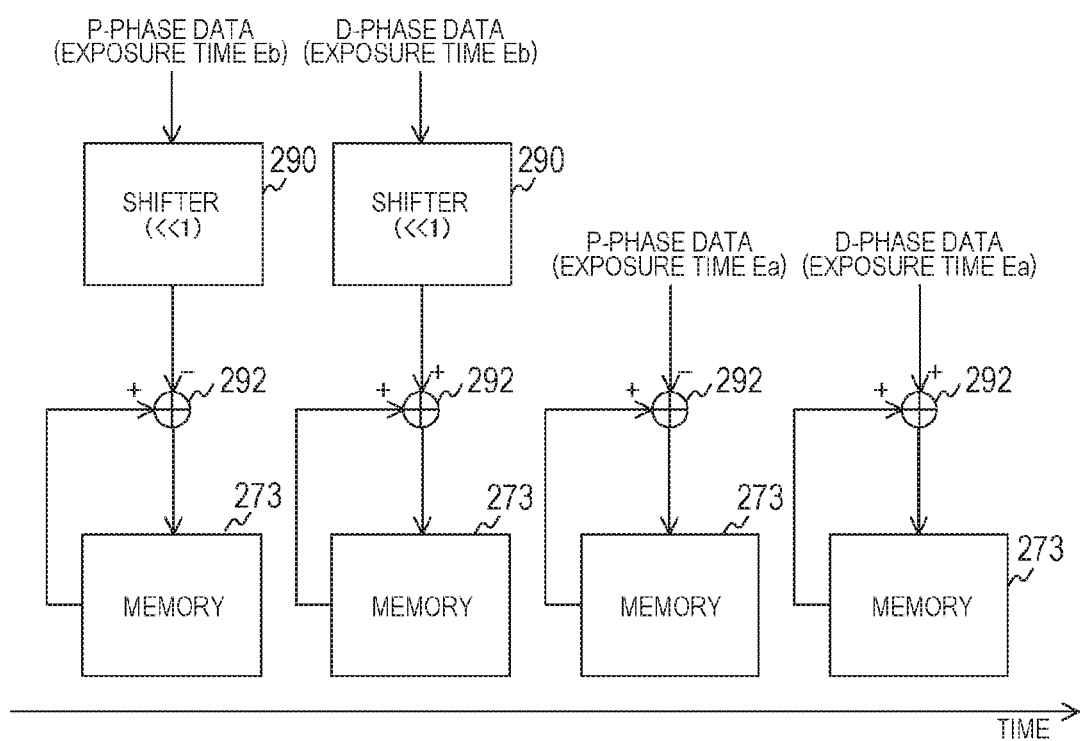
FIG. 22 is a diagram illustrating third and fourth CDS processing in the third embodiment of the present technology.

FIG. 22 is a diagram illustrating third and fourth CDS processing in the third embodiment of the present technology. Thereafter, when the P-phase data from the sub-pixel b to which exposure time Eb is set is input, the shifter 290 left-shifts the data by one bit. The adder 292 inverts the sign of the shifted data, adds the inverted value and the data held in the memory 273 together, and updates the memory 273 with the sum. Next, when the D-phase data from the sub-pixel b is input, the shifter 290 left-shifts the data by one bit, the adder 292 adds the data after the shift and the data held in the memory 273 together, and updates the memory 273 with the sum.

Thereafter, when the P-phase data from the sub-pixel a to which the maximum exposure time Ea is set is input, the shifter 290 outputs the data to the adder 292 without shifting the data. The adder 292 inverts the sign of the data, adds the inverted value and the data held in the memory 273 together, and updates the memory 273 with the sum. Next, when the D-phase data from the sub-pixel a is input, the shifter 290 outputs the data to the adder 292 without shifting the data. The adder 292 adds the data and the data held in the memory 273 together, and updates the memory 273 with the sum.

Figure 23A:
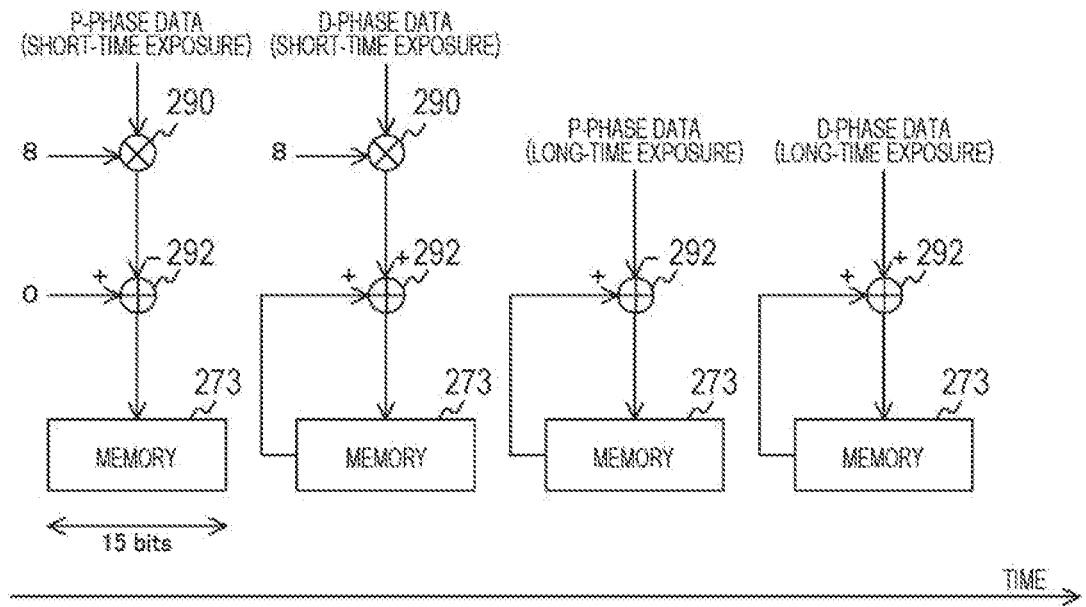
FIGS. 23A and 23B are diagrams illustrating CDS processing in each of the third embodiment of the present technology and the comparative example.
Figure 23B:
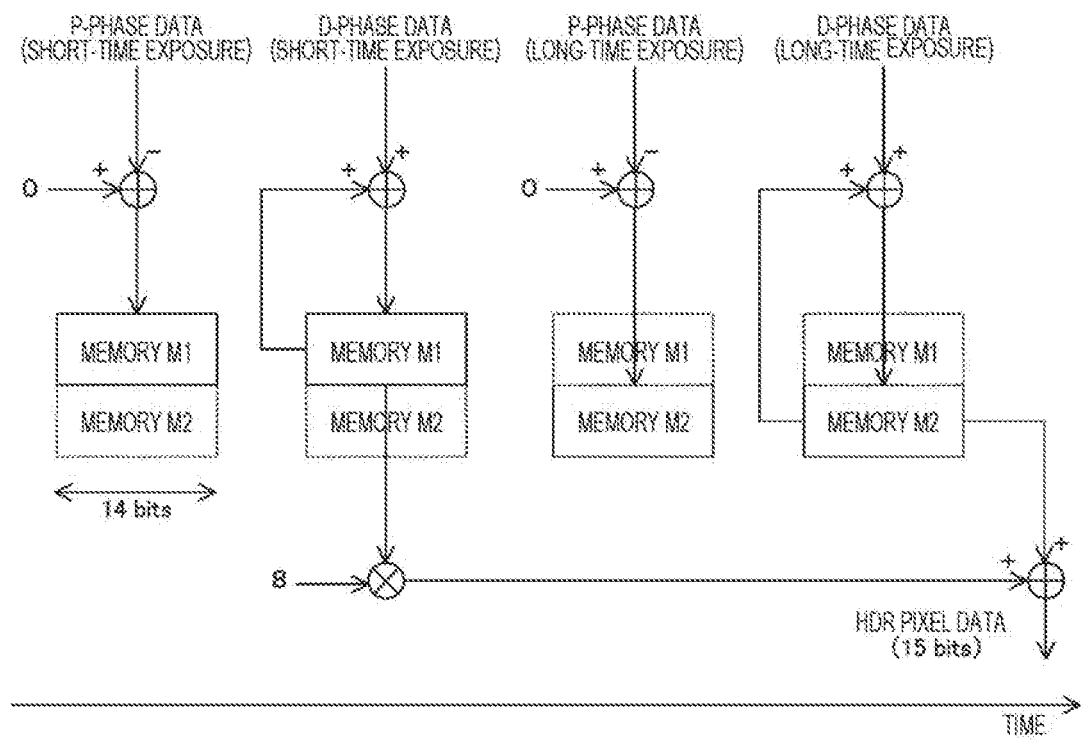

FIGS. 23A and 23B are diagrams illustrating CDS processing in each of the third embodiment of the present technology and the comparative example. In the drawing, FIG. 23A is a diagram illustrating the CDS processing in the third embodiment. Here, in order to simplify the explanation, it is assumed that there are simply two sub-pixels sharing FD, that is, sub-pixels a and d. FIG. 15B is a diagram illustrating CDS processing in the comparative example.

As illustrated in FIG. 23A, when P-phase data from the sub-pixel d with the shorter exposure time is input, the shifter 290 multiplies the P-phase data by an exposure ratio (for example, "8"). The sign of the multiplied value is inverted for the adder 292, and this value is held in the memory 273. Next, when the D-phase data from the sub-pixel d is input, the shifter 290 multiplies the D-phase data by the exposure ratio. The adder 292 adds the multiplied value and the data held in the memory 273 together, and updates the memory 273 with the sum.

Subsequently, when P-phase data from the sub-pixel a with the longer exposure time is input, the adder 292 inverts the sign of the P-phase data and adds the inverted value and the data held in the memory 273 together and updates the memory 273 with the sum. Next, when the D-phase data from the sub-pixel a is input, the adder 292 adds the D-phase data and the data held in the memory 273 together and updates the memory 273 with the sum.

In this manner, the adder 292 adds the difference between the P-phase data and the D-phase data having the shorter exposure time and the difference therebetween having the longer exposure time together, and holds a result in the same memory 273. With this configuration, pixel data having a wide dynamic range can be obtained. When it is assumed that the data size of the difference is 14 bits, the number of sampling times N of the signal level is 2, making it possible to suppress the memory capacity per pixel to as small as 15 bits from the above expression.

In contrast, as illustrated by FIG. 23B, in the comparative example, the arithmetic circuit causes the difference between the P-phase data and the D-phase data having the shorter exposure time to be held in the memory M1, while causes the difference therebetween having the longer exposure time to be held in the memory M2. Next, the arithmetic circuit multiplies the data held in the memory M1 by the exposure ratio, adds the result with the data held in the memory M2, and outputs the result as pixel data. In this configuration, when it is assumed that the data size of the difference is 14 bits, a memory capacity of 28 bits would be required for each of pixels.

Accordingly, when the number of pixels is H×V, a memory capacity necessary in the comparative example is H×V×28 bits, whereas a memory capacity of H×V×15 bits is sufficient in the output unit 270. In this manner, the memory capacity can be greatly reduced.

In this manner, in the third embodiment of the present technology, the difference between the first B bits out of the N exposures with different exposure times and the difference after the second and subsequent times are added together and caused to be held in the memory 273. This makes it possible to suppress the memory capacity per pixel to a value of $B+\log_2 N$.

4. Fourth Embodiment

In the first embodiment described above, the solid-state imaging element 200 performs the sampling of the reset level as many times as the number of times of the sampling of the signal level. However, this configuration would increase the number of times of sampling of the reset level together with an increase in the number of sampling times of the signal level, leading to an increase in power consumption. Here, in a case where the exposure time corresponding to the second and subsequent signal levels is set to be longer than that of the first time, the signal level would be a value obtained by photoelectric conversion of light of high illumination, in which shot noise is dominant. Therefore, at the second and subsequent signal levels, there is little correlation with reset noise even with a correlation between fixed pattern noise and the reset level of the first time. Therefore, performing sampling of the reset level once would not have so much influence on the image quality. The solid-state imaging element 200 according to the fourth embodiment is different from that of the first embodiment in that sampling of the reset level is simply performed once.

Figure 24:
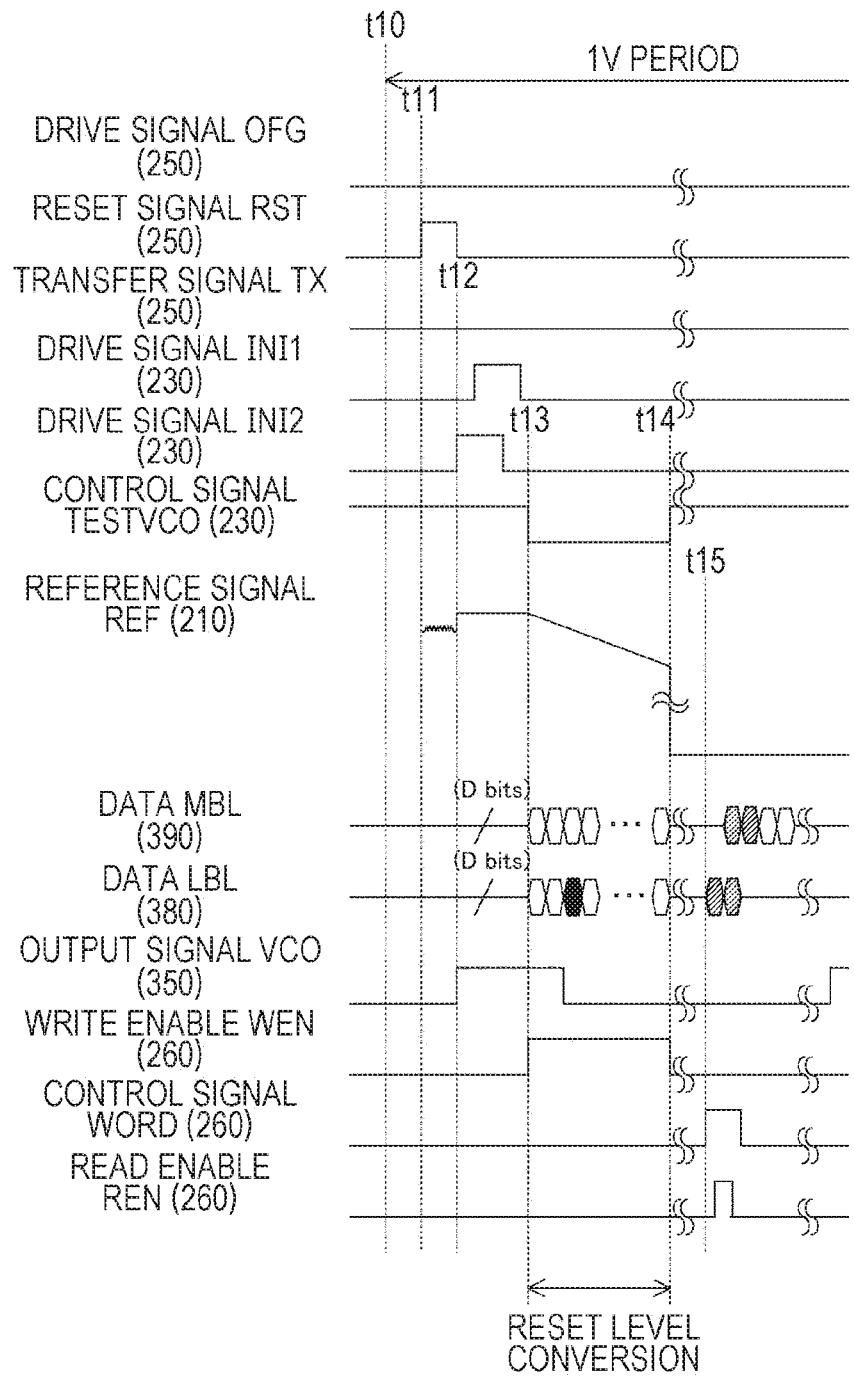
FIG. 24 is a timing chart illustrating an example of sampling processing on a reset level according to a fourth embodiment of the present technology.

FIG. 24 is a timing chart illustrating an example of sampling processing on a reset level according to the fourth embodiment of the present technology. The conversion operation of the first reset level from timing t10 to timing t15 is similar to that of the first embodiment. However, reset levels of the second and subsequent times are not to be generated.

Figure 25:
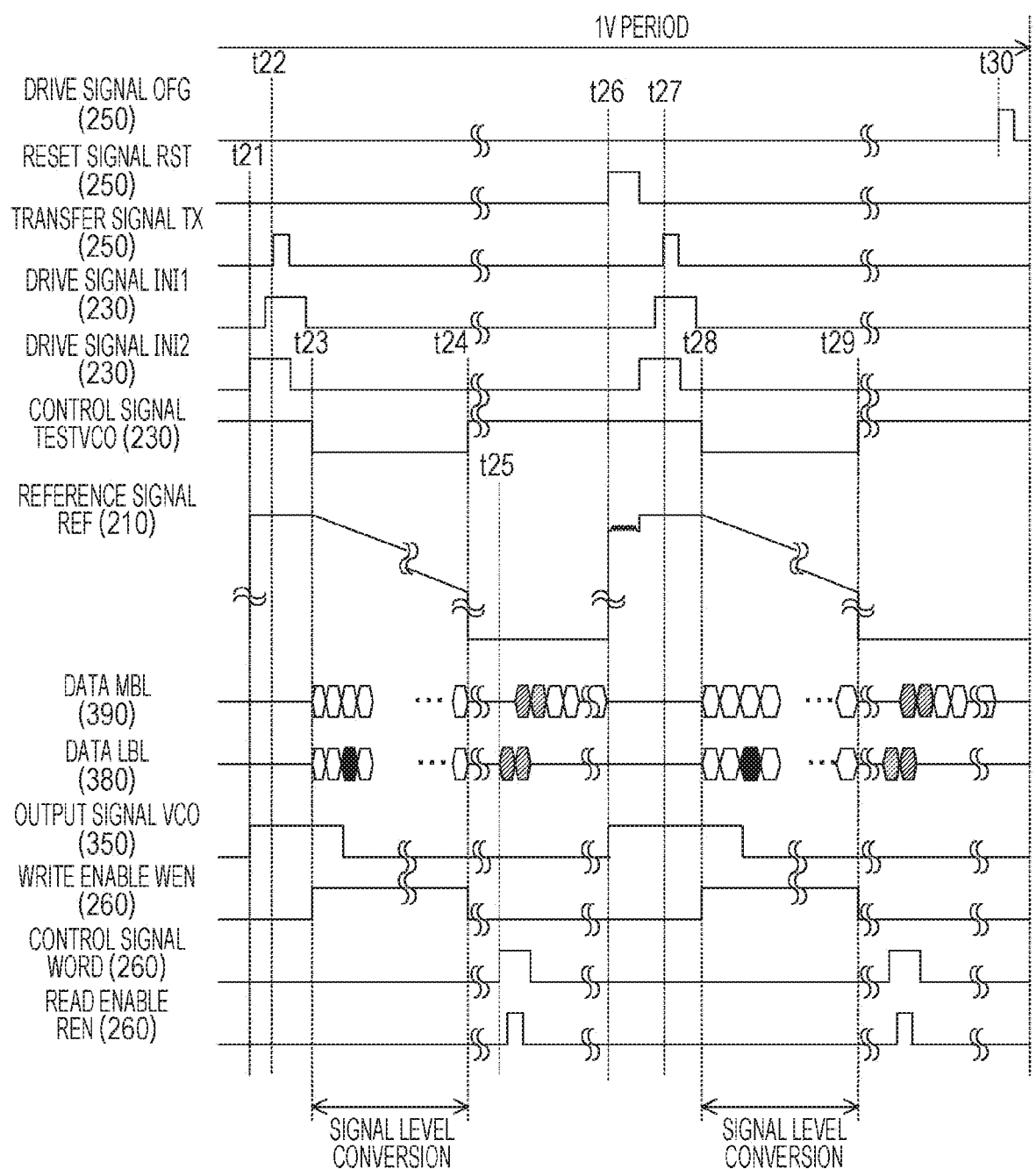
FIG. 25 is a timing chart illustrating an example of sampling processing on a signal level according to the fourth embodiment of the present technology.

FIG. 25 is a timing chart illustrating an example of sampling processing on a signal level according to the fourth embodiment of the present technology. The conversion operation of the signal level of the first time from timing t21 to timing t25 is similar to that of the first embodiment.

At timing t26 after timing t25, the pixel drive circuit 250 outputs the reset signal RST. Next, at timing t27, the pixel drive circuit 250 supplies the transfer signal TX. Here, the exposure time of the first time is a period from the output time point of the drive signal OFG in the previous 1V period to timing t22. The second exposure time is a period from timing t22 to timing t27. The exposure time of the second time is assumed to be longer than the exposure time of the first time.

Next, the second signal level is A/D converted during a period from timing t28 to timing t29. In the conversion of the signal level at the second time, the inclination of the slope of the reference signal REF is the same as the first slope, while the timing generation circuit 260 sets the operating frequency of the clock signal for operating the output unit 270 to be lower than that of the first time in accordance with the exposure ratio. This result in an increase of the voltage value corresponding to one LSB of the AD conversion being larger than that of the first time. That is, the resolution in AD conversion is decreased.

Note that in the case of decreasing the operating frequency of the clock signal, it is allowable to decrease it while maintaining the pulse width, or allowable to change the pulse width at the time of decreasing the operating frequency. At the time of maintaining the pulse width, the duty ratio of the clock signal also changes due to the decrease in operating frequency.

Figure 26:
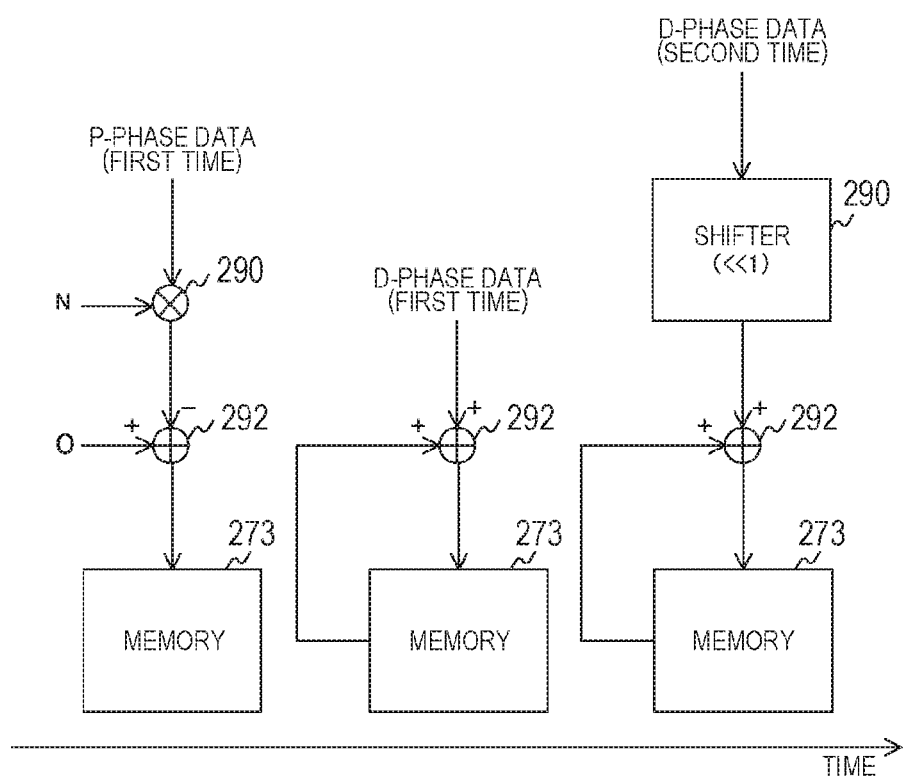
FIG. 26 is a diagram illustrating arithmetic processing including CDS processing in the fourth embodiment of the present technology.

FIG. 26 is a diagram illustrating arithmetic processing including CDS processing in the fourth embodiment of the present technology. The arithmetic circuit 280 of the fourth embodiment includes the shifter 290 and the adder 292 similarly to the third embodiment. When the P-phase data of the first time has been input, the arithmetic circuit 280 inverts the sign of the P-phase data and multiplies the inverted P-phase data by gain (N times) as many times (N times) as reading the D phase using the multiplier 290, and holds the data in the memory 273. Next, when the D-phase data of the first time has been input, the adder 292 adds the D-phase data and the data held in the memory 273 together, and updates the memory 273 with the sum.

Subsequently, when the second D-phase data having a low resolution has been input, the shifter 290 performs left shift by the reduced resolution. Normally, it would be necessary to perform dither processing or the like on the data having different resolutions (here, D-phase data of the first and second times) so as to suppress loss of digital values. Fortunately, however, increasing the resolution at the time of AD conversion at the reset level has an effect of dither processing in natural courses, suppressing the loss of digital values. This can eliminate necessity of performing dither processing or the like.

The adder 292 adds the shifted D-phase data and the data held in the memory 273 together, and updates the memory 273 with the sum. Since the exposure time of this second P-phase data is longer than that of the second time, shot noise becomes dominant, leading to less correlation with reset noise. This eliminates the necessity to perform the second reset sampling, and only one reset sampling is sufficient.

Note that although the number of times of sampling of the signal level is set to 2 times, it may be three times or more. At this time, the arithmetic circuit 280 performs the processing of multiplying the number of times of sampling as the gain before the input of the P-phase data.

In this manner, in the fourth embodiment of the present technology, the solid-state imaging element 200 sets the second exposure time to be longer than the exposure time of the first time, making it possible to reduce the number of sampling times of the reset level. This leads to reduction of the power consumption of the solid-state imaging element 200.

5. Fifth Embodiment

In the above-described first embodiment, the ADC 320 AD-converts a plurality of signal levels with an identical exposure time. This, however, might lead to insufficient dynamic range under natural light or the like. Generally, in order to expand the dynamic range, there is a method of generating pixel data of short-time exposure and pixel data of long-time exposure and combining them. This method, however, includes a problem that the total exposure time of the long time exposure and the short time exposure would be prolonged. The solid-state imaging element 200 according to the fifth embodiment differs from that of the first embodiment in that the dynamic range is expanded while suppressing an increase in exposure time.

Figure 27:
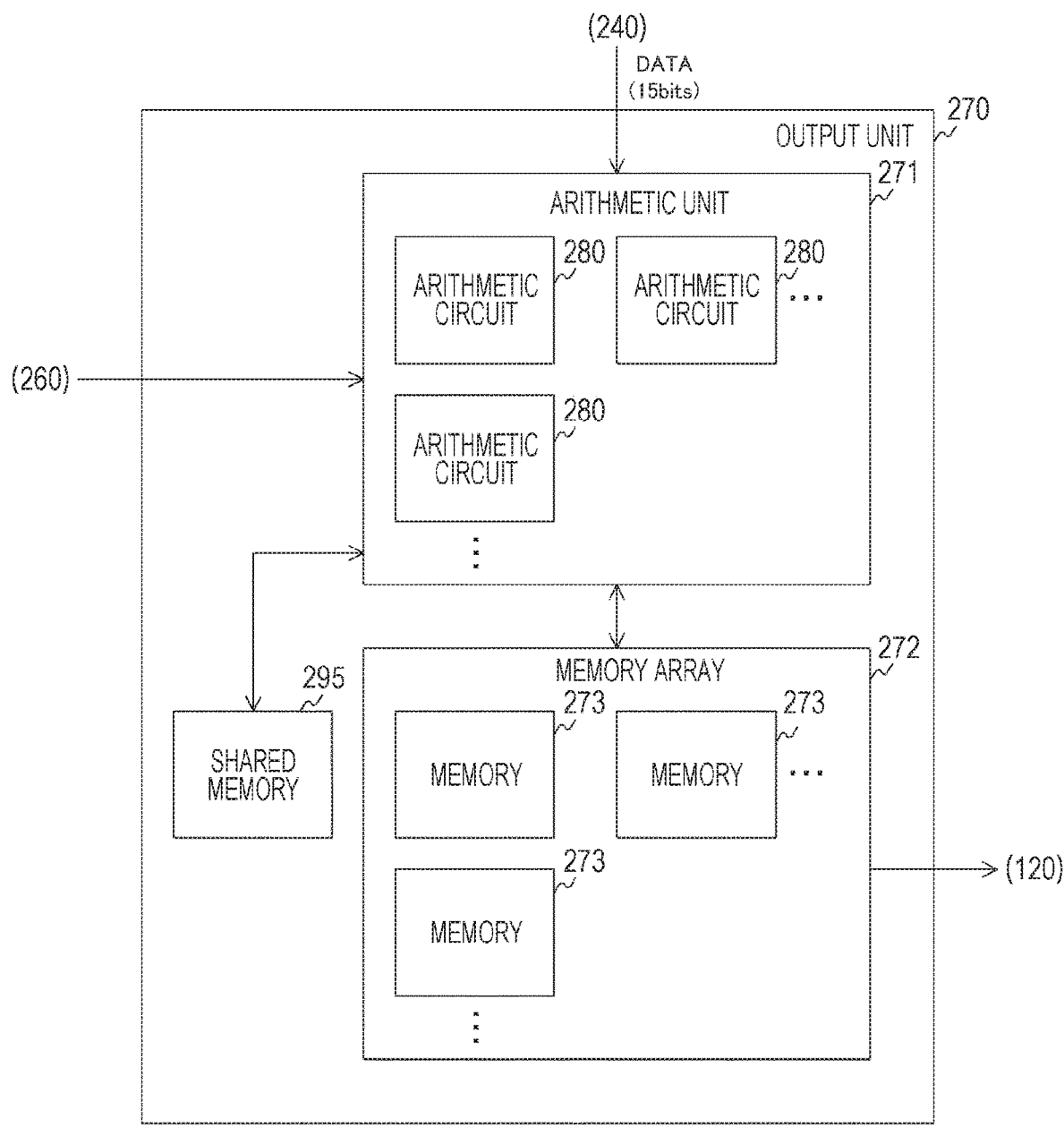
FIG. 27 is a block diagram illustrating a configuration example of an output unit according to a fifth embodiment of the present technology.

FIG. 27 is a block diagram illustrating a configuration example of the output unit 270 according to the fifth embodiment of the present technology. The output unit 270 of the fifth embodiment is different from that of the first embodiment in that it further includes a shared memory 295.

The shared memory 295 is shared by all the arithmetic circuits 280 provided for each of pixels.

Figure 28:
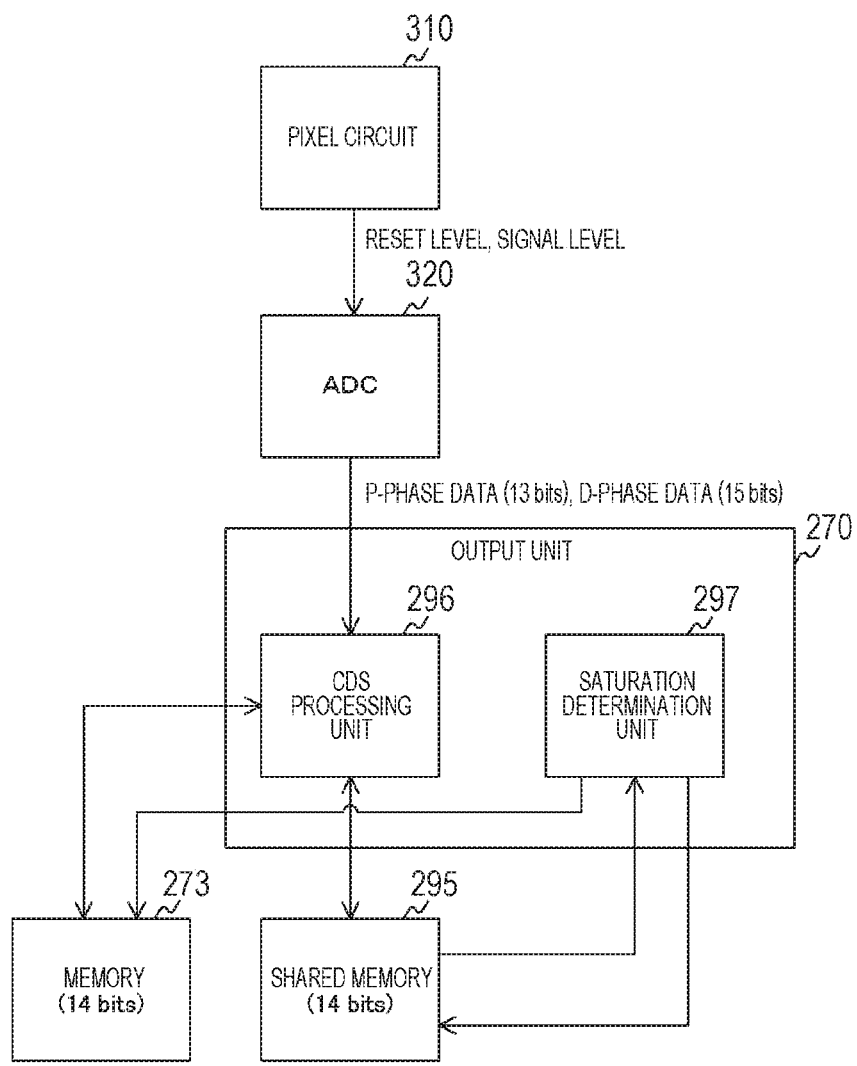
FIG. 28 is a diagram illustrating processing of the output unit according to the fifth embodiment of the present technology.

FIG. 28 is a diagram illustrating processing of the output unit 270 according to the fifth embodiment of the present technology. The pixel circuit 310 generates each of the reset level and the signal level twice. The exposure times of the signal levels for individual times are the same.

The ADC 320 converts the first reset level into P-phase data with a predetermined resolution RL. Next, the ADC 320 converts the reset level of the second time and the signal level of the first time into P-phase data and D-phase data with a resolution RH higher than the resolution RL, respectively. Subsequently, the ADC 320 converts the second signal level into the D-phase data by the resolution RL.

The output unit 270 includes a CDS processing unit 296 and a saturation determination unit 297. The CDS processing unit 296 inverts the sign of the P-phase data of the first time and holds the data in the memory 273, and then, inverts the sign of the P-phase data of the second time, and holds the data in the shared memory 295.

Next, the CDS processing unit 296 adds the first D-phase data and the data held in the shared memory 295 together, and updates the shared memory 295 with the sum. This allows the difference (pixel data) between the second P-phase data and the first D-phase data to be held in the shared memory 295. Note that the shared memory 295 is an example of the second memory described in the claims.

Subsequently, the CDS processing unit 296 adds the second D-phase data and the data held in the memory 273 together, and updates the memory 273 with the sum. This allows the difference (pixel data) between the P-phase data of the first time and the second D-phase data to be held in the memory 273. Note that the memory 273 is an example of the first memory described in the claims.

The saturation determination unit 297 determines whether or not the data (pixel data) held in the shared memory 295 exceeds a full scale (in other words, it is saturated). In a case where the data is saturated, the saturation determination unit 297 initializes the shared memory 295 and causes the data held in the memory 273 to be output as final pixel data. In contrast, in a case where the data is not saturated, the saturation determination unit 297 updates the memory 273 with the data held in the shared memory 295, and causes the data in the updated memory 273 to be output as the final pixel data. Note that although the saturation determination unit 297 determines whether or not the data held in the shared memory 295 exceeds the full scale, the unit may determine whether or not the data exceeds a predetermined value less than the full scale. Furthermore, the saturation determination unit 297 is an example of a determination unit described in the claims.

The pixel data of B (for example, 14) bits are held in each of the memory 273 and the shared memory 295, making it possible to suppress the memory capacity of each of the memories to B bits. Furthermore, the memory 273 is provided for each of pixels, and the shared memory 295 is shared by all the pixels. Accordingly, assuming that the number of pixels is H×V, a total capacity $C_{total}$ of the memory of the output unit 270 as a whole is expressed by the following expression.

$$C_{total}=H \times V \times B+B$$

Figure 29:
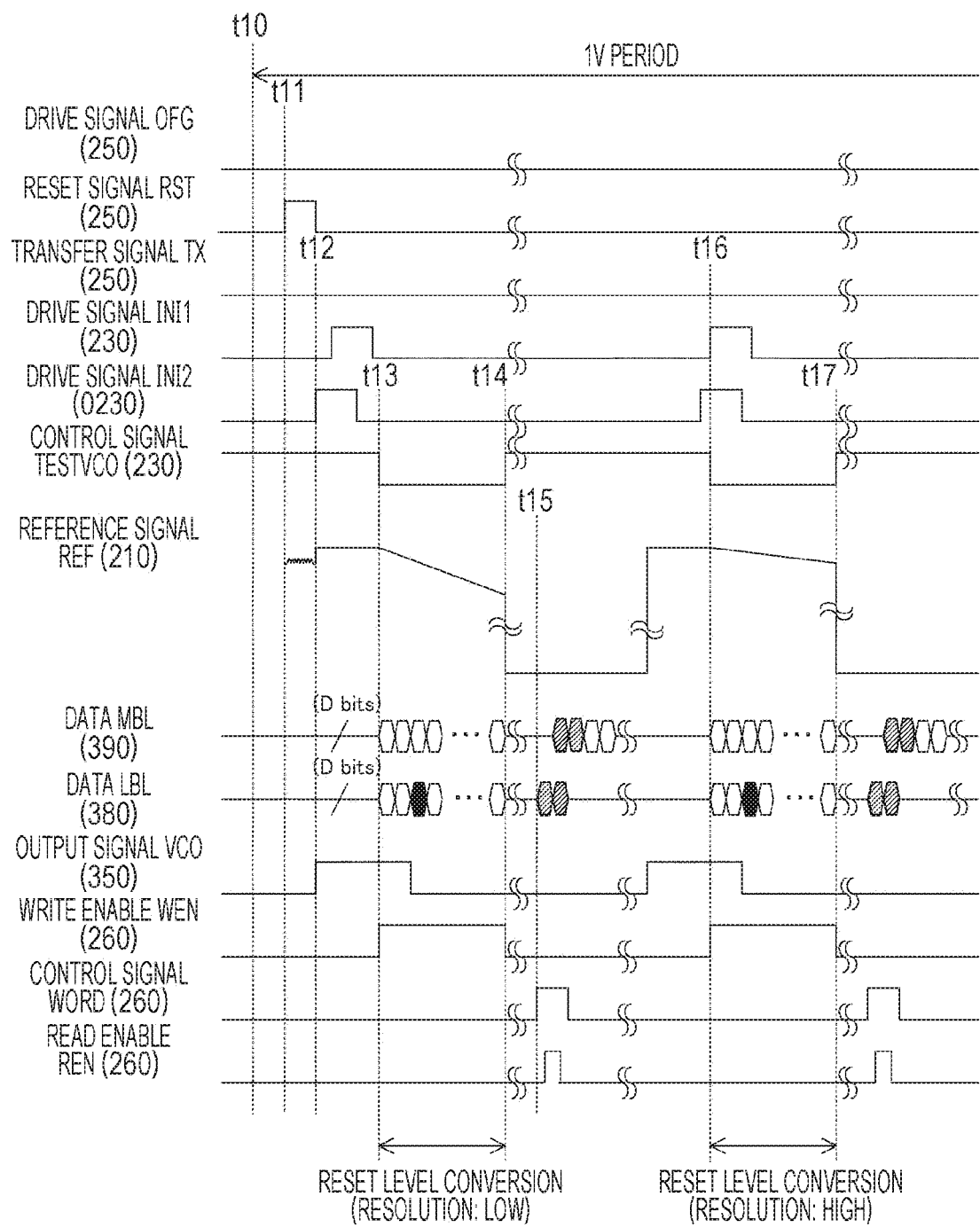
FIG. 29 is a timing chart illustrating an example of sampling processing on a reset level according to the fifth embodiment of the present technology.

FIG. 29 is a timing chart illustrating an example of sampling processing on a reset level according to the fifth embodiment of the present technology. Conversion operation of the reset levels at the first and the second times from timing t10 to timing t17 in the fifth embodiment is similar to the case in the first embodiment. However, in the AD conversion of the second reset level, the DAC 210 makes the inclination of the slope of the reference signal REF gentler than that of the first time. This allows the reset level of the second time to be AD converted with higher resolution than the reset level of the first time.

Figure 30:
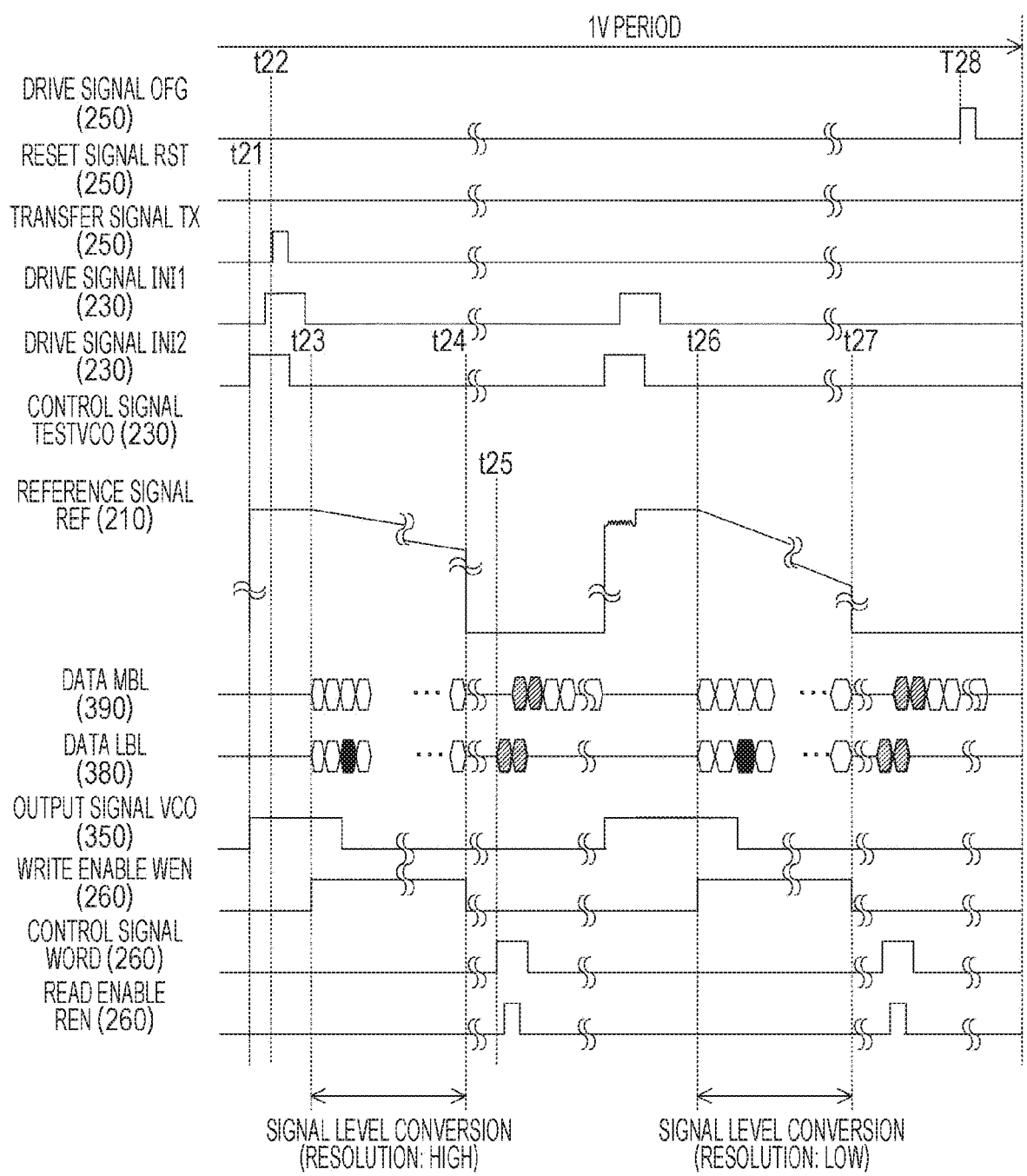
FIG. 30 is a timing chart illustrating an example of sampling processing on a signal level according to the fifth embodiment of the present technology.

FIG. 30 is a timing chart illustrating an example of signal level sampling processing in the fifth embodiment of the present technology. The conversion operation of the signal levels at the first and second times from timing t21 to timing t28 in the fifth embodiment is similar to that in the first embodiment. The difference is in that, in the AD conversion of the signal level at the first time, the DAC 210 makes the inclination of the slope of the reference signal REF gentler than that of the second time. This allows the signal level of the first time to be AD converted with higher resolution than the reset level of the second time.

Figure 31:
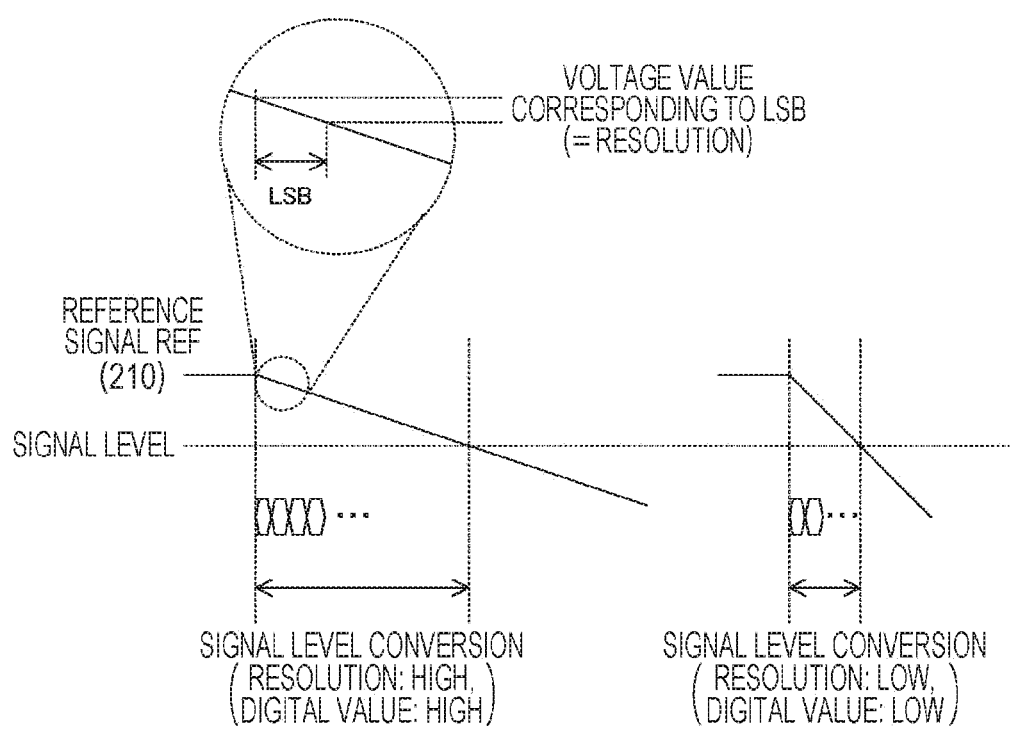
FIG. 31 is a diagram illustrating inclination of a slope in the fifth embodiment of the present technology.

FIG. 31 is a diagram illustrating the inclination of the slope in the fifth embodiment of the present technology. As described above, the ADC 320 repeats the operation of comparing the reference signal and the pixel signal in synchronization with the clock signal during the period in which the reference signal is changing in the slope shape. Therefore, setting the inclination of the slope of the reference signal gentler while the frequency of the clock signal is kept constant would reduce the voltage value corresponding to the LSB. That is, the resolution of the ADC 320 is increased. Furthermore, with the higher resolution, the digital value after conversion becomes larger than with the lower resolution. Accordingly, with the pixel having relatively low illumination outputting pixel data with high resolution (that is, large digital value) and with the pixels with relatively high illumination outputting pixel data with low resolution, it is possible to increase the dynamic range of the entire image data.

Figure 32A:
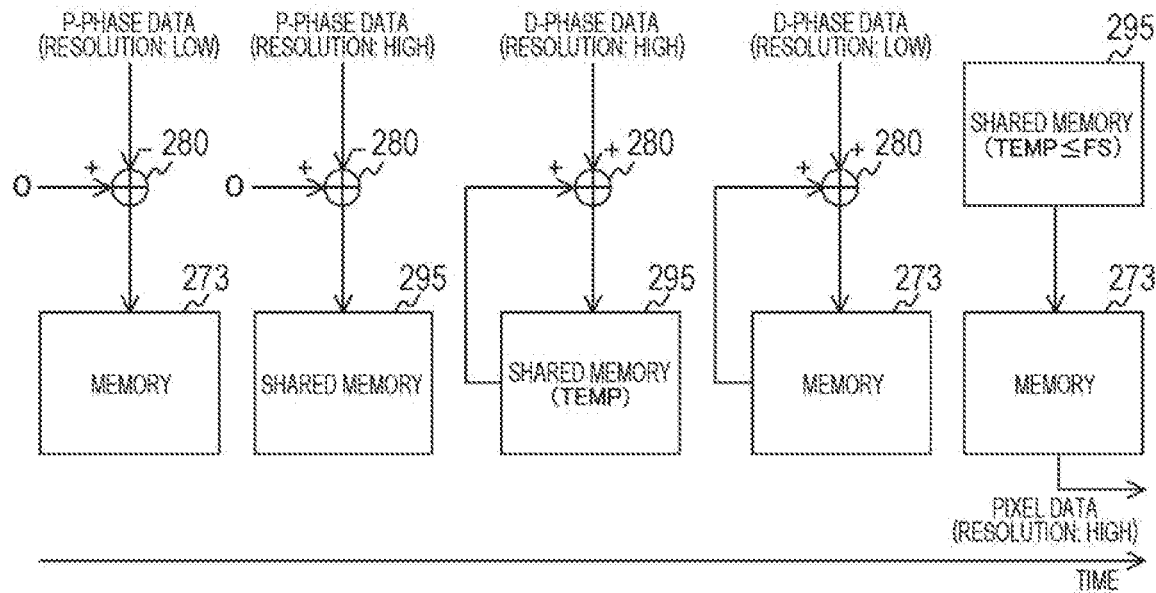
FIGS. 32A and 32B are diagrams illustrating CDS processing in the fifth embodiment of the present technology.
Figure 32B:
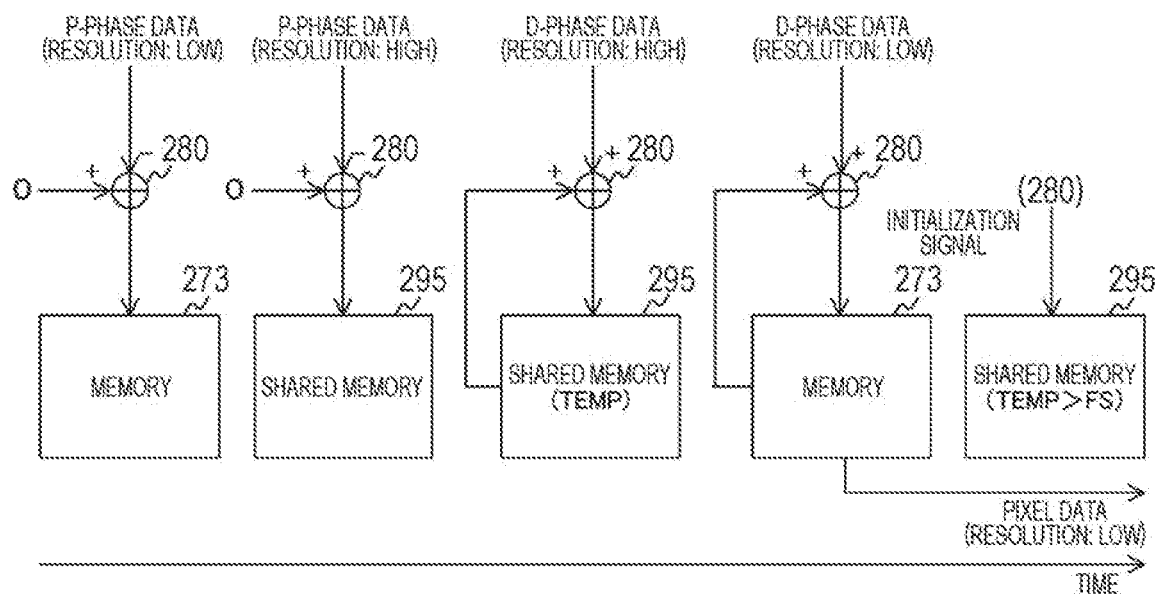

FIGS. 32A and 32B are diagrams illustrating CDS processing in the fifth embodiment of the present technology. FIG. 32A is a diagram illustrating the CDS processing at low illumination, and FIG. 32B is a diagram illustrating the CDS processing at high illumination.

As illustrated in FIG. 32A, the arithmetic circuit 280 inverts the sign of the low-resolution P-phase data of the first time and holds the data in the memory 273, and inverts the sign of the high-resolution P-phase data of the second time and holds the data the shared memory 295.

Subsequently, the arithmetic circuit 280 adds the D-phase data of the first time and the data held in the shared memory 295 together, and updates the shared memory 295 with the sum. This allows the difference (net pixel data TEMP) between the P-phase data of the second time and the D-phase data of the first time to be held in the shared memory 295.

Subsequently, the CDS processing unit 296 adds the second D-phase data and the data held in the memory 273 together, and updates the memory 273 with the sum. This allows the difference between the P-phase data of the first time and the D-phase data of the second time to be held in the memory 273. Note that the memory 273 is an example of the first memory described in the claims.

The arithmetic circuit 280 determines whether or not the pixel data TEMP of the shared memory 295 exceeds a full scale FS (saturated). In a case where the data is not saturated, the arithmetic circuit 280 updates the memory 273 with the data held in the shared memory 295 as illustrated in FIG. 32A. High-resolution data after the update is output as final pixel data. In contrast, in a case where the data is saturated, the arithmetic circuit 280 initializes the shared memory 295 as illustrated in FIG. 32B, and causes the memory 273 to output low resolution held data as final pixel data.

In this manner, according to the method of switching the resolution, it is possible to suppress the exposure of the pixel 300 to simply once, and it is not necessary to perform both the long-time exposure and the short-time exposure, making it possible to suppress an increase in the exposure time.

Figure 33:
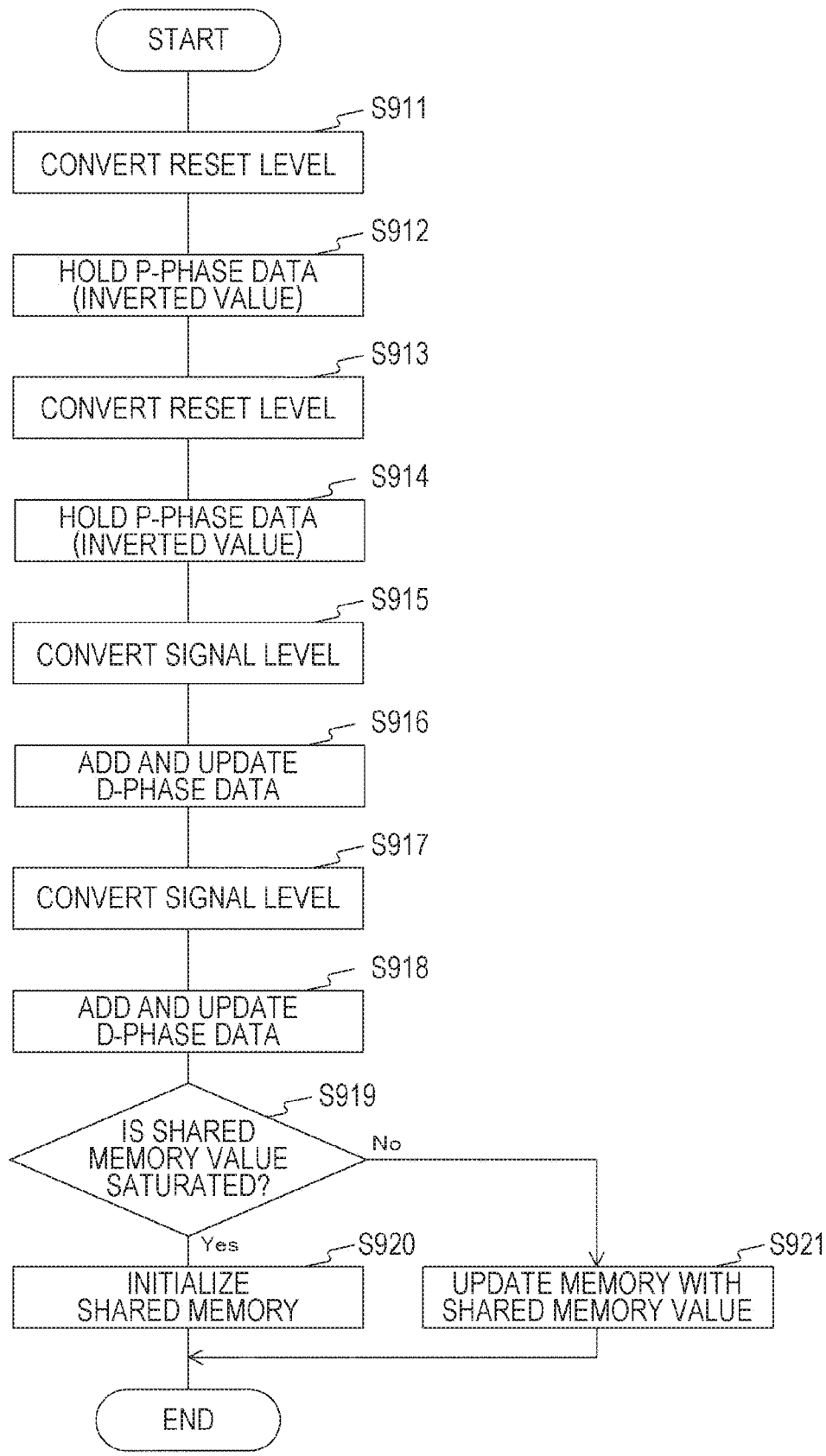
FIG. 33 is a flowchart illustrating an example of CDS processing in the fifth embodiment of the present technology.

FIG. 33 is a flowchart illustrating an example of CDS processing in the fifth embodiment of the present technology. The pixel 300 generates the reset level of the first time and converts the signal into P-phase data (step S911). The output unit 270 inverts the sign of the P-phase data and holds the data in the memory 273 (step S912). Next, the pixel 300 generates the reset level of the second time, converts the signal into P-phase data with gentler slope (step S913). The output unit 270 inverts the sign of the P-phase data of the second time and holds the data in the shared memory 295 (step S914).

The pixel 300 generates the signal level of the first time, converts the signal into D-phase data with gentler slope (step S915). The output unit 270 adds the D-phase data and the data held in the shared memory 295 together, and updates the shared memory 295 with the sum (step S916). Subsequently, the pixel 300 generates the signal level of the second time and converts the signal into D-phase data (step S917). The output unit 270 adds the D-phase data and the data held in the memory 273 together, and updates the memory 273 with the sum (step S918).

The output unit 270 determines whether or not the value held in the shared memory 295 is saturated (step S919). In a case where the data is saturated (step S919: Yes), the output unit 270 initializes the shared memory 295 and outputs the value of the memory 273 as pixel data (step S920). In contrast, in a case where the data is not saturated (step S919: No), the output unit 270 updates the memory 273 with the value held in the shared memory 295, and outputs the updated value as pixel data (step S921). After step S920 or S921, the solid-state imaging element 200 finishes the CDS processing.

In this manner, in the fifth embodiment of the present technology, pixel data of low resolution is output at high illumination and pixel data of high resolution is output at low illumination, making it possible to increase the dynamic range by one exposure.

6. Sixth Embodiment

In the fifth embodiment described above, the pixel circuit 310 outputs the voltage generated by the FD without amplifying the voltage. There is a case, however, where the amount of the saturated signal to be handled might be insufficient in a case where the illumination is high or the like. When the amount of saturation signal to be handled becomes insufficient, it is desirable to reduce the voltage generated by FD and to output data with reduced voltage. The pixel circuit 310 of the sixth embodiment is different from that of the fifth embodiment in that the analog voltage generated by the FD is reduced.

Figure 34:
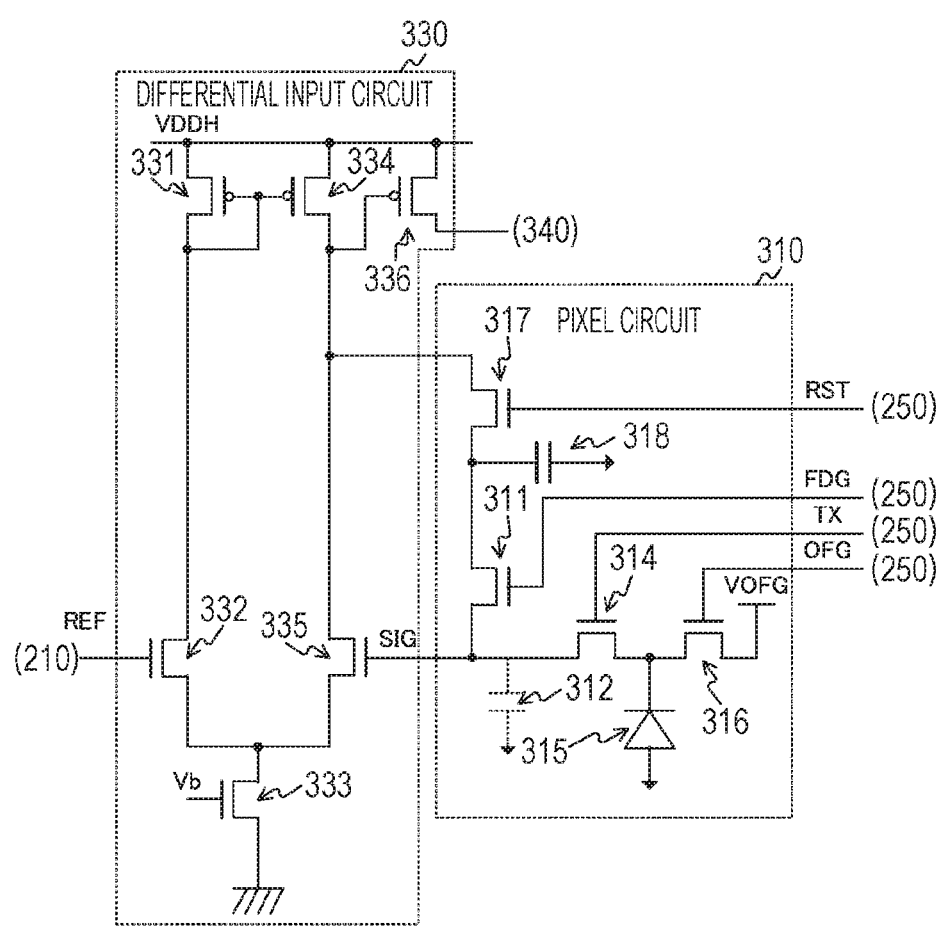
FIG. 34 is a circuit diagram illustrating a configuration example of a pixel circuit and a differential input circuit according to a sixth embodiment of the present technology.

FIG. 34 is a circuit diagram illustrating a configuration example of the pixel circuit 310 and the differential input circuit 330 according to a sixth embodiment of the present technology. The pixel circuit 310 according to the sixth embodiment is different from that of the fifth embodiment in that it further includes a gain control transistor 317 and a capacitor 318. An example of the gain control transistor 317 is an N-type MOS transistor.

A gain control signal FDG from the pixel drive circuit 250 is input to the gate of the gain control transistor 317. Furthermore, the drain of the gain control transistor 317 is connected to one end of the capacitor 318 and the drain of the reset transistor 311. The source of the gain control transistor 317 is connected to the drains of the PMOS transistor 334 and the NMOS transistor 335 and the gate of the PMOS transistor 336. Furthermore, a substrate voltage is applied to the other end of the capacitor 318.

When the pixel drive circuit 250 uses the above configuration to supply the high level gain control signal FDG, the pixel 300 can output the reduced voltage of the FD 312 with a predetermined analog gain. This increases the handling signal amount of the pixel 300, that is, the saturation signal amount.

Figure 35:
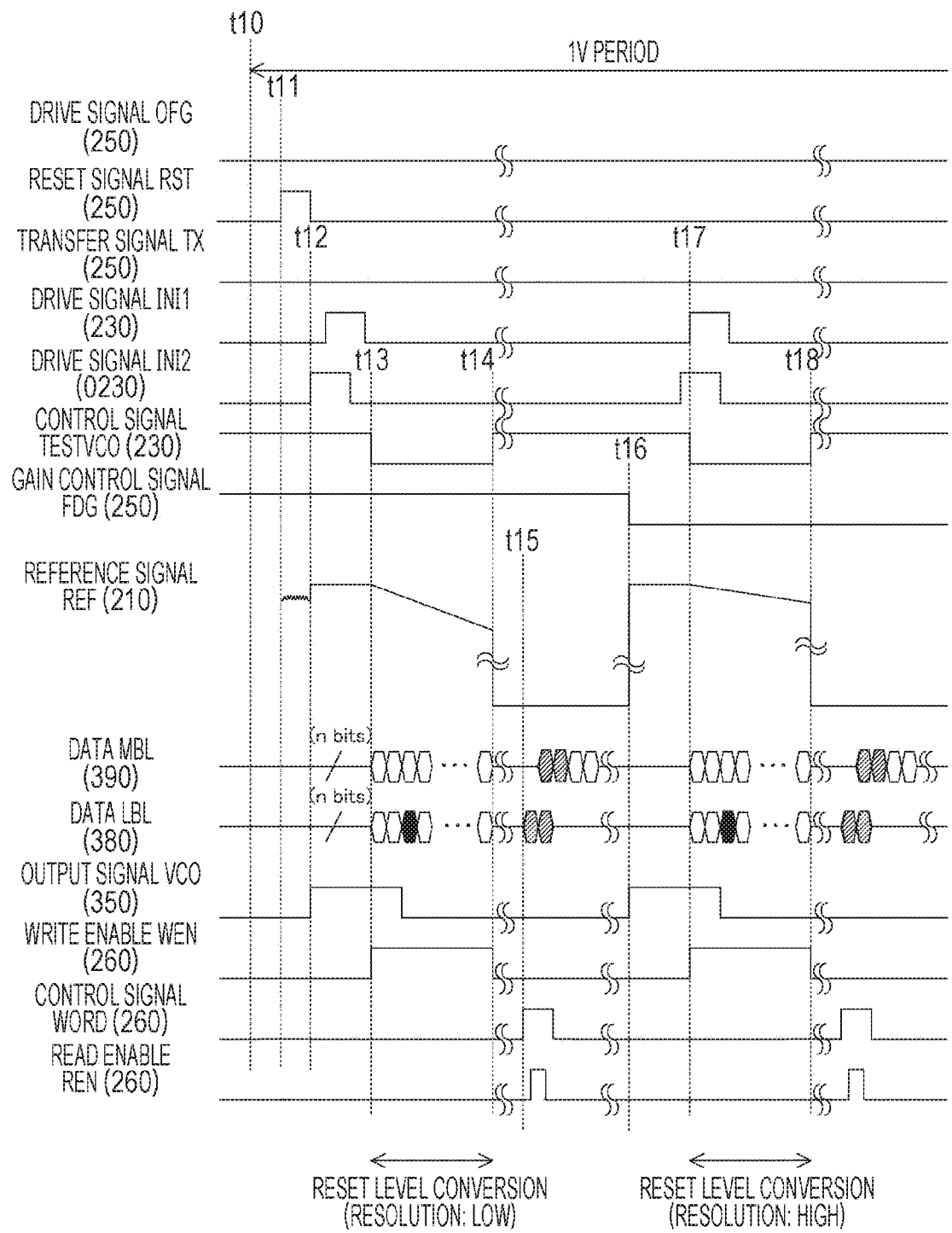
FIG. 35 is a timing chart illustrating an example of sampling processing on a reset level according to the sixth embodiment of the present technology.

FIG. 35 is a timing chart illustrating an example of sampling processing on a reset level according to the sixth embodiment of the present technology. The pixel drive circuit 250 supplies the high level gain control signal FDG during the period from timing t10 to timing t16 in the reset level conversion of the first time. Subsequently, the pixel drive circuit 250 supplies the low level gain control signal FDG at and after timing t16 at the reset level conversion of the second time.

Figure 36:
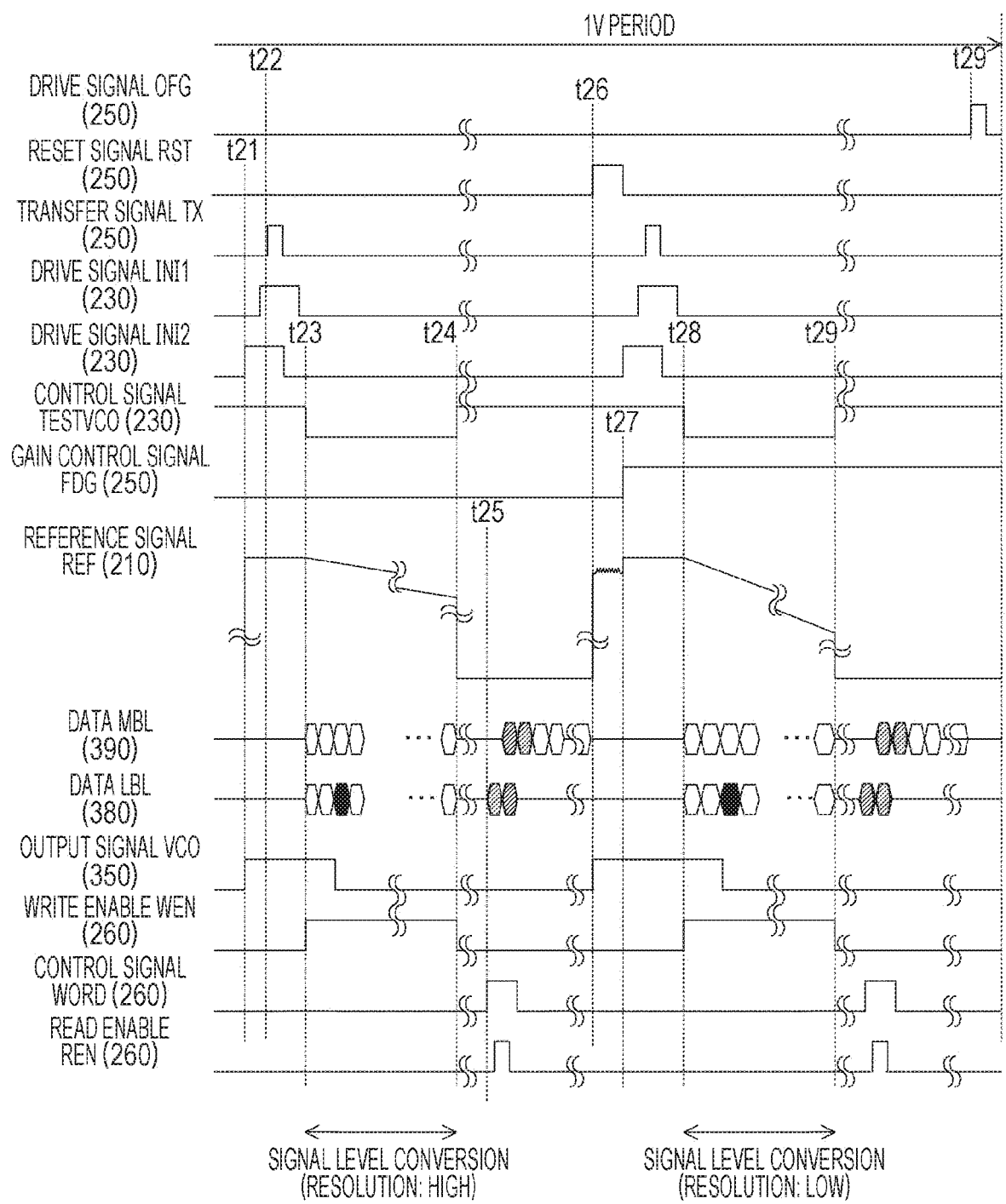
FIG. 36 is a timing chart illustrating an example of sampling processing on a signal level according to the sixth embodiment of the present technology.

FIG. 36 is a timing chart illustrating an example of sampling processing on a signal level according to the sixth embodiment of the present technology. The pixel drive circuit 250 supplies the low level gain control signal FDG during the period from timing t21 to timing t27 in the signal level conversion of the first time. Subsequently, the pixel drive circuit 250 supplies the high level gain control signal FDG at and after timing t27 at the signal level conversion of the second time.

Figure 37A:
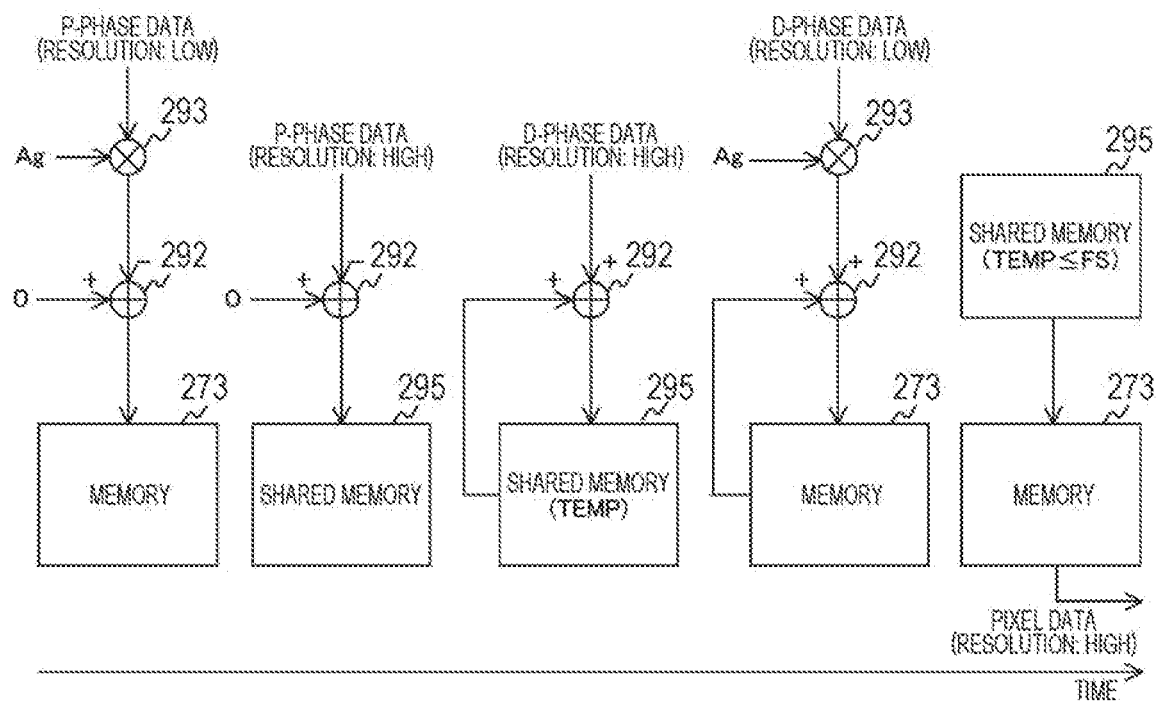
FIGS. 37A and 37B are diagrams illustrating CDS processing in the sixth embodiment of the present technology.
Figure 37B:
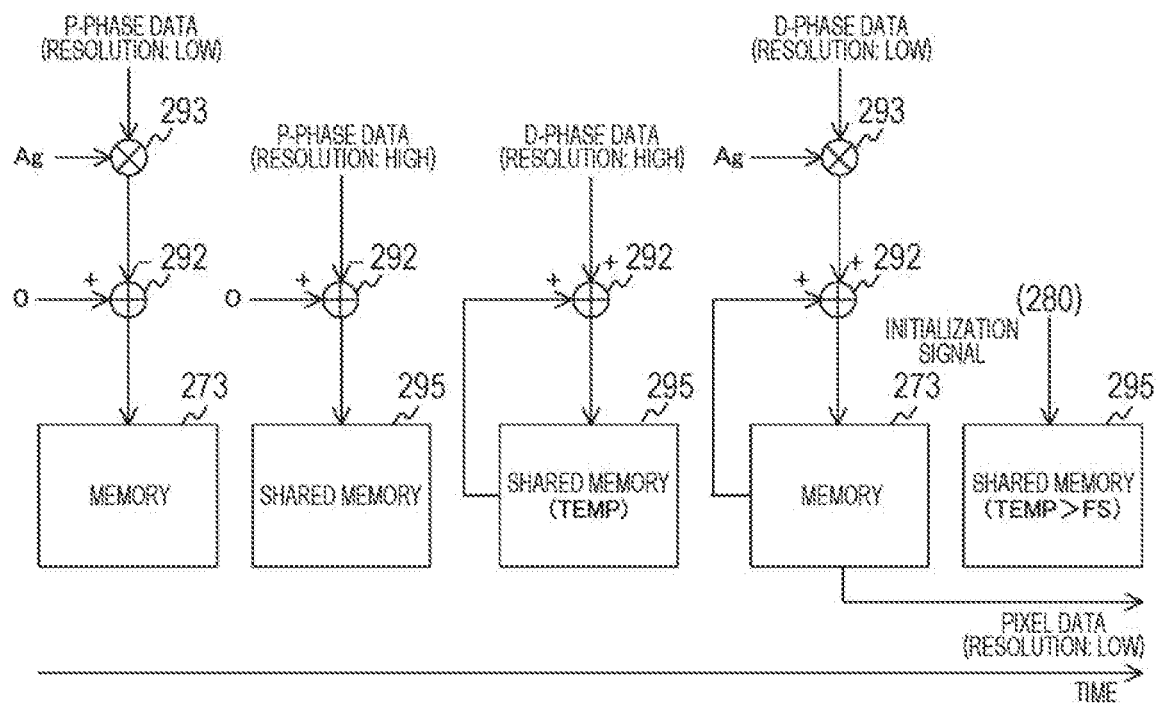

FIGS. 37A and 37B are diagrams illustrating CDS processing in the sixth embodiment of the present technology. FIG. 37A is a diagram illustrating the CDS processing at low illumination, and FIG. 37B is a diagram illustrating the CDS processing at high illumination. The CDS processing unit 296 of the sixth embodiment includes a multiplier 293 and an adder 292.

As illustrated in FIG. 37A, the adder 292 inverts the sign of the low resolution P-phase data of the first time, and holds the data in the memory 273.

In addition, the multiplier 293 multiplies the sign of the high resolution P-phase data of the first time by a digital value Ag. The digital value Ag is set to a value corresponding to the ratio of the resolution due to the slope inclination and the analog gain. With the setting of the digital value Ag to a power of 2, the multiplier 293 can achieve multiplication by a shifter as in the third embodiment. The adder 292 inverts the sign of the multiplied P-phase data and holds the data in the shared memory 295.

Next, the multiplier 293 multiplies the D-phase data of the second time by the digital value Ag. The adder 292 adds the D-phase data after the multiplication and the data held in the shared memory 295 together, and updates the shared memory 295 with the sum. This allows the difference (net pixel data TEMP) between the P-phase data of the second time and the D-phase data of the first time to be held in the shared memory 295.

Subsequently, the adder 292 adds the second D-phase data and the data held in the memory 273 together, and updates the memory 273 with the sum. This allows the difference (net pixel data) between the P-phase data of the first time and the second D-phase data to be held in the memory 273.

The saturation determination unit 297 determines whether or not the pixel data TEMP of the shared memory 295 exceeds the full scale FS (saturated). The processing after saturation determination in the sixth embodiment is similar to that in the fifth embodiment.

In this manner, in the sixth embodiment of the present technology, the output unit 270 reduces the voltage of the FD and thereby reduces the sensitivity, making it possible to suppress the shortage of the saturation signal amount.

7. Seventh Embodiment

In the above-described first embodiment, one semiconductor substrate includes the pixel circuit 310, the ADC 320, and the memory 273. Alternatively, however, the devices can also be arranged dispersedly on a plurality of stacked semiconductor substrates. The solid-state imaging element 200 according to a seventh embodiment is different from that of the first embodiment in that the pixel circuits 310 or the like are dispersedly arranged on the plurality of stacked semiconductor substrates.

Figure 38:
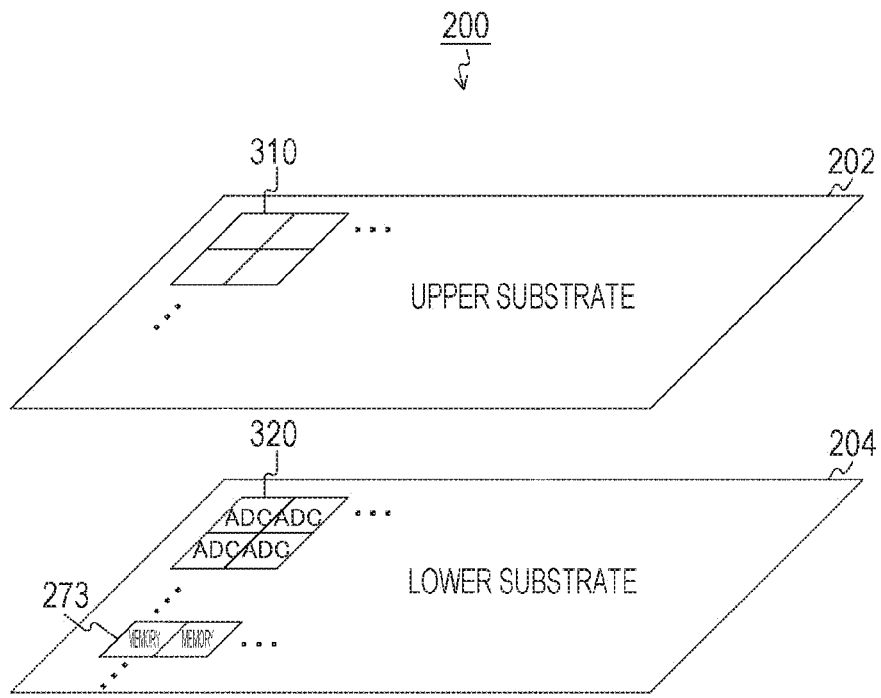
FIG. 38 is a perspective view illustrating an example of a stacked structure of a solid-state imaging element according to a seventh embodiment of the present technology.

FIG. 38 is a perspective view illustrating an example of a stacked structure of the solid-state imaging element 200 according to a seventh embodiment of the present technology. The solid-state imaging element 200 according to the seventh embodiment includes an upper substrate 202 and a lower substrate 204, stacked with each other. The individual substrates are laminated by Cu—Cu joining, Through-Silicon Via (TSV) technology, or the like.

The upper substrate 202 includes the pixel circuits 310 arranged in a two-dimensional lattice pattern. Moreover, the lower substrate 204 includes the ADCs 320 as many as the pixel circuits 310 and memories 273. Circuits and elements other than the pixel circuit 310, the ADC 320, and the memory 273 are omitted in the illustration. "Upper" of the upper substrate 202 indicates the side closer to the optical unit 110.

In this manner, in the seventh embodiment of the present technology, the pixel circuit 310, the ADC 320, and the memory 273 are dispersedly arranged on the upper substrate 202 and the lower substrate 204 stacked with each other. This makes it possible to improve the packaging density and the degree of integration of the solid-state imaging element 200.

[First Modification]

In the above-described seventh embodiment, the memory 273 is arranged on the lower substrate 204. Alternatively, however, the memory 273 may be arranged on the upper substrate 202. The solid-state imaging element 200 according to a first modification of the seventh embodiment is different from that of the seventh embodiment in that a memory 273 is arranged on the upper substrate 202.

Figure 39:
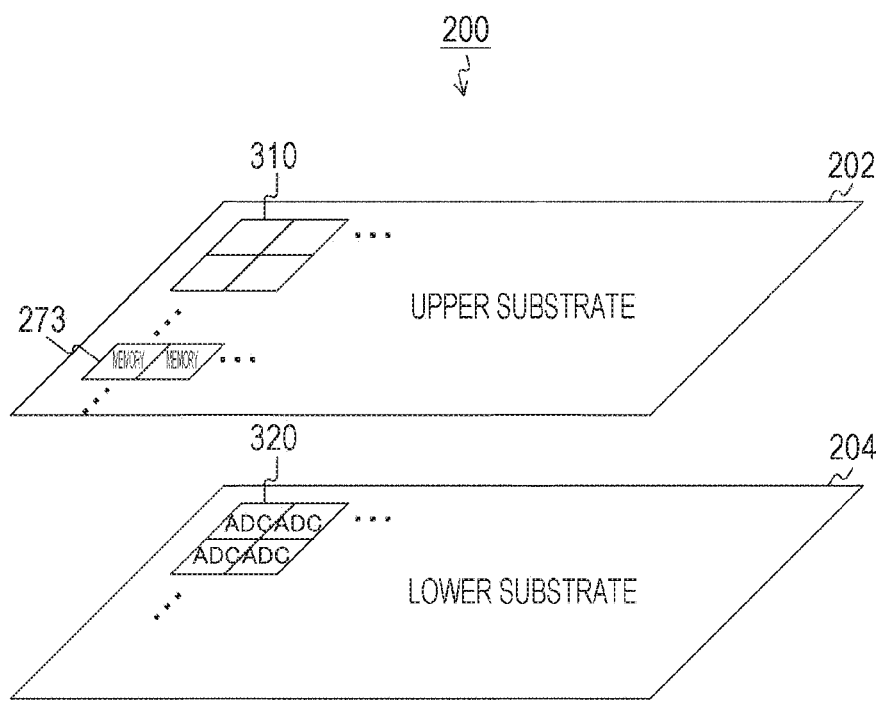
FIG. 39 is a perspective view illustrating an example of a stacked structure of a solid-state imaging element according to a first modification of the seventh embodiment of the present technology.

FIG. 39 is a perspective view illustrating an example of a stacked structure of the solid-state imaging element 200 according to the first modification of the seventh embodiment of the present technology. In the first modification of the seventh embodiment, the pixel circuit 310 and the memory 273 are arranged on the upper substrate 202, while the ADC 320 is arranged on the lower substrate 204. Circuits and elements other than the pixel circuit 310, the ADC 320, and the memory 273 are omitted in the illustration.

In this manner, in the first modification of the seventh embodiment of the present technology, the pixel circuit 310 and the memory 273 are arranged on the upper substrate 202 while the ADC 320 is arranged on the lower substrate 204. This makes it possible to improve packaging density and the degree of integration of the solid-state imaging element 200.

[Second Modification]

In the above-described seventh embodiment, two stacked semiconductor substrates include the pixel circuit 310, the ADC 320, and the memory 273. Alternatively, however, the devices can also be dispersedly arranged on three stacked semiconductor substrates. The solid-state imaging element 200 according to a second modification of the seventh embodiment is different from that of the seventh embodiment in that the pixel circuits 310 or the like are dispersedly arranged on three stacked semiconductor substrates.

Figure 40:
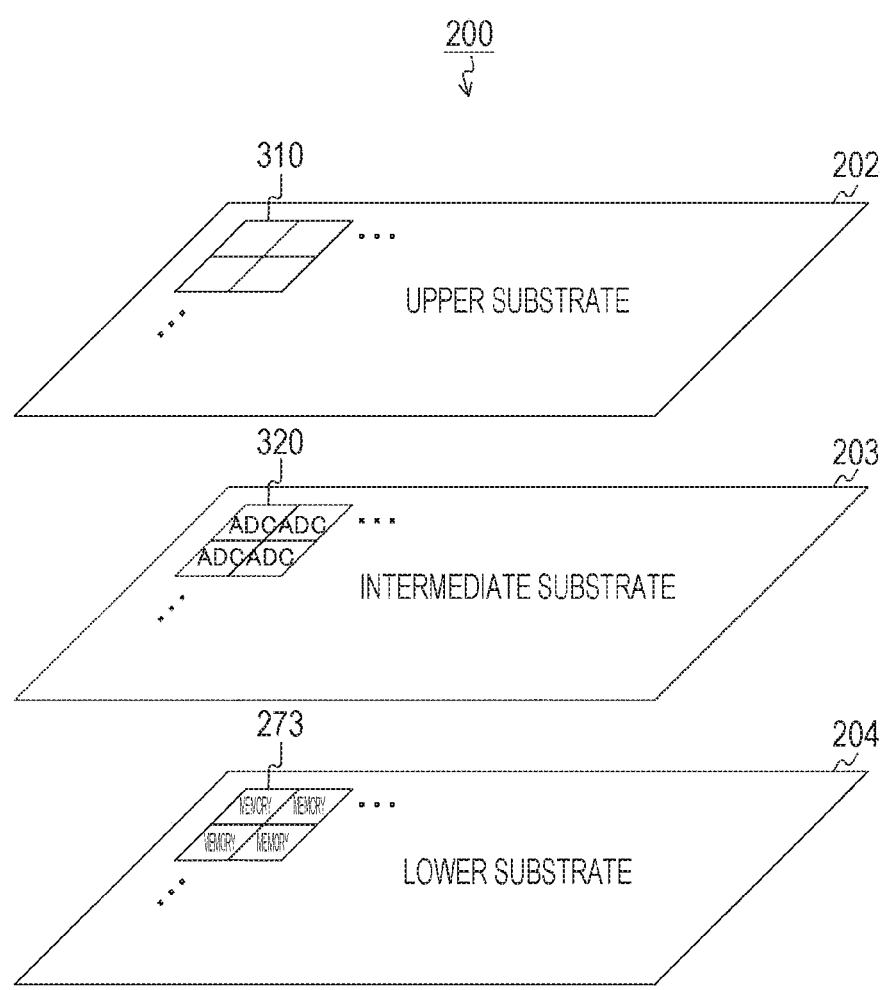
FIG. 40 is a perspective view illustrating an example of a stacked structure of a solid-state imaging element according to a second modification of the seventh embodiment of the present technology.

FIG. 40 is a perspective view illustrating an example of a stacked structure of the solid-state imaging element 200 according to the second modification of the seventh embodiment of the present technology. The solid-state imaging element 200 according to the second modification of the seventh embodiment includes the upper substrate 202, the intermediate substrate 203, and the lower substrate 204, stacked with each other.

The upper substrate 202 includes the pixel circuits 310 arranged in a two-dimensional lattice pattern. Furthermore, the ADCs 320 as many as the number of pixel circuits 310 are arranged on the intermediate substrate 203. The lower substrate 204 includes the memories 273 as many as the number of the pixel circuits 310. Circuits and elements other than the pixel circuit 310, the ADC 320, and the memory 273 are omitted in the illustration.

In this manner, in the second modification of the seventh embodiment of the present technology, the pixel circuit 310, the ADC 320, and the memory 273 are dispersedly arranged on the three stacked semiconductor substrates, making it possible to further improve the packaging density and the degree of integration of the solid-state imaging element 200.

8. Application Example to Mobile Body

The technology according to the present disclosure (present technology) can be applied to various products. For example, the technology according to the present disclosure may be implemented as an apparatus mounted on any type of mobile body such as an automobile, an electric vehicle, a hybrid electric vehicle, a motorcycle, bicycle, personal mobility, airplane, drone, ship, and robot.

Figure 41:
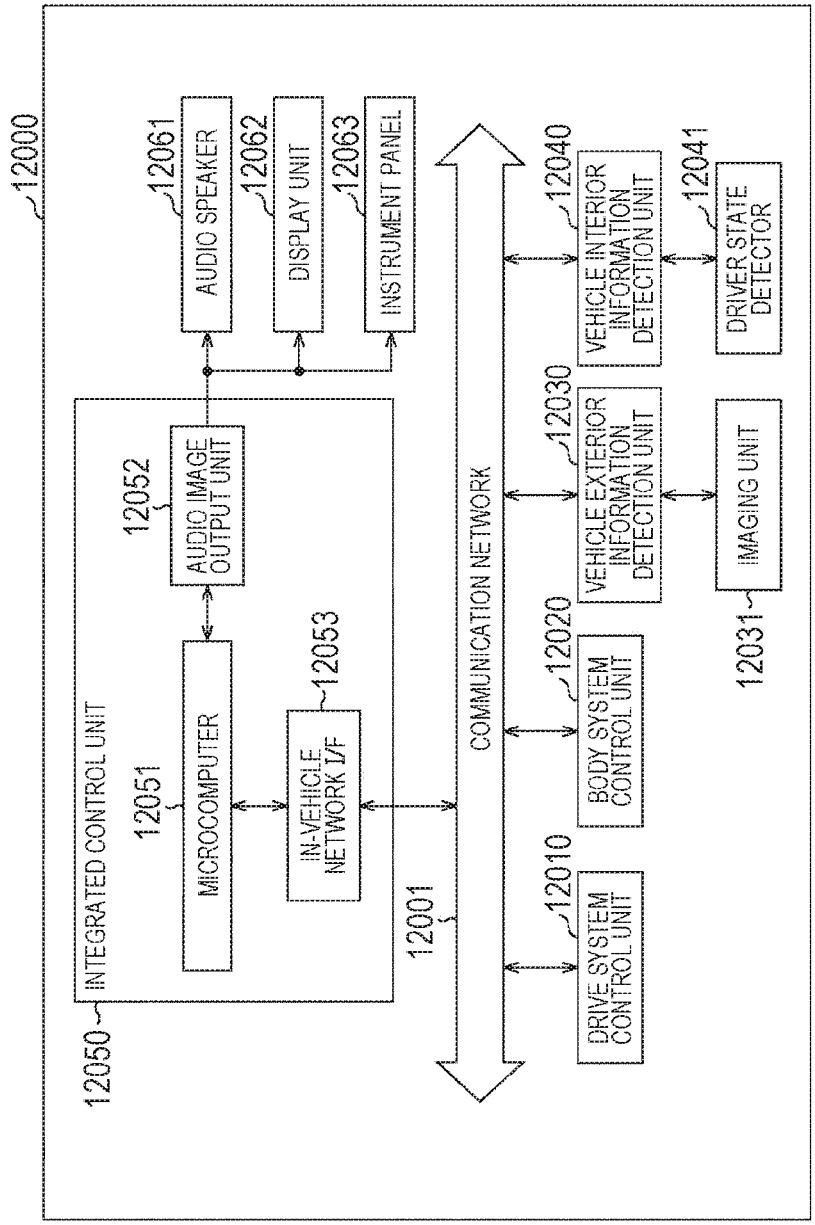
FIG. 41 is a block diagram illustrating a schematic configuration example of a vehicle control system.

FIG. 41 is a block diagram illustrating an example of a schematic configuration of a vehicle control system as an example of a mobile body control system to which the technology according to the present disclosure can be applied.

A vehicle control system 12000 includes a plurality of electronic control units connected via a communication network 12001. In the example illustrated in FIG. 41, the vehicle control system 12000 includes a drive system control unit 12010, a body system control unit 12020, a vehicle exterior information detection unit 12030, a vehicle interior information detection unit 12040, and an integrated control unit 12050. Furthermore, as a functional configuration of the integrated control unit 12050, a microcomputer 12051, an audio image output unit 12052, and an in-vehicle network interface (I/F) 12053 are illustrated.

The drive system control unit 12010 controls operation of the apparatus related to the drive system of the vehicle in accordance with various programs. For example, the drive system control unit 12010 functions as a control apparatus of a driving force generation apparatus that generates a driving force of a vehicle such as an internal combustion engine or a driving motor, a driving force transmission mechanism that transmits a driving force to the wheels, a steering mechanism that adjusts steering angle of the vehicle, a braking apparatus that generates a braking force of the vehicle, or the like.

The body system control unit 12020 controls operation of various devices equipped on the vehicle body in accordance with various programs. For example, the body system control unit 12020 functions as a control apparatus for a keyless entry system, a smart key system, a power window device, or various lamps such as a head lamp, a back lamp, a brake lamp, a turn signal lamp, or a fog lamp. In this case, the body system control unit 12020 can receive inputs of a radio wave transmitted from a portable device that substitutes a key, or a signal of various switches. The body system control unit 12020 receives inputs of these radio waves or signals and controls the door lock device, the power window device, the lamp, etc. of the vehicle.

The vehicle exterior information detection unit 12030 detects information outside the vehicle equipped with the vehicle control system 12000. For example, an imaging unit 12031 is connected to the vehicle exterior information detection unit 12030. The vehicle exterior information detection unit 12030 causes the imaging unit 12031 to capture an image of the outside of the vehicle and receives the captured image. The vehicle exterior information detection unit 12030 may perform object detection processing or distance detection processing on objects such as a person, a car, an obstacle, a sign, and a character on a road surface on the basis of the received image.

The imaging unit 12031 is an optical sensor that receives light and outputs an electric signal corresponding to the amount of light received. The imaging unit 12031 can output an electric signal as an image or output it as distance measurement information. In addition, the light received by the imaging unit 12031 may be visible light or invisible light such as infrared light.

The vehicle interior information detection unit 12040 detects information inside the vehicle. The vehicle interior information detection unit 12040 is connected with a driver state detector 12041 that detects the state of the driver, for example. The driver state detector 12041 may include a camera that images the driver, for example. The vehicle interior information detection unit 12040 may calculate the degree of fatigue or degree of concentration of the driver or may determine whether or not the driver is dozing off on the basis of the detection information input from the driver state detector 12041.

The microcomputer 12051 can calculate a control target value of the driving force generation apparatus, the steering mechanism, or the braking apparatus on the basis of vehicle external/internal information obtained by the vehicle exterior information detection unit 12030 or the vehicle interior information detection unit 12040, and can output a control command to the drive system control unit 12010. For example, the microcomputer 12051 can perform cooperative control for the purpose of achieving a function of an advanced driver assistance system (ADAS) including collision avoidance or impact mitigation of vehicles, follow-up running based on an inter-vehicle distance, cruise control, vehicle collision warning, vehicle lane departure warning, and the like.

Furthermore, it is allowable such that the microcomputer 12051 controls the driving force generation apparatus, the steering mechanism, the braking apparatus, or the like, on the basis of the information regarding the surroundings of the vehicle obtained by the vehicle exterior information detection unit 12030 or the vehicle interior information detection unit 12040, thereby performing cooperative control for the purpose of automatic driving or the like of performing autonomous traveling without depending on the operation of the driver.

In addition, the microcomputer 12051 can output a control command to the body system control unit 12020 on the basis of the vehicle exterior information obtained by the vehicle exterior information detection unit 12030. For example, the microcomputer 12051 can control the head lamp in accordance with the position of the preceding vehicle or the oncoming vehicle sensed by the vehicle exterior information detection unit 12030, and thereby can perform cooperative control aiming at antiglare such as switching the high beam to low beam.

The audio image output unit 12052 transmits an output signal in the form of at least one of audio or image to an output apparatus capable of visually or audibly notifying the occupant of the vehicle or the outside of the vehicle of information. In the example of FIG. 41, an audio speaker 12061, a display unit 12062, and an instrument panel 12063 are illustrated as exemplary output apparatuses. The display unit 12062 may include at least one of an on-board display or a head-up display, for example.

Figure 42:
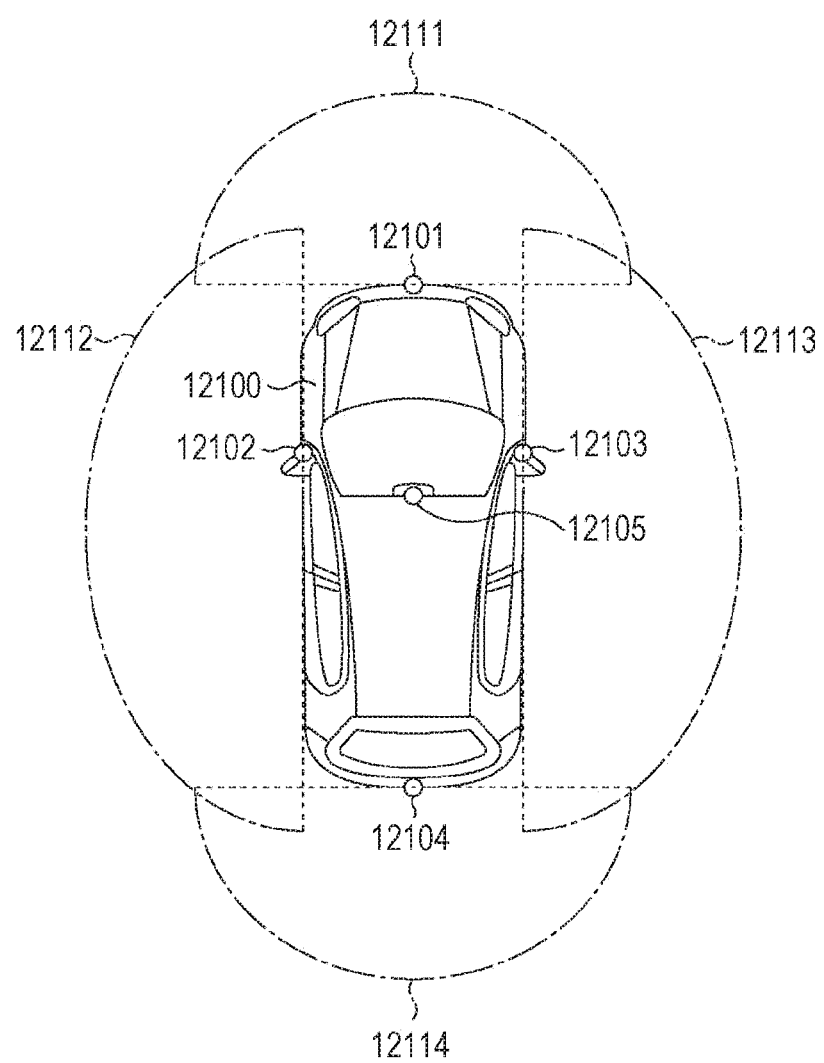
FIG. 42 is an explanatory diagram illustrating an example of installation positions of a vehicle exterior information detector and an imaging unit.

FIG. 42 is a diagram illustrating an example of an installation location of the imaging unit 12031.

In FIG. 42, the imaging unit 12031 includes imaging units 12101, 12102, 12103, 12104, and 12105.

For example, the imaging units 12101, 12102, 12103, 12104, and 12105 are provided in at least one of positions on a vehicle 12100, including a nose, a side mirror, a rear bumper, a back door, an upper portion of windshield in a passenger compartment, or the like. The imaging unit 12101 provided at a front nose and the imaging unit 12105 provided on the upper portion of the windshield in the passenger compartment mainly obtain an image ahead of the vehicle 12100. The imaging units 12102 and 12103 provided at the side mirror mainly obtain images of the side of the vehicle 12100. The imaging unit 12104 provided in the rear bumper or the back door mainly obtains an image behind the vehicle 12100. The imaging unit 12105 provided at an upper portion of the windshield in the passenger compartment is mainly used for detecting a preceding vehicle, a pedestrian, an obstacle, a traffic signal, a traffic sign, a lane, or the like.

Note that FIG. 42 illustrates an example of photographing ranges of the imaging units 12101 to 12104. An imaging range 12111 represents an imaging range of the imaging unit 12101 provided at the front nose, imaging ranges 12112 and 12113 represent imaging ranges of the imaging units 12102 and 12103 provided at the side mirror, and an imaging range 12114 represents an imaging range of the imaging unit 12104 provided at the rear bumper or the back door. For example, the image data captured by the imaging units 12101 to 12104 are overlapped, thereby producing an overhead view image of the vehicle 12100 viewed from above.

At least one of the imaging units 12101 to 12104 may have a function of obtaining distance information. For example, at least one of the imaging units 12101 to 12104 may be a stereo camera including a plurality of imaging elements, or may be an imaging element having pixels for phase difference detection.

For example, the microcomputer 12051 can calculate a distance to each of three-dimensional objects in the imaging ranges 12111 to 12114 and a temporal change (relative speed with respect to the vehicle 12100) of the distance on the basis of the distance information obtained from the imaging units 12101 to 12104, and thereby can extract a three-dimensional object traveling at a predetermined speed (for example, 0 km/h or more) in substantially the same direction as the vehicle 12100 being the nearest three-dimensional object on the traveling path of the vehicle 12100, as a preceding vehicle. Furthermore, the microcomputer 12051 can set an inter-vehicle distance to be ensured in front of the preceding vehicle in advance, and can perform automatic brake control (including follow-up stop control), automatic acceleration control (including follow-up start control), or the like. In this manner, it is possible to perform cooperative control aiming at automatic driving or the like of achieving autonomous traveling without depending on the operation of the driver.

For example, on the basis of the distance information obtained from the imaging units 12101 to 12104, the microcomputer 12051 can extract the three-dimensional object data regarding the three-dimensional object with classification into three-dimensional objects such as a two-wheeled vehicle, a regular vehicle, a large vehicle, a pedestrian, and other three-dimensional objects such as a utility pole, so as to be used for automatic avoidance of obstacles. For example, the microcomputer 12051 discriminates an obstacle in the vicinity of the vehicle 12100 as an obstacle having high visibility to the driver of the vehicle 12100 from an obstacle having low visibility to the driver. Next, the microcomputer 12051 determines a collision risk indicating the risk of collision with each of obstacles. When the collision risk is a set value or more and there is a possibility of collision, the microcomputer 12051 can output an alarm to the driver via the audio speaker 12061 and the display unit 12062, and can perform forced deceleration and avoidance steering via the drive system control unit 12010, thereby achieving driving assistance for collision avoidance.

At least one of the imaging units 12101 to 12104 may be an infrared camera for detecting infrared rays. For example, the microcomputer 12051 can recognize a pedestrian by determining whether or not a pedestrian exists in the captured images of the imaging units 12101 to 12104. Such pedestrian recognition is performed, for example, by a procedure of extracting feature points in a captured image of the imaging units 12101 to 12104 as an infrared camera, and by a procedure of performing pattern matching processing on a series of feature points indicating the contour of the object to discriminate whether or not it is a pedestrian. When the microcomputer 12051 determines that a pedestrian is present in the captured images of the imaging units 12101 to 12104 and recognizes a pedestrian, the audio image output unit 12052 controls the display unit 12062 to perform superimposing display of a rectangular contour line for emphasis to the recognized pedestrian. Furthermore, the audio image output unit 12052 may control the display unit 12062 to display icons or the like indicating pedestrians at desired positions.

Hereinabove, an example of the vehicle control system to which the technology according to the present disclosure can be applied has been described. The technology according to the present disclosure can be applied to the solid-state imaging element within the imaging units 12101 to 12104 out of the above-described configurations. Specifically, the output unit in the solid-state imaging element holds the sum of the difference of the first time and the second and subsequent D-phase data in the memory. Applying the technology according to the present disclosure to the imaging units 12101 to 12104 can suppress an increase in memory capacity of the solid-state imaging element, leading to reduction of the cost of the imaging unit.

Note that the above-described embodiment illustrates an example for embodying the present technology, and the matter of the embodiments corresponds to the subject matter of the invention included in the appended claims. Similarly, the subject matter of the invention included in the appended claims corresponds to the matter under the same names as the matter in the embodiments of the present technology. The present technology, however, is not limited to the embodiments, and can be embodied when various modifications are made to the embodiments without departing from the scope of the technology.

Furthermore, the processing procedure in the above-described embodiments may be regarded as a method including these series of procedures, and as a program for causing a computer to execute these series of procedures or as a recording medium storing the program. This recording medium can be a compact disc (CD), a mini disc (MD), a digital versatile disc (DVD), a memory card, a Blu-ray (registered trademark) disc, or the like, for example.

Note that effects described in the present description are provided for purposes of exemplary illustration and are not intended to be limiting. Still other effects may also be contemplated.

Note that the present technology may also be configured as below.

(1) A solid-state imaging element including:

a pixel circuit that sequentially generates a predetermined reset level and a plurality of signal levels corresponding to an exposure amount;

an analog-to-digital converter that first converts the predetermined reset level into digital data and outputs this data as reset data and thereafter converts each of the plurality of pieces of signal data into digital data and outputs the digital data as signal data;

a memory that holds data as held data; and an arithmetic circuit that initially causes the memory to hold a difference between the reset data and the signal data output first as the held data and thereafter adds the held data that has been held and the signal data output second and subsequent times together and causes the memory to hold the added data as new held data.

(2) The solid-state imaging element according to (1), in which the analog-to-digital converter converts each of the predetermined number of signal levels into the signal data, and capacity of the memory is a sum of a base-2 logarithm of the predetermined number and data size of the difference.

(3) The solid-state imaging element according to (1) or (2), in which the pixel circuit generates the reset levels as many as the number of the plurality of signal levels, and the arithmetic circuit adds the reset data and the held data each time the reset data is output, and then controls the memory to hold the added data as new held data.

(4) The solid-state imaging element according to (1) or (2), in which the exposure time corresponding to each of the plurality of signal levels is different from each other, and the pixel circuit generates one reset level.

(5) The solid-state imaging element according to (4), in which the analog-to-digital converter converts the signal level in accordance with an operating frequency corresponding to the ratio of the exposure time.

(6) The solid-state imaging element according to any of (1) to (5), in which the pixel circuit includes:

a charge storage part that stores transferred charges and generates a voltage corresponding to the stored charge amount;

a plurality of photodiodes that shares the charge storage part; and a transfer part that transfers the charge generated by photoelectric conversion in each of the plurality of photodiodes to the charge storage part.

(7) The solid-state imaging element according to any of (1) to (6), in which the exposure time corresponding to each of the plurality of signal levels is different from each other, and the arithmetic circuit multiplies the reset data and the signal data by the ratio of each of the exposure times, and then calculates the difference.

(8) The solid-state imaging element according to (7), in which the ratio of each of the exposure times is a power of 2, and the arithmetic circuit performs shift operation on the reset data and the signal data.

(9) The solid-state imaging element according to any of (1) to (8), in which the pixel circuit is arranged in a two-dimensional lattice pattern, and the analog-to-digital converter is provided for each of the pixel circuits.

(10) The solid-state imaging element according to any of (1) to (9), further including two stacked semiconductor substrates, in which the pixel circuit is arranged on one of the two semiconductor substrates, and the analog-to-digital converter and the memory are arranged on the other of the two semiconductor substrates.

(11) The solid-state imaging element according to any of (1) to (9), further including two stacked semiconductor substrates, in which the pixel circuit and the memory are arranged on one of the two semiconductor substrates, and the analog-to-digital converter is arranged on the other of the two semiconductor substrates.

(12) The solid-state imaging element according to any of (1) to (9), further including stacked first, second, and third semiconductor substrates, in which the pixel circuit is arranged on the first semiconductor substrate, the analog-to-digital converter is arranged on the second semiconductor substrate, and the memory is arranged on the third semiconductor substrate.

(13) A solid-state imaging element including:

a pixel circuit that sequentially generates first and second reset levels and first and second signal levels corresponding to exposure amounts;

an analog-to-digital converter that converts each of the first reset level and the second signal levels respectively to each of first reset data and second signal data with a predetermined resolution and that converts each of the second reset level and the first signal level respectively to each of second reset data and first signal data with a resolution higher than the predetermined resolution;

a correlated double sampling processing unit that obtains a difference between the first reset data and the second signal data as first pixel data and that obtains a difference between the second reset data and the first signal data as the second pixel data;

a first memory that holds the first pixel data;

a second memory that holds the second pixel data; and a determination unit that determines whether or not a value of the held second pixel data is higher than a predetermined value and that causes the held first pixel data to be output in a case where the value of the second pixel data is higher than the predetermined value and causes the second pixel data to be output in a case where the value of the second pixel data is less than the predetermined value.

(14) The solid-state imaging element according to (13), further including a pixel driving part that controls the pixel circuit to generate the first reset level and the second signal level with a predetermined sensitivity and that controls the pixel circuit to generate the second reset level and the first signal level with a sensitivity different from the predetermined sensitivity.

(15) The solid-state imaging element according to (13) or (14), in which the pixel circuit generates each of the first and second reset levels and the first and second signal levels as pixel signals, the analog-to-digital converter includes:

a comparison unit that compares a predetermined reference signal having a slope with the pixel signal a plurality of times and that outputs results of the comparison; and a data storage unit that stores data including each of the comparison results as either of the first and second reset data or the first and second signal data, and inclination of the slope when the second reset level and the first signal level are individually compared is gentler than the inclination when the first reset level and the second signal level are individually compared.

(16) The solid-state imaging element according to any of (13) to (15), in which the pixel circuits are arranged in a two-dimensional lattice pattern, the analog-to-digital converter is arranged for each of the pixel circuits, and the second memory is shared by all of the pixel circuits.

(17) A solid-state imaging apparatus including:

a pixel circuit that sequentially generates a predetermined reset level and a plurality of signal levels corresponding to an exposure amount;

an analog-to-digital converter that first converts the predetermined reset level into digital data and outputs this data as reset data and thereafter converts each of the plurality of signal levels into digital data and outputs the digital data as signal data;

a memory that holds data as held data;

an arithmetic circuit that initially causes the memory to hold a difference between the reset data and the signal data output first as the held data and thereafter adds the held data that has been held and the signal data output second and subsequent times together and causes the memory to hold the added data as new held data; and a digital signal processing unit that executes predetermined signal processing on the held data that has been held.

(18) A solid-state imaging apparatus including:

a pixel circuit that sequentially generates first and second reset levels and first and second signal levels corresponding to exposure amounts;

an analog-to-digital converter that converts each of the first reset level and the second signal levels respectively to each of first reset data and second signal data with a predetermined resolution and that converts each of the second reset level and the first signal level respectively to each of second reset data and first signal data with a resolution higher than the predetermined resolution;

a correlated double sampling processing unit that obtains a difference between the first reset data and the second signal data as first pixel data and that obtains a difference between the second reset data and the first signal data as the second pixel data;

a first memory that holds the first pixel data;

a second memory that holds the second pixel data;

a determination unit that determines whether or not a value of the held second pixel data is higher than a predetermined value and that causes the held first pixel data to be output in a case where the value of the second pixel data is higher than the predetermined value and causes the second pixel data to be output in a case where the value of the second pixel data is less than the predetermined value; and a digital signal processing unit that executes predetermined signal processing on output data out of the first and second pixel data.

(19) A method for controlling a solid-state imaging element, the method including:

a generating procedure of sequentially generating a predetermined reset level and a plurality of signal levels corresponding to an exposure amount;

an analog-to-digital converting procedure of first converting the predetermined reset level into digital data and outputting this data as reset data and thereafter converting each of the plurality of pieces of signal data into digital data and outputting the digital data as signal data; and an arithmetic operation procedure of initially causing the memory to hold a difference between the reset data and the signal data output first as the held data and thereafter adding the held data that has been held and the signal data output second and subsequent times together and causing the memory to hold the added data as new held data.

(20) A method for controlling a solid-state imaging element, the method including:

a generating procedure of sequentially generating first and second reset levels and first and second signal levels corresponding to exposure amounts;

an analog-to-digital converting procedure of converting each of the first reset level and the second signal levels respectively to each of first reset data and second signal data with a predetermined resolution and then converting each of the second reset level and the first signal level respectively to each of second reset data and first signal data with a resolution higher than the predetermined resolution;

a correlated double sampling processing procedure of obtaining a difference between the first reset data and the second signal data as first pixel data and holding the data in a first memory, and obtains a difference between the second reset data and the first signal data as the second pixel data and holding the data in a second memory; and a determination procedure of determining whether or not the value of the held second pixel data is higher than a predetermined value and causing the held first pixel data to be output in a case where the value of the second pixel data is higher than the predetermined value and causing the second pixel data to be output in a case where the value of the second pixel data is less than the predetermined value.

REFERENCE SIGNS LIST

100 Imaging apparatus
110 Optical unit
120 DSP circuit
130 Display unit
140 Operation unit
150 Bus
160 Frame memory
170 Storage unit
180 Power supply unit
200 Solid-state imaging element
201 Semiconductor substrate
202 Upper substrate
203 Intermediate substrate
204 Lower substrate
210 DAC
220 Time code generator
230 Vertical drive circuit
240 Pixel array unit
241 Time code transfer unit
250 Pixel drive circuit
260 Timing generation circuit
270 Output unit
271 Arithmetic unit
272 Memory array
273 Memory
274 Memory cell
280 Arithmetic circuit
281, 284, 286, 291 Selector
282 Adder circuit
283, 372, 373, 374, 382, 383, 392 Inverter
285 Full adder
290 Shifter
292 Adder
293 Multiplier
295 Shared memory
296 CDS processing unit
297 Saturation determination unit
300 Pixel
310 Pixel circuit
311 Reset transistor
312 FD
313 Sub-pixel circuit
314 Transfer transistor
315 Photodiode
316 Discharge transistor
317 Gain control transistor
318 Capacity
320 ADC
321 Comparison circuit
330 Differential input circuit
331, 334, 336, 351, 352, 355, 356 PMOS transistor
332, 333, 335, 341, 353, 354, 357, 391 NMOS transistor
340 Voltage conversion circuit
350 Positive feedback circuit
360 Data storage unit
361 Repeater
370 Latch control circuit
371 NOR gate
380 Latch circuit
381 Switch
390 Bidirectional buffer
393 Buffer

The invention claimed is:

1. A solid-state imaging element, comprising:
a pixel circuit configured to sequentially generate a reset level and a plurality of signal levels corresponding to a plurality of exposure times, wherein each exposure time of the plurality of exposure times is different;
an analog-to-digital converter configured to:
convert the reset level into first digital data;
output the first digital data;
convert the plurality of signal levels into a plurality of pieces of second digital data; and
output the plurality of pieces of second digital data;

a memory configured to hold the first digital data and the plurality of pieces of second digital data; and an arithmetic circuit configured to:
- calculate a first value based on multiplication of the first digital data by an exposure ratio;
- calculate a second value based on multiplication of third digital data of the plurality of pieces of second digital data by the exposure ratio;
- calculate a difference between the calculated first value and the calculated second value;
- control the memory to hold the calculated difference;
- add the calculated difference and a set of pieces of digital data of the plurality of pieces of second digital data, wherein the third digital data is different from the set of pieces of digital data; and
- control the memory to hold a result of the addition of the calculated difference and the set of pieces of digital data of the plurality of pieces of second digital data.

2. The solid-state imaging element according to claim 1, wherein a capacity of the memory is a sum of a base-2 logarithm of a number of the plurality of signal levels and a data size of the calculated difference.

3. The solid-state imaging element according to claim 1, wherein
the pixel circuit is further configured to generate a number of a plurality of reset levels equal to a number of the plurality of signal levels, and
the arithmetic circuit is further configured to:
- add the first digital data and the calculated difference each time the first digital data is output, and
- control the memory to hold a result of the addition of the first digital data and the calculated difference.

4. The solid-state imaging element according to claim 1, wherein
the analog-to-digital converter is further configured to convert the plurality of signal levels based on an operating frequency of a clock signal, and
the operating frequency corresponds to the exposure ratio.

5. The solid-state imaging element according to claim 1, wherein
the pixel circuit includes:
- a plurality of photodiodes configured to generate charge based on photoelectric conversion of light;
- a charge storage part; and
- a transfer part,
the plurality of photodiodes shares the charge storage part,
the transfer part is configured to transfer the generated charge to the charge storage part, and
the charge storage part is configured to:
- store the transferred charge; and
- generate a voltage that corresponds to an amount of charge stored.

6. The solid-state imaging element according to claim 1, wherein
the exposure ratio is a power of 2, and
the arithmetic circuit is further configured to execute shift operation on each of the first digital data data and the plurality of pieces of second digital data.

7. The solid-state imaging element according to claim 1, wherein
the pixel circuit of a plurality of pixel circuits is in a two-dimensional lattice pattern, and
the analog-to-digital converter is associated with each pixel circuit of the plurality of pixel circuits.

8. The solid-state imaging element according to claim 1, further comprising two stacked semiconductor substrates, wherein
the pixel circuit is on one of the two stacked semiconductor substrates, and
each of the analog-to-digital converter and the memory is on the other semiconductor substrate of the two stacked semiconductor substrates.

9. The solid-state imaging element according to claim 1, further comprising two stacked semiconductor substrates, wherein
each of the pixel circuit and the memory is on one of the two stacked semiconductor substrates, and
the analog-to-digital converter is on the other semiconductor substrate of the two stacked semiconductor substrates.

10. The solid-state imaging element according to claim 1, further comprising three stacked semiconductor substrates, wherein
the pixel circuit is on a first semiconductor substrate of the three stacked semiconductor substrates,
the analog-to-digital converter is on a second semiconductor substrate of the three stacked semiconductor substrates, and
the memory is on a third semiconductor substrate of the three stacked semiconductor substrates.

11. A solid-state imaging apparatus, comprising:
a pixel circuit configured to sequentially generate a reset level and a plurality of signal levels corresponding to a plurality of exposure times, wherein each exposure time of the plurality of exposure times is different;
an analog-to-digital converter configured to:
- convert the reset level into first digital data;
- output the first digital data;
- convert the plurality of signal levels into a plurality of pieces of second digital data; and
- output the plurality of pieces of second digital data;
a memory configured to hold the first digital data and the plurality of pieces of second digital data;
an arithmetic circuit configured to:
- calculate a first value based on multiplication of the first digital data by an exposure ratio;
- calculate a second value based on multiplication of third digital data of the plurality of pieces of second digital data by the exposure ratio;
- calculate a difference between the calculated first value and the calculated second value;
- control the memory to hold the calculated difference;
- add the calculated difference and a set of pieces of digital data of the plurality of pieces of second digital data, wherein the third digital data is different from the set of pieces of digital data; and
- control the memory to hold a result of the addition of the calculated difference and the set of pieces of digital data of the plurality of pieces of second digital data; and
a digital signal processing unit configured to execute signal processing on the calculated difference.

12. A method for controlling a solid-state imaging element, the method comprising:
sequentially generating a reset level and a plurality of signal levels corresponding to a plurality of exposure times, wherein each exposure time of the plurality of exposure times is different;
converting the reset level into first digital data;
outputting the first digital data;

converting the plurality of of signal levels into a plurality of pieces of second digital data;
outputting the plurality of pieces of second digital data;
calculating a first value based on multiplication of the first digital data by an exposure ratio;
calculating a second value based on multiplication of third digital data of the plurality of pieces of second digital data by the exposure ratio;
calculate a difference between the calculated first value and the calculated second value;
controlling the memory to hold the calculated difference;
adding the calculated difference and a set of pieces of digital data of the plurality of pieces of second digital data, wherein the third digital data is different from the set of pieces of digital data; and
controlling the memory to hold a result of the addition of the calculated difference and the set of pieces of digital data of the plurality of pieces of second digital data.

\* \* \* \* \*